(12) United States Patent
Yabu

(10) Patent No.: US 8,885,944 B2
(45) Date of Patent: Nov. 11, 2014

(54) IMAGE EVALUATION DEVICE, IMAGE EVALUATION METHOD, PROGRAM, INTEGRATED CIRCUIT

(75) Inventor: Hiroshi Yabu, Hyogo (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 144 days.

(21) Appl. No.: 13/639,024

(22) PCT Filed: Feb. 6, 2012

(86) PCT No.: PCT/JP2012/000787
§ 371 (c)(1),
(2), (4) Date: Oct. 2, 2012

(87) PCT Pub. No.: WO2012/111275
PCT Pub. Date: Aug. 23, 2012

(65) Prior Publication Data
US 2013/0028521 A1    Jan. 31, 2013

(30) Foreign Application Priority Data

Feb. 17, 2011 (JP) ................. 2011-031983

(51) Int. Cl.
*G06K 9/46* (2006.01)
*G06T 11/60* (2006.01)
*H04N 1/387* (2006.01)

(52) U.S. Cl.
CPC ............. *H04N 1/387* (2013.01); *G06T 11/60* (2013.01)
USPC .......................................... 382/195; 382/218

(58) Field of Classification Search
None
See application file for complete search history.

(56) References Cited

U.S. PATENT DOCUMENTS

| | | | |
|---|---|---|---|
| 2005/0134946 A1 | 6/2005 | Tsue et al. | |
| 2008/0050039 A1* | 2/2008 | Jin | ................. 382/284 |
| 2009/0116752 A1 | 5/2009 | Isomura et al. | |
| 2011/0194773 A1* | 8/2011 | Otsuka | ......................... 382/190 |

FOREIGN PATENT DOCUMENTS

| | | |
|---|---|---|
| JP | 2005-184790 | 7/2005 |
| JP | 2007-143093 | 6/2007 |
| JP | 2008-52326 | 3/2008 |
| JP | 4315344 | 8/2009 |

OTHER PUBLICATIONS

International Search Report issued Mar. 6, 2012 in corresponding International Application No. PCT/JP2012/000787.

(Continued)

*Primary Examiner* — Nirav G Patel
*Assistant Examiner* — Siamak Harandi
(74) *Attorney, Agent, or Firm* — Wenderoth, Lind & Ponack, L.L.P.

(57) ABSTRACT

A template includes a frame a and a frame b, in each of which an image is to be inserted. An object introduction degree (OI) is associated with a frame set ab, which is a combination of the frames a and b. For a pair of images arranged with respect to the frame set ab, the object introduction degree (OI), which is associated with the frame set ab, is calculated according to a characteristic value of each of the images in the pair of images. The calculated object introduction degree is used as an evaluation value of an arrangement pattern in which the pair of images is arranged with respect to the frame set ab.

21 Claims, 44 Drawing Sheets

(56) References Cited

OTHER PUBLICATIONS

Kazuhiro Hotta et al., "Face Recognition Using Weighted Matching by Information of Gabor Features", The Institute of Electronics Information and Communication Engineers, Technical Report of IEICE, May 2000, pp. 31-38 (with English abstract and English translation).

John C. Platt et al., "PhotoTOC: Automatic Clustering for Browsing Personal Photographs", Fourth IEEE Pacific Rim Conference on Multimedia, 2003.

Michael J. Swain et al., "Color Indexing", International Journal of Computer Vision, 7:1, pp. 11-32, Jun. 6, 1991.

* cited by examiner

FIG. 6
(a)
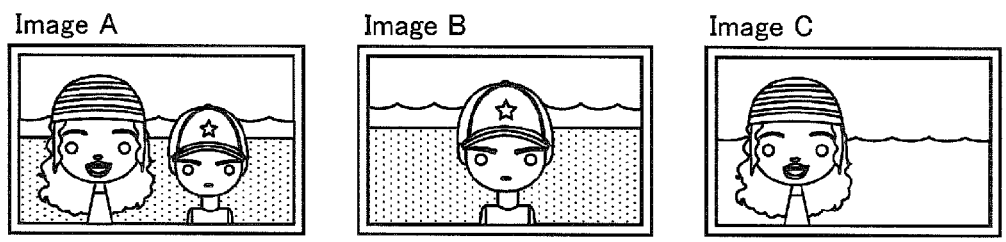
(b)
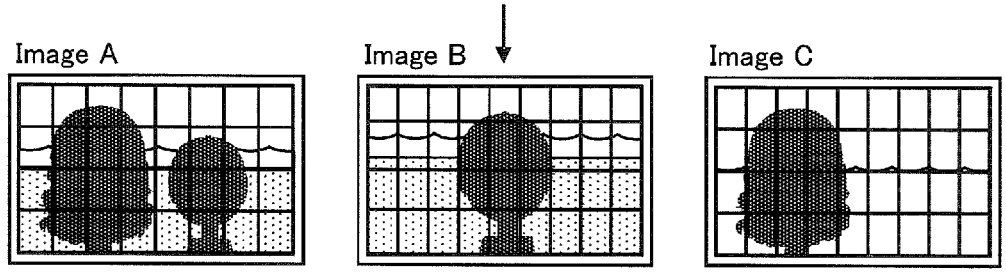
(c)
| Image name | Upper portion of image | | | | | Lower portion of image | | | | | Total |
|---|---|---|---|---|---|---|---|---|---|---|---|
| | Black | White | Red | Green | Blue | Black | White | Red | Green | Blue | |
| Image A | 0 | 0 | 0 | 0 | 12 | 0 | 0 | 0 | 6 | 0 | 18 |
| Image B | 0 | 0 | 0 | 0 | 13 | 0 | 0 | 0 | 12 | 0 | 25 |
| Image C | 0 | 0 | 0 | 0 | 12 | 0 | 0 | 0 | 0 | 10 | 22 |
↓ Normalization Arrangement pattern P20160 ranked 1st    320a Arrangement pattern P1 ranked 20160th    320b Evaluate scene transition degree (ST) with three frames Evaluate object introduction degree (OI) with four frames FIG. 40
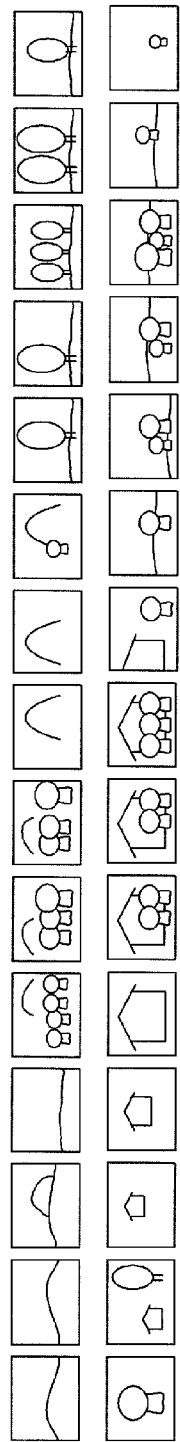
S401: Narrow down images by dividing image into scenes
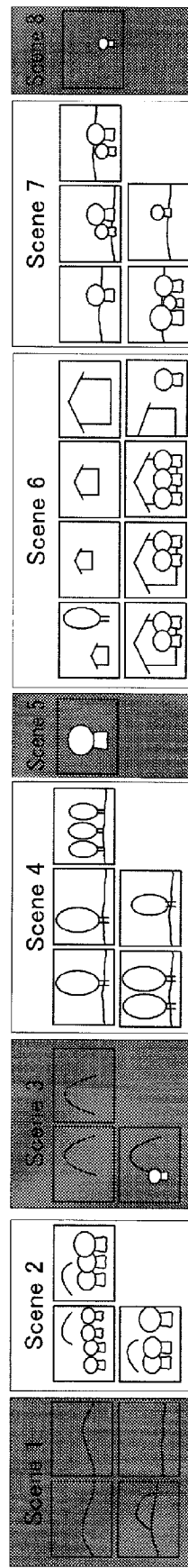
S402: Use images included in narrowed-down scene for generation of arrangement patterns
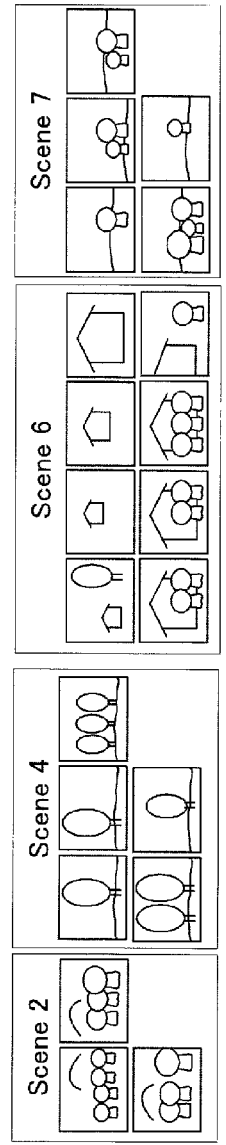

FIG. 41A

Background similarity degree of images a and b: scenesim (a,b)

$$scenesim\,(a,b) = \frac{\sum_{i}^{N} \min(a_i, b_i)}{mxsimilarty} \quad \cdots(1)$$

Sum characteristic values of corresponding segments of images a and b having a lower value Maximum value for normalization

*a,b* : Image ID
*N* : Total number of segments
*i* : Segment
*mxsimilariy* : Maximum similarity degree

FIG. 41B

Interval between photography date/times of images a and b: shottimedist (a,b)

$$shottimedist\,(a,b) = \frac{abs(a_{shottime} - b_{shottime})}{abs(A_{shottime} - B_{shottime})} \quad \cdots(2)$$

Interval between photography date/times of images a and b

Maximum value for normalization

*a,b* : Image ID
*A* : Image with oldest photography date/time in image group
*B* : Image with latest photography date/time in image group
*shottime* : Photography date/time

FIG. 42A

Mathematical expression for calculating background importance degree of image a: SI (a)

High importance when backgrounds are similar and photographing interval is short High importance when similar to background concurrent with important person $$SI(a) = \sum_{b}^{N-1} \left( \frac{a_{shottime} - b_{shottime}}{avgt} \right) * scenesim(a,b) + PI(b) * scenesim(a,b)) \quad \cdots (3)$$

Sum of photographing intervals of image a and other images a,b : Image ID
N : Total number of images
i : Person importance degree
avgt : Average photographing interval in image group $$avgt = \frac{\sum_{a}^{N-1}\sum_{b}^{N-1} a_{shottime} - b_{shottime}}{N} \quad \cdots (4)$$

Average photographing interval of all possible combinations of two image in image group

FIG. 42B

Mathematical expression for calculating object introduction degree of images a and b: ObjectIntro (a,b)

Sum of importance degrees of people in image a

Sum of importance degrees of people in image b $$ObjectIntro(a,b) = \sum_{i}^{M} PI(a_i) + \sum_{j}^{N} PI(b_j) \quad \cdots (5)$$

a,b : Image ID
i,j : Person ID
M,N : Total number of people in images a and b
PI : Person importance degree FIG. 43A
Mathematical expression for calculating object action degree of images a and b: ObjectAction (a,b)

$$ObjectAction(a,b) = \underbrace{(\max(PI(a_i,b_i))+1)}_{\substack{\text{Highest importance}\\\text{degree of person}\\\text{appearing in both}\\\text{images a and b}}} * \underbrace{(\frac{SI(a)+SI(b)}{2}+1)}_{\substack{\text{Average}\\\text{background}\\\text{importance degree}\\\text{of images a and b}}} * \underbrace{(scenesim(a,b)+1)}_{\substack{\text{Similarity degree of}\\\text{images a and b}}} * \underbrace{(\frac{1}{shottimedist(a,b)})}_{\substack{\text{Photographing}\\\text{interval between}\\\text{images a and b}\\\text{(reciprocal)}}} \quad \cdots(6)$$

a,b: Image ID
i,j: Person ID
PI: Person importance degree
SI: Background importance degree FIG. 43B
Mathematical expression for calculating scene transition degree of images a and b: SceneTransition (a,b)

$$SceneTransition(a,b) = \underbrace{(\frac{SI(a)+SI(b)}{2}+1)}_{\substack{\text{Average}\\\text{background}\\\text{importance degree}\\\text{of images a and b}}} * \underbrace{(1-scenesim(a,b)+1)}_{\substack{\text{Similarity degree of}\\\text{images a and b}}} * \underbrace{(shottimedist(a,b)+1)}_{\substack{\text{Photographing}\\\text{interval between}\\\text{images a and b}}} \quad \cdots(7)$$

a,b: Image ID
SI: Background importance degree

FIG. 44A
Mathematical expression for calculating scene overall degree of images a and b: SceneOverall (a,b)

$$SceneOverall(a,b) = \left(\frac{SI(a), SI(b)}{2} + 1\right) * (abs(ObjectOccup(a) - ObjectOccup(b)) + 1) * (scenesim(a,b) + 1) * \left(\frac{1}{shottimedist(a,b) + 1}\right) \quad \cdots(8)$$

- Average background importance degree of images a and b
- Background similarity degree of images a and b
- Photographing interval between images a and b (reciprocal)

a,b: Image ID
ObjectOccup: Occupation degree of person in image
SI: Background importance degree

FIG. 44B
Mathematical expression for calculating arrangement pattern evaluation value based on frames a, b, c, d, e, f, g: PatternScore(a,b,c,d,e,f,g)

Calculation of a combination of images having a maximum sum of evaluation values among possible combinations of images a, b, c, d, e, f, and g $$PatternScore(a,b,c,d,e,f,g) = \arg\max(ObjectIntro(a,b) + ObjectIntro(b,c) + ObjectIntro(a,c) + SceneTransition(d,e) + SceneOverall(f,g)) \quad \cdots(9)$$

IMAGE EVALUATION DEVICE, IMAGE EVALUATION METHOD, PROGRAM, INTEGRATED CIRCUIT

TECHNICAL FIELD

The present invention relates to a technology for creating an album by appropriately arranging images therein.

BACKGROUND ART

The recent spread of digital cameras and the recent increase in the storage capacity of recording media has enabled a single user to photograph and to store an enormous number of images. At the same time, difficulty persisting in creating an album from images is increasing. This is since, when creating an album, a user needs to select only appropriate images from among an enormous number of images.

Relating to this, Patent Literature 1 discloses a technology that assists users in the creation of an album. In specific, Patent Literature 1 discloses a technology of setting a reference value to each image insertion area of an album and displaying an image with a value closest to the reference value in the image insertion area.

CITATION LIST

Patent Literature

[Patent Literature 1]
Japanese Patent Publication No. 4315344

SUMMARY OF INVENTION

Technical Problem

In the meantime, it can be assumed that an album that is easy to look at can be created by arranging images in the album so that the images form a meaningful combination with one another, rather than by arranging images in an isolated state in terms of meaning.

In this regard, Patent Literature 1 merely discloses a technology that is based on the idea of inserting, in a given image insertion area, a single image with a value that is close to the reference value set to the image insertion area. That is, Patent Literature 1 does not disclose a structure for arranging images in an album while taking into consideration the combination between the images.

In view of the aforementioned problem, the present invention provides an image evaluation apparatus that evaluates images to be arranged in an album according to the combination of the images in the album. Such a structure realizes the appropriate selection of images to be arranged in an album and the appropriate arrangement of the selected images in the album.

Solution to the Problems

One aspect of the present invention is an image evaluation apparatus comprising: a template storing unit that stores a template having an N number of frames in each of which an image is to be inserted, N being a natural number equal to or greater than 2, and defining (i) one or more frame sets each being a combination of a plurality of frames among the N number of frames and (ii) evaluation factors pertaining to a characteristic value of each of images that are to be arranged with respect to each of the one or more frame sets; an acquisition unit that acquires a plurality of images; an evaluation unit that selects an N number of images from among the acquired images, generates a plurality of candidate arrangement patterns for arranging the N number of images with respect to the N number of frames, and calculates an evaluation value for each of the candidate arrangement patterns according to the evaluation factors; and an evaluation value storing unit that stores, for each of the candidate arrangement patterns, a corresponding evaluation value calculated by the evaluation unit, wherein the evaluation unit specifies, as an arrangement for inserting the N number of images with respect to the N number of frames, a candidate arrangement pattern corresponding to the highest evaluation value among the evaluation values stored in the evaluation value storing unit.

SUMMARY OF INVENTION

The image evaluation apparatus pertaining to one aspect of the present invention calculates an evaluation value for each arrangement pattern according to the evaluation factors, each of which pertaining to a combination of characteristic values of images that are to be arranged with respect to a frame set.

Accordingly, the image evaluation apparatus pertaining to one aspect of the present invention realizes the appropriate selection of images to be arranged in an album and the appropriate arrangement of the selected images in the album according to combinations of the images.

BRIEF DESCRIPTION OF THE DRAWINGS

FIG. 6 is an image diagram illustrating a specific example of operations involved in extraction of background characteristic values.

FIG. 40 illustrates an example of narrowing down images.

FIGS. 41A and 41B illustrate examples of mathematical expressions.

FIGS. 42A and 42B illustrate examples of mathematical expressions.

FIGS. 43A and 43B illustrate examples of mathematical expressions.

FIGS. 44A and 44B illustrate examples of mathematical expressions.

DESCRIPTION OF EMBODIMENTS

In the following, description is provided on an embodiment of the present invention, with reference to the accompanying drawings.

Embodiment 1

Structure

In the following, description is provided on embodiment 1 of the present invention, with reference to the accompanying drawings.

Figure 1:
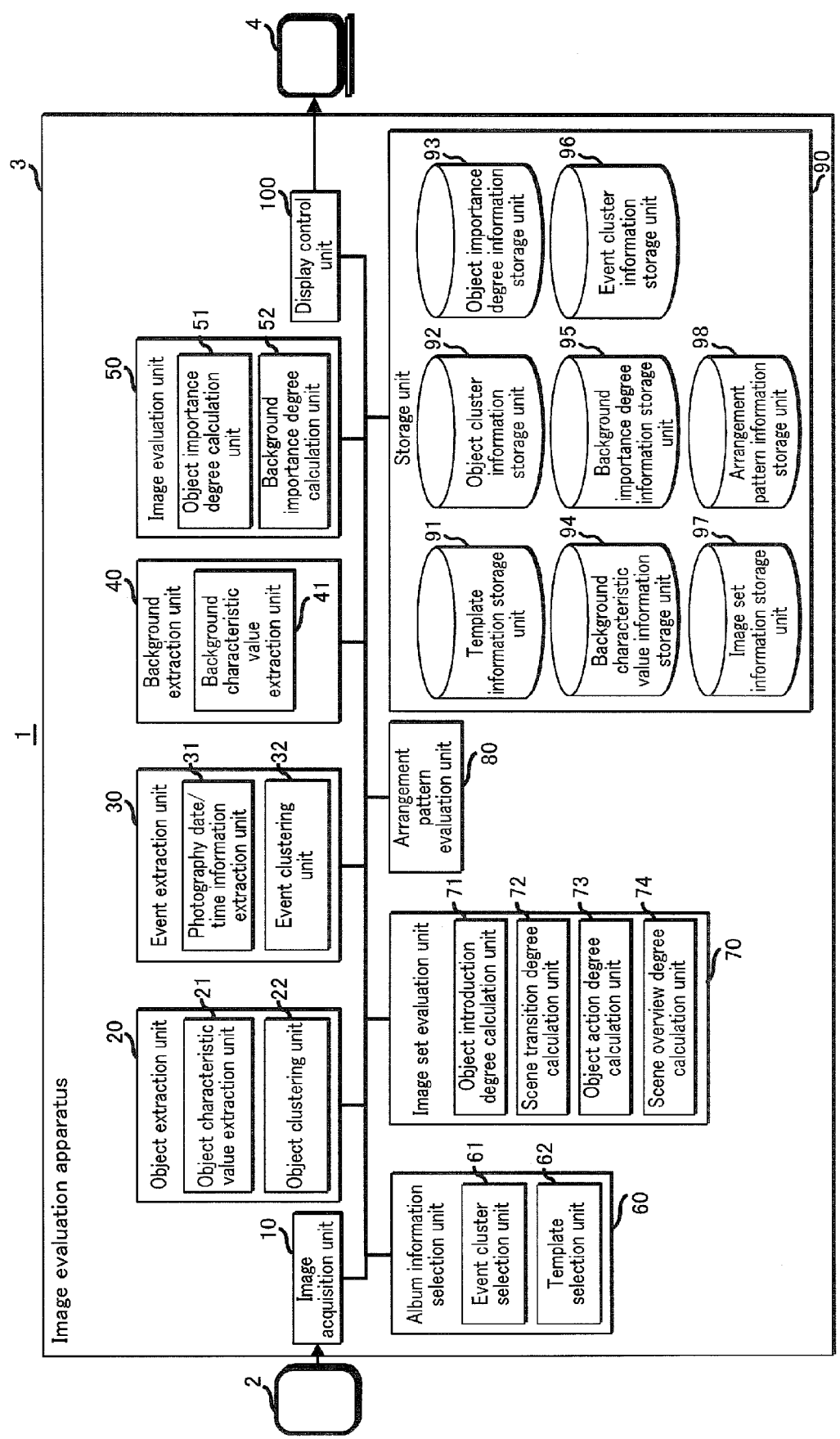
FIG. 1 is a block diagram illustrating an image evaluation system in embodiment 1.

FIG. 1 is a block diagram illustrating a general structure of an image evaluation apparatus in embodiment 1.

As illustrated in FIG. 1, an image evaluation system 1 includes: a recording medium 2; an image evaluation apparatus 3; and a display 4.

The image evaluation apparatus 3 includes: an image acquisition unit 10; an object extraction unit 20 (including an object characteristic value extraction unit 21 and an object clustering unit 22); an event extraction unit 30 (including a photography date/time information extraction unit 31 and an event clustering unit 32); a background extraction unit 40 (including a background characteristic value extraction unit 41); an image evaluation unit 50 (including an object importance degree calculation unit 51 and a background importance degree calculation unit 52); a storage unit 90 (including a template information storage unit 91, an object cluster information storage unit 92, an object importance degree information storage unit 93, a background characteristic value information storage unit 94, a background importance degree information storage unit 95, an event cluster information storage unit 96, an image set information storage unit 97, and an arrangement pattern information storage unit 98); an album information selection unit 60 (including an event cluster selection unit 61 and a template selection unit 62); an image set evaluation unit 70 (including an object introduction degree calculation unit 71, a scene transition degree calculation unit 72, an object action degree calculation unit 73, and a scene overview degree calculation unit 74); an arrangement pattern evaluation unit 80; and a display control unit 100.

The image acquisition unit 10 acquires image data from the recording medium 2. The image acquisition unit 10 is constituted of, for instance, an SD card reader, and acquires image data from the recording medium 2, which is an SD memory card inserted into an SD card slot of the SD card reader.

The object extraction unit 20 extracts objects from images included in the image data and performs clustering with respect to the objects.

More specifically, the object characteristic value extraction unit 21 cuts out areas including objects from the images. Further, the object characteristic value extraction unit 21 extracts, from an area of an image including an object, a characteristic value of the object.

The object clustering unit 22 performs clustering with respect to the objects according to the characteristic values and stores information indicating the results of the clustering to the object cluster information storage unit 92. Note that in the following, description is provided under the premise that each object is a human face.

The extraction and the clustering described above may be performed by utilizing commonly-known methods. One example of a commonly-known method that can be utilized in extracting object characteristic values from images is the extraction method involving the use of the Gabor filter (refer to the later-described Referenced Document 1).

In addition, a commonly-known method that can be utilized in clustering objects according to object characteristic values is the k-means clustering method (refer to Referenced Document 1). The k-means clustering method is a non-hierarchical clustering method (a non-hierarchical clustering method refers to a clustering method where clustering is performed by associating each fixed cluster with a cluster representative).

The background extraction unit 40 extracts a background characteristic value from each of the images. A background characteristic value of a given image indicates characteristics of a background of the image (the background refers to an area of the image excluding the area cut out by the object characteristic value extraction unit 21). Further, the background extraction unit 40 stores the information of the background characteristic values to the background characteristic value information storage unit 94. As for the method utilized for extracting a background characteristic value from a given image, a method is utilized of dividing the image into segments, extracting a color characteristic value that appears most frequently in each segment as a representative color of the segment, and creating a histogram indicating the representative colors of the segments. The histogram is utilized as the background characteristic value of the image.

The event extraction unit 30 classifies the images included in the image data acquired by the image acquisition unit 10 according to events.

More specifically, the photography date/time information extraction unit 31 extracts photography date/time information appended to each of the images.

The event clustering unit 32 performs clustering with respect to the images by classifying the images into multiple events according to the photography date/time information extracted from the images. Further, the event clustering unit 32 stores information indicating the results of the clustering to the event cluster information storage unit 96.

As for the method utilized for clustering the images according to events, a method may be utilized of setting a given time period as a threshold value and determining a breakpoint between two events when a difference between photography date/times of two images exceeds the threshold value (refer to Referenced Document 2).

The image evaluation unit 50 includes the object importance degree calculation unit 51 and the background importance degree calculation unit 52.

The object importance degree calculation unit 51 calculates object importance degrees of the objects, such as people, appearing in the images according to the object cluster information stored in the object cluster information storage unit 92. Here, an object importance degree of a given object indicates the importance of the object. Further, the object importance degree calculation unit 51 stores the information obtained as a result of the calculation to the object importance degree information storage unit 93.

To provide a brief description on the method utilized for calculating the object importance degrees, calculation is performed such that object importance degrees of clusters corresponding to objects appearing frequently in the images are relatively great.

The following describes one example of the calculation of the object importance degrees. Here, assumption is made that:
  the total number of images acquired by the image acquisition unit 10 is one hundred;
  the number of images in which person a appears is thirty;
  the number of images in which person b appears is twenty; and
  the number of images in which person c appears is ten.

Figure 12:
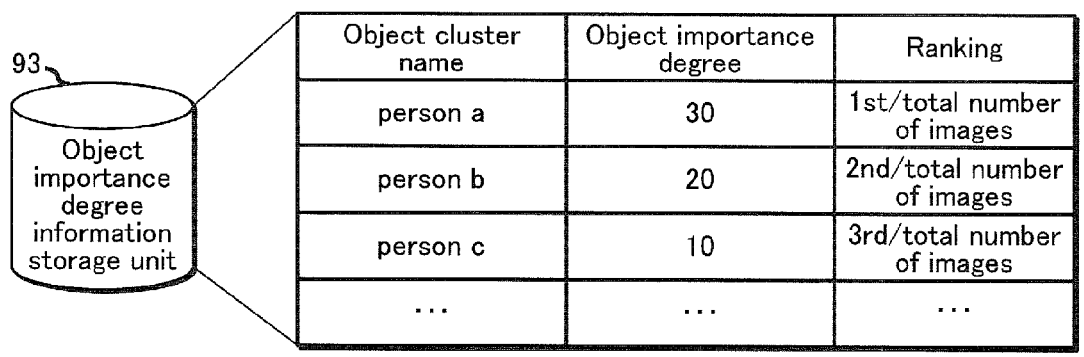
FIG. 12 illustrates a data structure of the object importance degrees.

In this case, the object importance degree calculation unit 51 calculates an object importance degree of each of the objects according to the number of images in which the corresponding object appears, such that: the object importance degree of person a is thirty; the object importance degree of person b is twenty; and the object importance degree of person c is ten (refer to FIG. 12).

Note that the calculation of the object importance degrees may be performed by also calculating, as an additional factor, the sizes (occupation degrees) of the people appearing in the images. In such a case, calculation is performed such that an object having a great occupation degree is provided with a relatively great object importance degree.

The background importance degree calculation unit 52 calculates a background importance degree of each of the images belonging to the same event and stores the background importance degrees to the background importance degree information storage unit 95. The calculation of the background importance degrees by the background importance degree calculation unit 52 is performed according to the object cluster information stored in the object cluster information storage unit 92, the event cluster information stored in the event cluster information storage unit 96, and the background characteristic values stored in the background characteristic value information storage unit 94. Details of the method utilized for calculating the background importance degrees are described later, with reference to FIG. 14.

The storage unit 90 includes: the template information storage unit 91; the object cluster information storage unit 92; the object importance degree information storage unit 93; the background characteristic value information storage unit 94; the background importance degree information storage unit 95; the event cluster information storage unit 96; the image set information storage unit 97; and the arrangement pattern information storage unit 98. The storage unit 90 may be constituted of a RAM, for example.

The album information selection unit 60 performs processing related to the selection of information (an event and a template) pertaining to an album to be created.

In particular, the event cluster selection unit 61 is provided with a function of selecting an event to which images to be used in creating an album belong.

Here, assumption is made, for instance, that three different events are stored in the event cluster information storage unit 96. In this case, the event cluster selection unit 61 selects one event from among the three events stored in the event cluster information storage unit 96. Alternatively, the selection of an event may be performed by presenting, to a user, a menu screen for the selection of an event by displaying the menu screen on the display 4, and by receiving input via an input device.

The template selection unit 62 selects one template from among multiple templates stored in the template information storage unit 91.

The template information storage unit 91 stores, for each of the multiple templates stored therein, (a) information related to a design of the template which indicates a layout of frames in the template and the like and (b) information related to evaluation factors pertaining to pairs of images that are to be arranged with respect to pairs of frames. Note that details of the information stored in the template information storage unit 91 are described later.

The arrangement pattern evaluation unit 80 calculates an evaluation value for each arrangement pattern (combined image set) and stores the evaluation value to the arrangement pattern information storage unit 98. Each arrangement pattern is one possible arrangement for arranging images belonging to the event cluster selected by the event cluster selection unit 61 with respect to the template selected by the template selection unit 62. Further, the arrangement pattern evaluation unit 80 creates an album corresponding to the arrangement pattern having the highest evaluation value.

For instance, when the selected template has six frames and when eight images belong to the selected event cluster, there are 8!/(8−6)!=20160 patterns for arranging the eight images with respect to the six frames based on permutation.

In this case, the arrangement pattern evaluation unit 80 calculates an evaluation value for each of the 20160 arrangement patterns in accordance with a brute force algorithm.

Note that calculation of subordinate values utilized in the calculation of evaluation values is performed by the image set evaluation unit 70. That is, when the aforementioned calculation of an evaluation value of an arrangement pattern is performed, evaluation is performed of pairs of images (image sets) in the arrangement pattern arranged with respect to the pairs of frames of the selected template by using the following information:

(a) the event cluster information; (b) the object cluster information; (c) the background characteristic values; (d) the object importance degrees; and (e) the background importance degrees.

In addition, there are four types of evaluation factors according to which an evaluation value of an arrangement pattern is calculated. In the following, description is provided on an outline of each evaluation factor and criteria according to which the judgment of whether a high/low evaluation is provided is performed for each evaluation factor (a brief explanation of reasons of judgment is provided between parentheses in the following).

(Evaluation Factor 1) "Object Introduction Degree" . . . Evaluates how appropriate a pair of images is in terms of the degree of introduction of objects appearing in the images in the selected event.

(Judgment Criteria for Evaluation Factor 1)
  A pair of images in which a great variety of people appear is provided with a high evaluation.
  A pair of images including important people is provided with a high evaluation.

(Evaluation Factor 2) "Object Action Degree" . . . Evaluates the degree at which a pair of images shows actions of an object in a specific scene.

(Judgment Criteria for Evaluation Factor 2)
  Precondition: the pair of images includes the same person
  A pair of images including the same person who has a great degree of importance is provided with a high evaluation.
  A pair of images that is a combination of images each having a great background importance degree is provided with a high evaluation.
  A pair of images whose backgrounds indicate a great degree of similarity is provided with a high evaluation (it can be assumed that the images constituting the pair of images were photographed in the same scene).
  A pair of images having close photography date/times is provided with a high evaluation (it can be assumed that the images constituting the pair of images belong to the same sequence of images photographed in the same scene when having close photography date/times).

(Evaluation Factor 3) "Scene Transition Degree" . . . Evaluates the degree at which a pair of images indicates transition between scenes.

(Judgment Criteria for Evaluation Factor 3)
  A pair of images that is a combination of images each having a great background importance degree is provided with a high evaluation.
  A pair of images whose backgrounds indicate a great degree of non-similarity is provided with a high evaluation (it can be assumed that the images constituting the pair of images were photographed in different scenes).
  A pair of images having distant photography date/times is provided with a high evaluation (it can be assumed that the images constituting the pair of images were photographed in different scenes due to the photographer moving between the different photography date/times of the two images).

(Evaluation Factor 4) "Scene Overview Degree" . . . An evaluation factor that is used for determining whether a pair of images is useful in looking back at a specific scene and that evaluates the contrast of the area occupied by a person in the two images constituting the pair of images when the person occupies a great area in one image and a small area in the other image.

(Judgment Criteria for Evaluation Factor 4)
  Precondition: at least one of the images constituting a pair of images needs to include a person
  A pair of images that is a combination of images each having a great background importance degree is provided with a high evaluation.
  A pair of images in which the size of a person appearing in the images differs to a great extent is provided with a high evaluation (i.e., indicates the contrast of the area occupied by a person in the two images).
  A pair of images whose backgrounds indicate a great degree of similarity is provided with a high evaluation.
  A pair of images having close photography date/times is provided with a high evaluation.

The above description provides an outline of the four types of evaluation factors 1 through 4. Note that the judgment criteria listed above for each of evaluation factors 1 through 4 are mere examples. That is, the judgment criteria are not limited to those listed above.

In addition, the evaluation factors 2 and 4, namely the object action degree and the scene overview degree, focus on the similarity of backgrounds of a pair of images, and therefore, it can be said that the evaluation factors 2 and 4 each indicate a degree of change of the same object cluster between images having similar backgrounds.

Returning to the description on the structure of the image evaluation apparatus 3, the image set evaluation unit 70 includes the object introduction degree calculation unit 71, the scene transition degree calculation unit 72, the object action degree calculation unit 73, and the scene overview degree calculation unit 74, which respectively calculate the object introduction degree, the scene transition degree, the object action degree, and the scene overview degree.

The display control unit 100 causes the display 4 to perform various forms of display.

In particular, the display control unit 100 causes a screen of the display 4 to display an album created by arranging images with respect to a template, which is a mount for mounting images, according to a given arrangement pattern (e.g., a candidate arrangement pattern having the highest evaluation value). The insertion of images with respect to a template according to a given arrangement pattern is performed based on the evaluation values of the arrangement patterns stored in the arrangement pattern information storage unit 98 and the template information stored in the template information storage unit 91.

<Operations>

In the following, description is provided on the flow of processing up to the point when arrangement patterns of images are evaluated.

Figure 2:
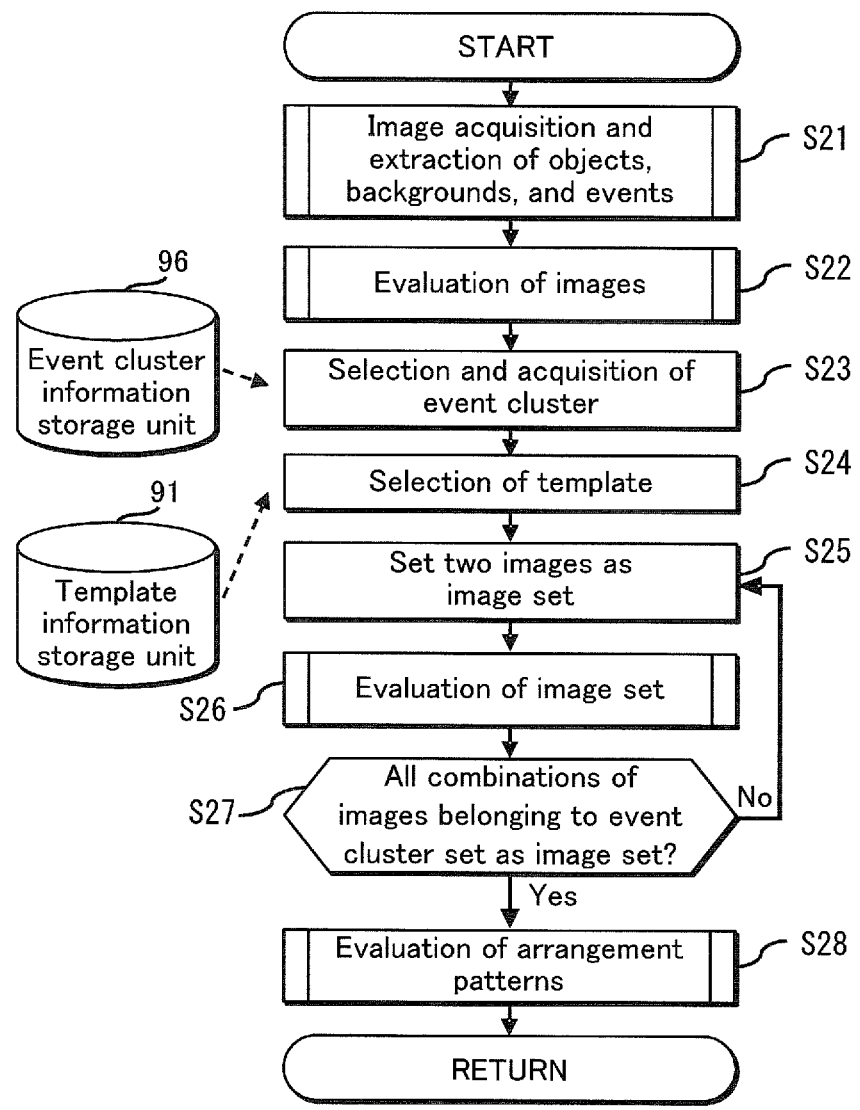
FIG. 2 is a flowchart illustrating the entire flow of processing.

FIG. 2 is a flowchart illustrating the entire flow of processing. The image evaluation apparatus 3 performs acquisition of images and extraction of objects, backgrounds, and events (S21) and performs evaluation of images (S22). Further, the image evaluation apparatus 3 acquires the event cluster information from the event cluster information storage unit 96 and selects one event from among the multiple event clusters in accordance with a specification received from a user of an event for which the user desires to create an album (S23). Further, the image evaluation apparatus 3 acquires the template information from the template information storage unit 91 and selects one template which the user desires to use as the mount for the album (S24). Subsequently, the image evaluation apparatus 3 sets two images (a pair of images) from among a group of images belonging to the selected event cluster as an image set (S25) and performs evaluation of the image set (S26). Following this, when all possible combinations of images belonging to the selected event cluster have not yet been set as the image set for performing the evaluation of the image set (S27: No), the processing returns to S25, and the image evaluation apparatus 3 sets two images belonging to the select event cluster that have not yet been set as the image set for performing the evaluation of the image set. When all possible combinations of images belonging to the selected event cluster have been set as the image set for performing the evaluation of the image set (S27: Yes), the image evaluation apparatus 3 performs evaluation of arrangement patterns (S28). Subsequently, processing is terminated.

In the following, description is provided on the acquisition of images and the extraction of objects, backgrounds, and events in Step S21, with reference to FIG. 3.

Figure 3:
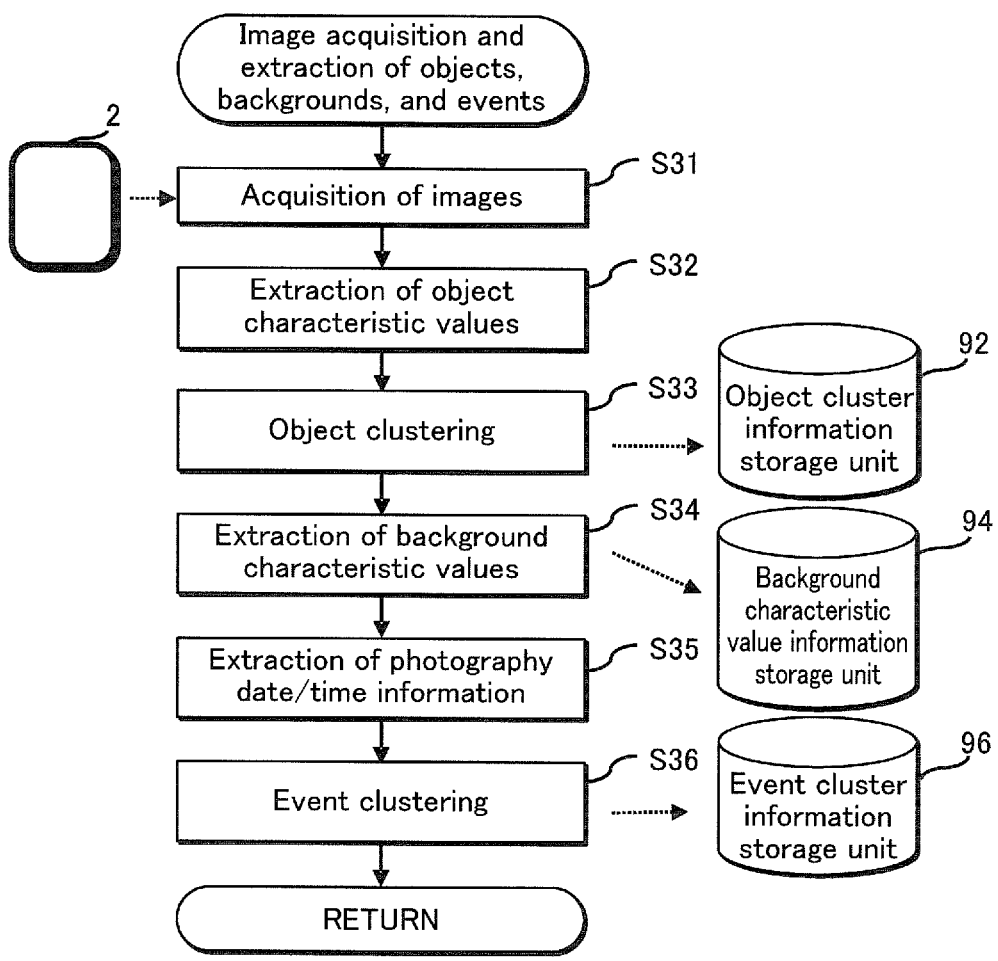
FIG. 3 is a flowchart illustrating details of acquisition of images and extraction of objects, backgrounds, and events.

As illustrated in FIG. 3, the image acquisition unit 10 acquires image data stored in the recording medium 2 (S31).

Figure 4:
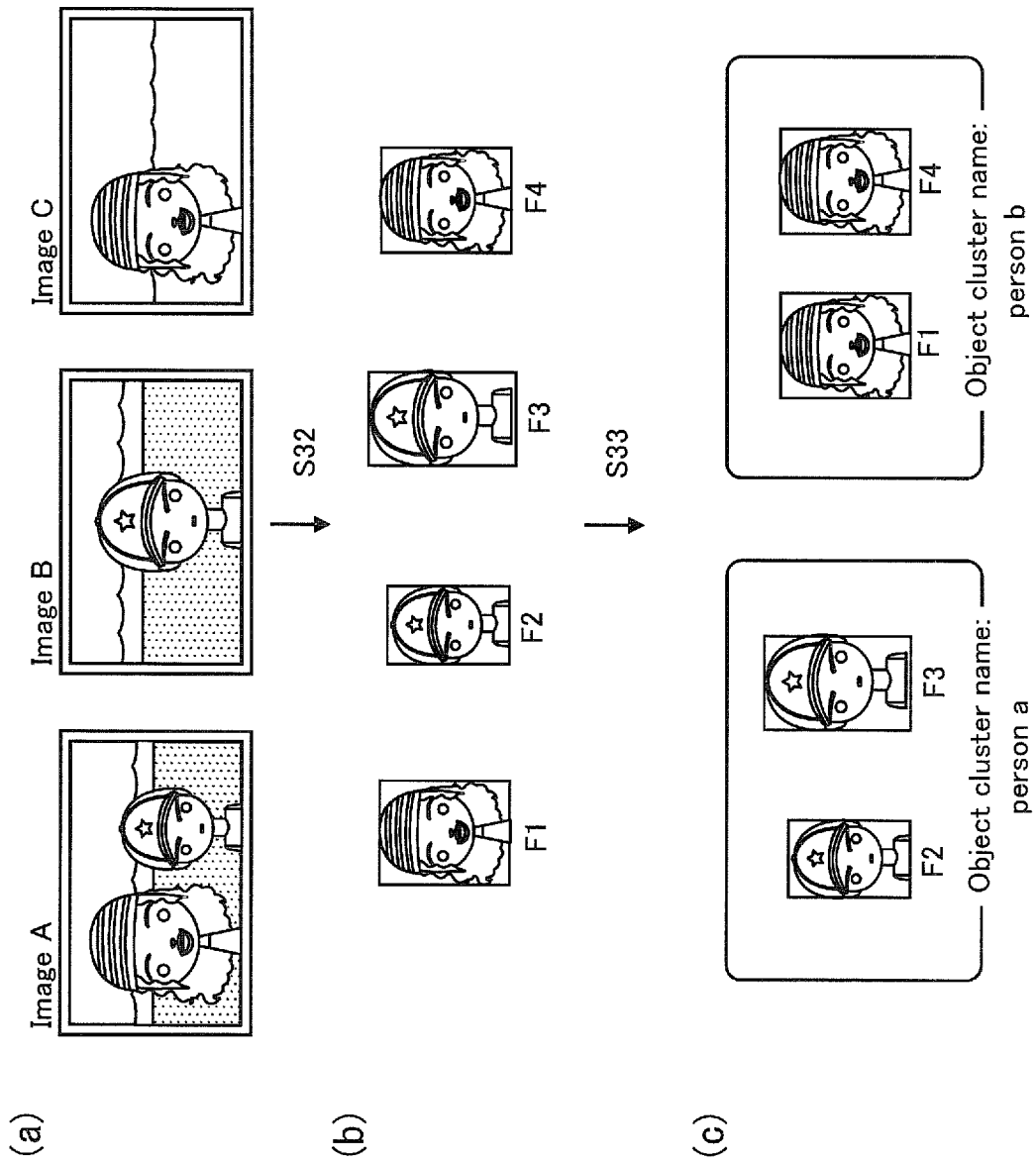
FIG. 4 is an image diagram illustrating a specific example of operations involved in object clustering.

In the following, description is provided assuming that the recording medium 2 stores image data including three images A through C. Accordingly, the image acquisition unit 10 acquires the image data including the images A through C. As illustrated in FIG. 4, person a and person b appear in the images A through C.

Subsequently, the object extraction unit 20 cuts out areas corresponding to the faces from the images A through C and extracts face characteristic values from the images A through C (S32). Here, a face characteristic value extracted from an image includes characteristics of the face in the image such as an outline of the face and a ratio (occupation degree) of the area corresponding to the face to the entire area of the image.

Following this, the object clustering unit 22 performs clustering by using the face characteristic values and stores object cluster information obtained as a result of the clustering to the object cluster information storage unit 92 (S33).

Subsequently, the background characteristic value extraction unit 41 included in the background extraction unit 40 extracts background characteristic values from the images A through C and stores the background characteristic values to the background characteristic value information storage unit 94 (S34). Here, a background characteristic value of an image is information pertaining to a color characteristic value of a background area of the image (an area of the image excluding the area cut out as the object). Details of the background characteristic values are described later, with reference to FIG. 6.

Following this, the photography date/time information extraction unit 31 included in the event extraction unit 30 extracts photography date/time information from the images A through C (S35). Here, the photography date/time information of an image is extracted from the Exif (Exchangeable image file format) information appended to the image. The Exif information is commonly appended to images photographed by using a digital camera or the like. Subsequently, the event clustering unit 32 performs clustering with respect to the images A through C by using the photography date/time information and stores event cluster information obtained as a result of the clustering to the event cluster information storage unit 96 (S36).

In the following, specific description is provided on the operations involved in Steps S32 and S33, with reference to FIG. 4. The object characteristic value extraction unit 21 cuts out four faces F1 through F4 from the three images A through C (portion (a) of FIG. 4) and extracts a characteristic value of each of the faces F1 through F4 (portion (b) of FIG. 4). Subsequently, the object clustering unit 22 performs clustering with respect to the faces F1 through F4 such that faces F2 and F3, which are similar to each other, are classified as person a, and faces F1 and F4, which are similar to each other, are classified as person b (portion (c) of FIG. 4).

Figure 5:
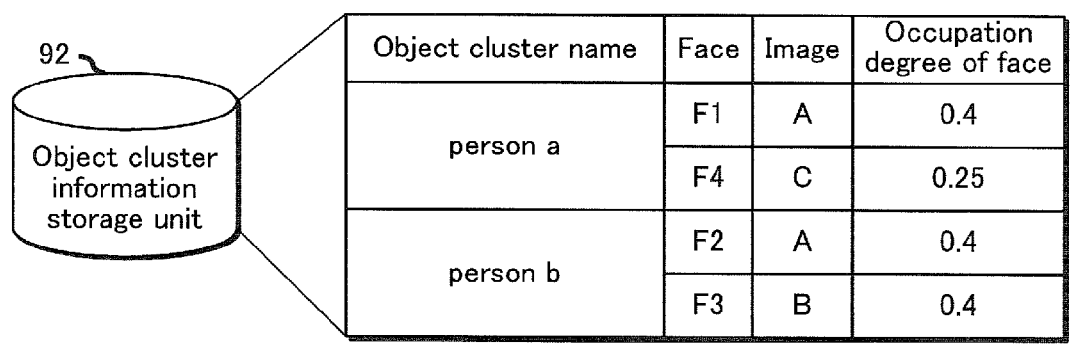
FIG. 5 illustrates a data structure of object cluster information.

FIG. 5 illustrates a data structure of the object cluster information obtained as a result of the object clustering (S33). The object cluster information is information indicating a person cluster to which each of the faces appearing in the images belongs to and includes items such as "object cluster name", "face", "image", and "occupation degree of face".

In the following, specific description is provided on the operations involved in Step S34, with reference to FIG. 6. The background characteristic value extraction unit 41 divides each of the three images A through C (portion (a) of FIG. 6) into 32 segments (portion (b) of FIG. 6). For each of the segments corresponding to the background area of an image, which is an area of the image excluding the area of the face, the background characteristic value extraction unit 41 extracts a color appearing most frequently in the segment as a representative color and creates, as the background characteristic value of the image, a histogram indicating the representative colors of the segments of the image (portion (c) of FIG. 6).

In addition, in order as to remove bias in the background characteristic values of the images resulting from the differences in the sizes of the areas of the faces in the images, the background characteristic value extraction unit 41 multiplies, to each of the background characteristic values, 32/the number of segments corresponding to the background area (i.e., performs normalization). Note that the number 32 above indicates the total number of segments into which each of the images are divided. In specific, the background characteristic value extraction unit 41 multiplies 32/18, 32/25, and 32/22 to the background characteristic value of image A, the background characteristic value of image B, and the background characteristic value of image C, respectively.

Here, to provide an example of the background characteristic values of the images A, B, and C, the background characteristic value extraction unit 41 creates, as a background characteristic value for each of the images A, B, and C, a histogram which indicates, by using five colors (black, white, red, green, and blue), the representative colors of the segments included in each of an upper portion and a lower portion of the corresponding image.

Figure 7:
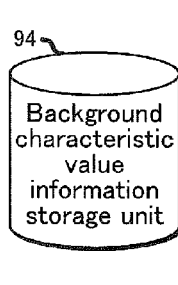
FIG. 7 illustrates a data structure of the background characteristic values.

Further, the background characteristic value extraction unit 41 stores the normalized background characteristic values to the background characteristic value information storage unit 94 (refer to FIG. 7).

Figure 8:
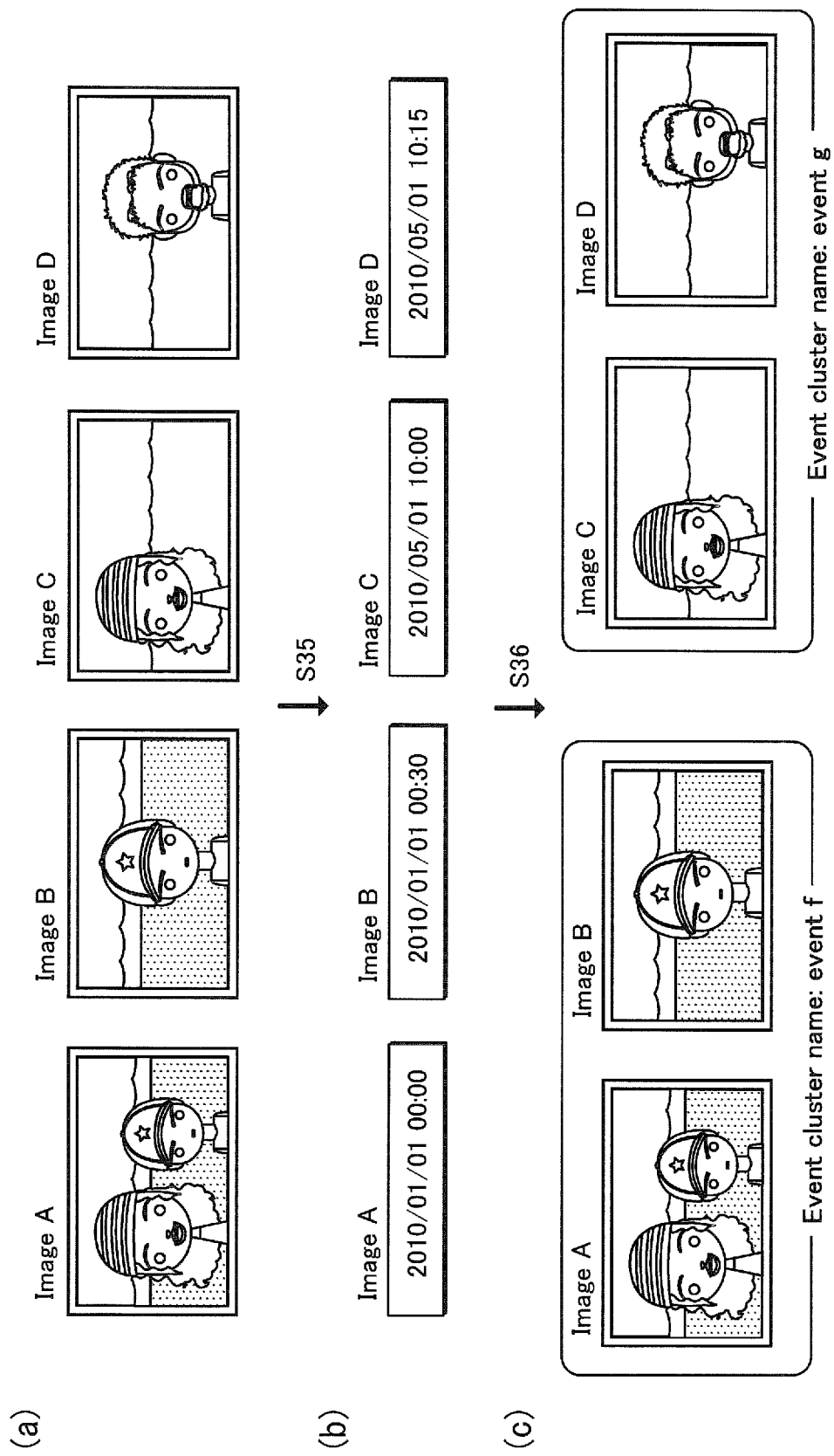
FIG. 8 is an image diagram illustrating a specific example of operations involved in event clustering.

In the following, specific description is provided on the operations involved in Steps S35 and S36, with reference to FIG. 8. The photography date/time extraction unit 31 extracts a photography date/time (portion (b) of FIG. 8) from each of four images A through D (portion (a) of FIG. 8). As for the method utilized for extracting the photography date/times from the images, a photography date/time of a given image can be extracted from the Exif information appended to the image. The Exif information is information commonly appended to images photographed by using digital cameras or the like. Subsequently, the event clustering unit 32 performs clustering with respect to the four images A through D by using the four photography date/times such that images A and B, which have close photography date/times, are classified into event f, and images C and D, which have distant photography date/times, are classified into event g (portion (c) of FIG. 8).

Figure 9:
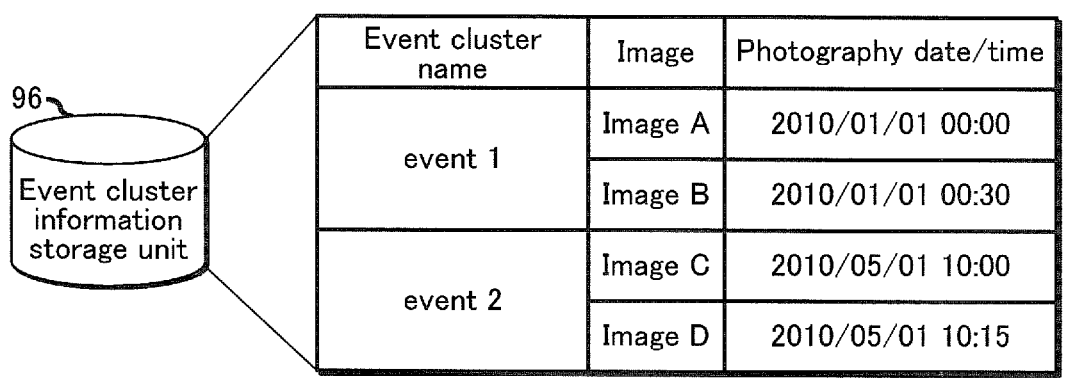
FIG. 9 illustrates a data structure of event cluster information.

FIG. 9 illustrates a data structure of the event cluster information obtained as a result of the event clustering (S36). The event cluster information is information indicating the event clusters to which the images belong to, and includes such items as "event cluster name", "image", and "photography date/time".

Figure 10:
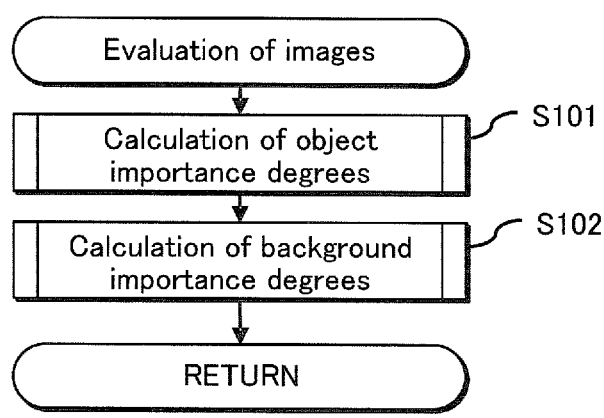
FIG. 10 is a flowchart illustrating details of evaluation of images.

Now, description is continued returning to FIG. 2. In the following, description is provided on the evaluation of images (S22), with reference to FIG. 10. The image evaluation unit 50 calculates object importance degrees of the objects appearing in the images (S101). Subsequently, the image evaluation unit 50 calculates background importance degrees of the images (S102).

Figure 11:
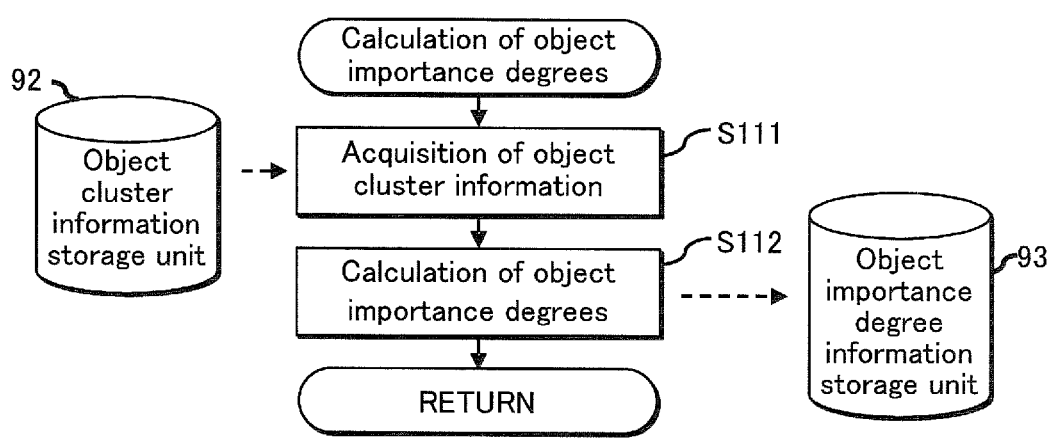
FIG. 11 is a flowchart illustrating details of calculation of object importance degrees.

In the following, description is provided on the calculation of object importance degrees (S101), with reference to FIG. 11. The object importance degree calculation unit 51 acquires the object cluster information from the object cluster information storage unit 92 (S111).

The object importance degree calculation unit 51 calculates an object importance degree for each object cluster according to the object cluster information (S112).

For instance, the object importance degree calculation unit 51 counts, for each object cluster, the number of times objects belonging to the object cluster appear in the images and thereby calculates a frequency degree at which the objects belonging to the object cluster appear in the images. Subsequently, the object importance degree calculation unit 51 calculates the object importance degree of the object cluster such that the object importance degree is in proportion to the frequency degree.

The calculation of object importance degrees is performed in such a manner taking into consideration the tendency of a user frequently photographing objects that the user considers to be important, and is based on the assumption that an object appearing frequently in the entirety of images is an important object for the user.

FIG. 12 illustrates a data structure of object importance degree information obtained as a result of the calculation of object importance degrees. The object importance degree information stored in the object importance degree information storage unit 93 is information indicating an importance degree of each of the objects appearing in the images, and includes such items as "object cluster name", "object importance degree", and "ranking". In the example illustrated in FIG. 12, the object importance degrees of the people appearing in the images, namely person a, person b, and person c are respectively indicated as 30, 20, and 10, and further, the object clusters are each provided with a ranking that is in accordance with the object importance degrees.

Figure 13:
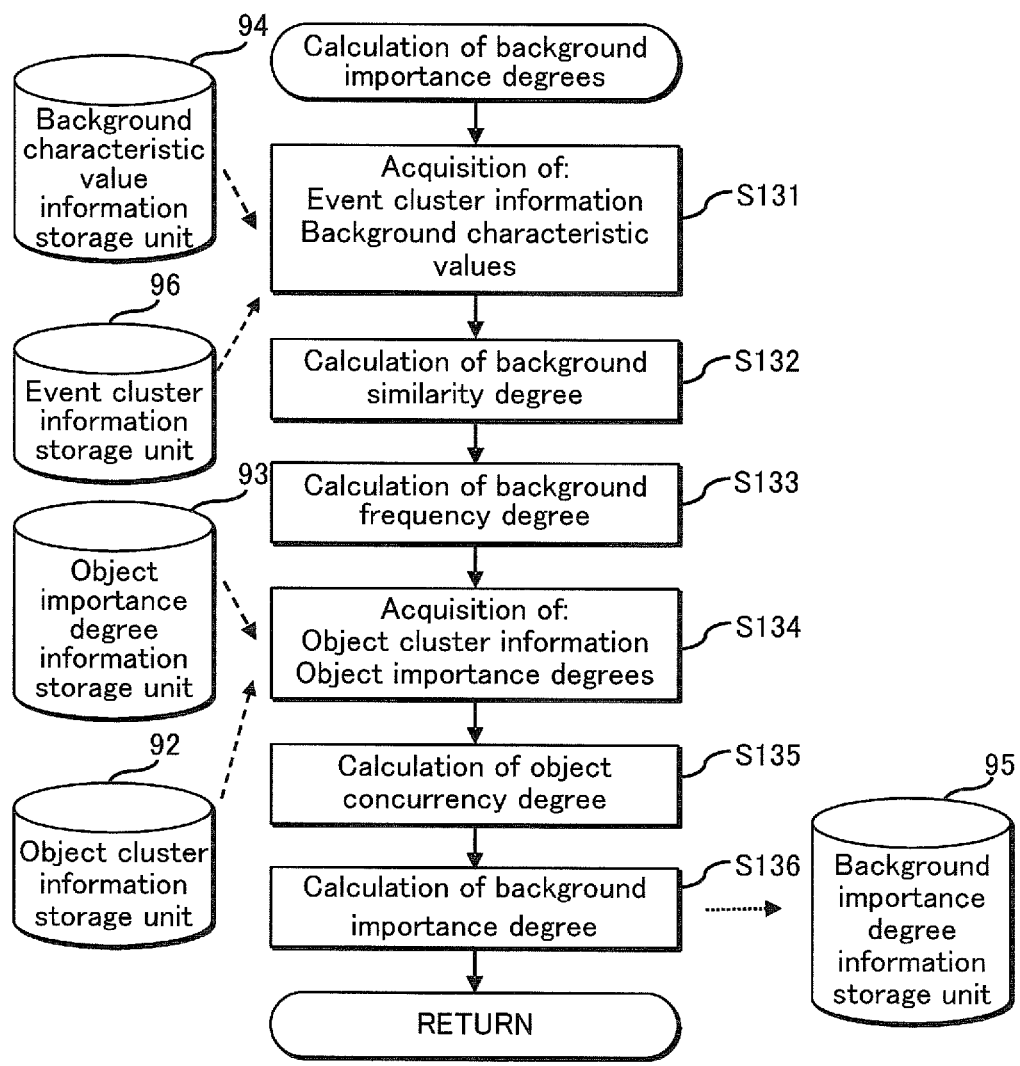
FIG. 13 is a flowchart illustrating details of calculation of background importance degrees.

Now, description on the evaluation of images is continued returning to FIG. 10. In the following, description is provided on the calculation of background importance degrees (S102), with reference to FIG. 13. The background importance degree calculation unit 52 acquires the event cluster information from the event cluster information storage unit 96 and the background characteristic value information from the background characteristic value information storage unit 94 (S131).

The background importance degree calculation unit 52 specifies a group of images belonging to the event cluster selected by the user in Step S23 (refer to FIG. 2) according to the event cluster information and the background characteristic values. Further, the background importance degree calculation unit 52 calculates, for each possible pair of images among the group of images, a similarity degree between the background characteristic values of the pair of images (S132).

For instance, when the group of images corresponding to the selected event cluster includes four images C through F (refer to FIG. 14), the background importance degree calculation unit 52 calculates the similarity degree of the background characteristic degrees of two images included in each possible combination of two images among the four images (in this case, the total number of possible combinations of two images is calculated as $_4C_2=4*3/2=6$ combinations).

Following Step S132, the background importance degree calculation unit 52 calculates, for each of the images belonging to the group of images corresponding to the selected event cluster, a sum of the similarity degrees of the background characteristic values of all possible combinations of the image and another image among the rest of the images as the background frequency degree of the image (S133).

For instance, when the group of images corresponding to the selected event cluster includes the four images C through F (refer to FIG. 14), the background frequency degree of image C is calculated as a sum of the similarity degrees of the background characteristic values of combinations of image C and another one of the rest of the images D through F. That is, the background frequency degree of image C is calculated as follows:

background frequency degree of image C=similarity degree of background characteristic values of images C and D+similarity degree of background characteristic values of images C and E+similarity degree of background characteristic values of images C and F.

The calculation of the background frequency degrees is performed in such a manner taking into consideration the tendency of a user frequently taking photographs of scenes that are important to the user, and is based on the assumption that, when there are a great number of images having similar backgrounds (when the background frequency degree is high), images in which the frequently-appearing background appears indicate an important scene for the user.

Subsequently, the background importance degree calculation unit 52 acquires the object cluster information from the object cluster information storage unit 92 and the object importance degrees from the object importance degree information storage unit 93 (S134).

The background importance degree calculation unit 52 calculates, for each of the images belonging to the selected event cluster, an object concurrency degree according to the object cluster information, the object importance degrees, and the similarity degrees between the background characteristic values of the images calculated in S132 (S135). The object concurrency degree for a given image indicates a degree at which important people appear (are concurrent) in other images having similar backgrounds as the given image.

The calculation of the object concurrency degrees is performed in such a manner taking into consideration the tendency of a user frequently photographing people in important scenes, and is based on the assumption that an image having a similar background as an image including a person is an important image for the user.

Subsequently, the background importance degree calculation unit 52 calculates background importance degrees of the images belonging to the selected event cluster according to the background frequency degrees and the object concurrency degrees and stores the background importance degrees to the background importance degree information storage unit 95 (S136).

In the following, specific description is provided on Steps S132 through S136, with reference to FIG. 14.

Figure 14:
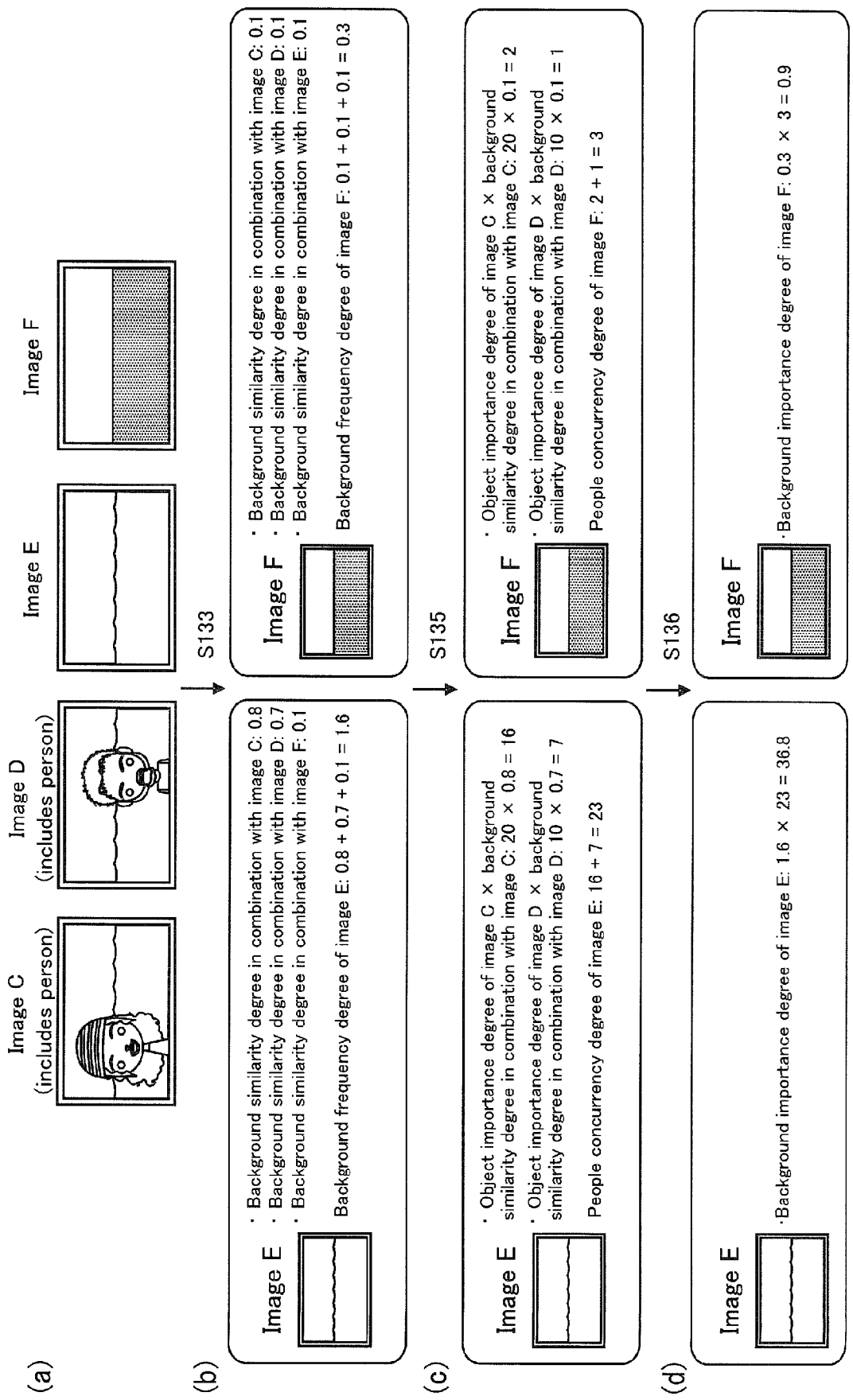
FIG. 14 illustrates a specific example of operations involved in the calculation of the background importance degrees.

Among the images C through F illustrated in portion (a) of FIG. 14, images C through E are images photographed at the seaside, and image F is an image photographed on a road.

Due to this, the background similarity degrees (indicating values within the range between zero and one, where the degree of similarity between backgrounds of two images is lowest when indicating zero and highest when indicating one) of combinations of two images among images C through E indicate relatively high values. For instance, the background similarity degree of a combination of images C and E is 0.8, and the background similarity degree of a combination of images D and E is 0.7.

In contrast, the background similarity degrees for combinations of two images including image F indicate relatively low values. In specific, the background similarity degree of a combination of images C and F, the background similarity degree of a combination of images D and F, and the background similarity degree of a combination of images E and F commonly indicate 0.1.

Portion (b) of FIG. 14 illustrates an example of the calculation of background frequency degrees. As illustrated in portion (b) of FIG. 14, the background frequency degree of image E (1.6) is a sum of the background similarity degree of the background characteristic values of the combination of images C and E (0.8), (ii) the background similarity degree of the background characteristic values of the combination of images D and E (0.7), and the background similarity degree of the background characteristic values of the combination of images E and F (0.1).

Portion (c) of FIG. 14 illustrates an example of the calculation of people concurrency degrees (object concurrency degrees). The people concurrency degree of each of images E and F is calculated by multiplying the importance degree of the person appearing in image C and the background similarity degree of the background characteristic values of the combination of image C and the corresponding image, multiplying the importance degree of the person appearing in image D and the background similarity degree of the background characteristic values of the combination of image D and the corresponding image, and summing the products of the multiplication.

Finally, the background importance degree of a given image is calculated by multiplying the background frequency degree of the image and the people concurrency degree of the image (portion (d) of FIG. 14).

FIG. 14 illustrates an example where the background importance degrees of images E and F, among the images C through F, are calculated. In this example, the background importance degree of image E, which has a background similar to the backgrounds of images including people, is calculated so as to be relatively high, whereas the background importance degree of image F is calculated so as to be relatively low.

Figure 15:
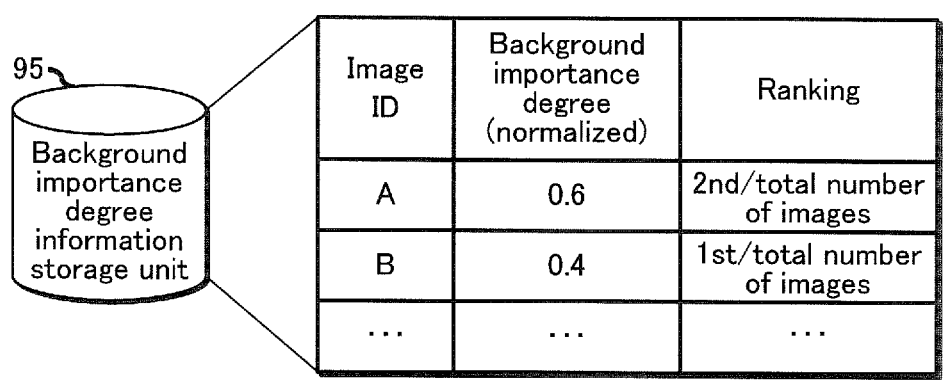
FIG. 15 illustrates a data structure of the background importance degrees.

FIG. 15 illustrates a data structure of the background importance degrees obtained as a result of the calculation of background importance degrees (S136). The background importance degree is information indicating the importance degree of a background in an image, which is defined as an area of the image excluding the area of the image including an object and is indicative of a scene of the event to which the image belongs. The background importance degrees include items such as "image ID", "background importance degree", and "ranking". In the example illustrated in FIG. 15, the background importance degree information storage unit 95 stores the background importance degrees for images A and B, which respectively indicate 0.6 and 0.4, and the ranking of images A and B, which is based on the respective background importance degrees.

Figure 16:
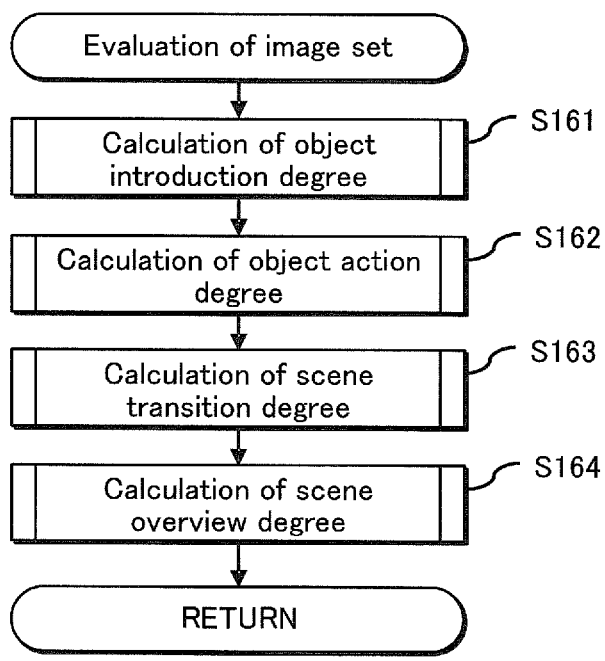
FIG. 16 is a flowchart illustrating details of evaluation of image sets.
Figure 17:
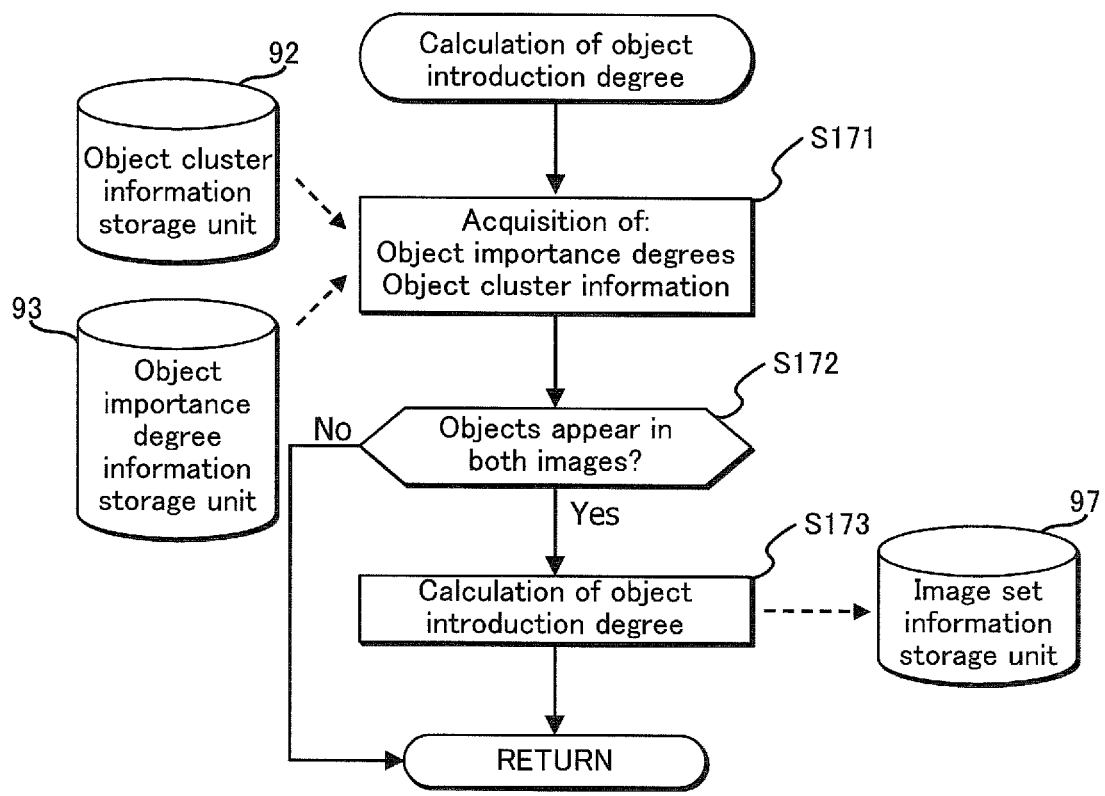
FIG. 17 is a flowchart illustrating details of calculation of an object introduction degree.

Now, description is continued returning to FIG. 2. In the following, description is provided on the evaluation of image sets (S26), with reference to FIG. 16.

The image set evaluation unit 70 performs four types of evaluation as described in the following with respect to two images (an image set) having been set as an evaluation target as a result of processing in Steps S23 through S25 in FIG. 2.

First, the image set evaluation unit 70 calculates an object introduction degree of the image set (S161). The object introduction degree evaluates whether or not the image set is a combination of images each including a different important person.

Subsequently, the image set evaluation unit 70 calculates an object action degree of the image set (S162). The object action degree evaluates whether or not the image set is a combination of images that were taken in the same important scene and that include the same important person.

Following this, the image set evaluation unit 70 calculates a scene transition degree of the image set (S163). The scene transition degree evaluates whether or not the image set is a combination of images that each indicate a different important scene.

Finally, the image set evaluation unit 70 calculates a scene overview degree of the image set (S164). The scene overview degree evaluates whether or not the image set is a combination of images that were taken at the same important scene and in which a person appears occupying a great area in one image and a small area in the other.

By performing the four types of evaluation as described above with respect to each possible combination of images in the images belonging to the selected event cluster, image sets having the following characteristics can be determined. That is, (i) image sets that show the participants of the selected event can be determined (object introduction degree), (ii) image sets that show actions in the selected event of a specific person among the participants of the selected event can be determined (object action degree), (iii) image sets that show places that the participants of the selected event visited in the selected event can be determined (scene transition degree), and (iv) image sets showing details of a specific place that the participants of the selected event visited in the selected event can be determined (scene overview degree).

In other words, by evaluating every possible combination of images by performing the four types of evaluation described above, combinations of images that enable a user to efficiently look back at the selected event in terms of: (i) who participated in the event; (ii) what a specific person did in the event; (iii) what places were visited in the event; and (iv) what a specific place visited in the event was like, can be determined. Subsequently, specific description is provided on the method utilized for performing each of the four types of evaluation with respect to an image set.

In the following, description is provided on the calculation of object introduction degree (S161), with reference to FIG.

17. The object introduction degree calculation unit 71 acquires the object cluster information from the object cluster information storage unit 92 and the object importance degrees from the object importance degree information storage unit 93 (S171).

When the object introduction degree calculation unit 71 judges, according to the object cluster information and the object importance degree information, that objects do not appear in both images of the image set (S172: No), processing proceeds to Step S162 in FIG. 16. In contrast, when judging that objects appear in both images of the image set (S172: Yes), the object introduction degree calculation unit 71 calculates the object introduction degree of the image set by calculating a sum of the object importance degrees of the objects appearing in the image set and stores the object introduction degree of the image set to the image set information storage unit 97 (S173).

The calculation of the object introduction degree of the image set is performed in such a manner taking into consideration the tendency of the user looking back at each of the members having participated in the selected event, and is based on the assumption that an image set that is a combination of images each including a different important person is an important image set.

In the following, specific description is provided on Step S173, with reference to FIG. 18. When eight images G through N (portion (a) of FIG. 18) belong to the selected event cluster and when, for instance, calculating the object introduction degree of an image set GH (a combination of images G and H), the object introduction degree calculation unit 71 calculates a sum of the object importance degrees of person b and person c appearing in image G and person a appearing in image H and sets the sum of the object importance degrees as the object introduction degree of the image set GH (portion (b) of FIG. 18).

Figure 18:
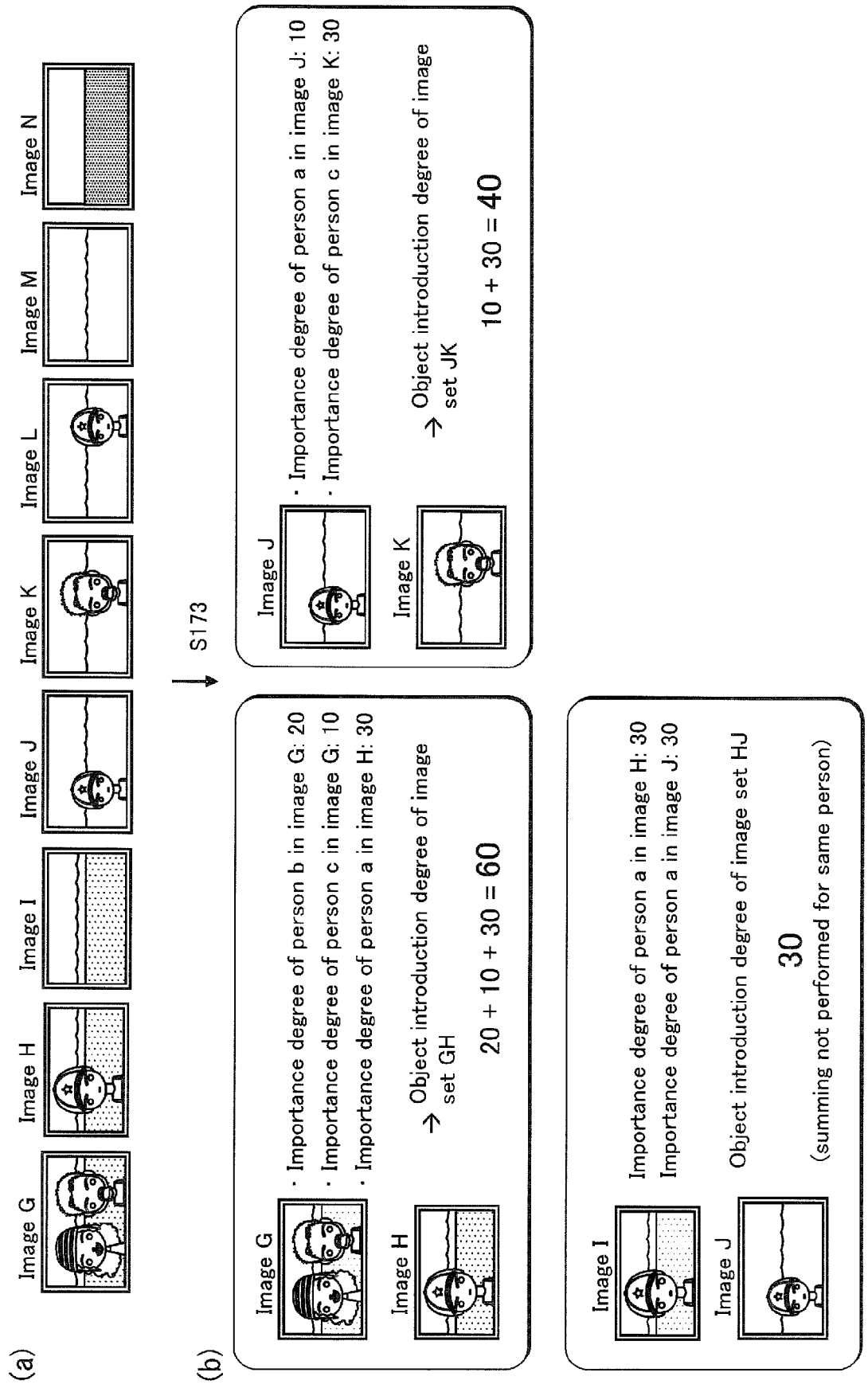
FIG. 18 is an image diagram illustrating a specific example of operations involved in the calculation of the object introduction degree.

In portion (b) of FIG. 18, object introduction degrees are calculated of the image set GH and an image set JK (a combination of images J and K). Here, among the eight images G through N, images G through I are images photographed at the seaside, images J through M are images photographed on the sea, and image N is an image photographed on a road. In this example, the object introduction degree of the image set GH, in which all family members appear, indicates a relatively high value. In contrast, the object introduction degree of the image set JK, in which not all of the family members appear, indicates a relatively low value.

Note that, with respect to an image set HJ indicated in the bottom left part of portion (b) of FIG. 18, the summing of object importance degrees of the objects appearing in the images is not performed. This is since only the same person a appears in both images H and J. That is, the summing of object importance degrees of objects appearing in images of an image set is not performed when the image set is a combination of images including only the same person. This is based on the assumption that the combination of the same person does not contribute in the introduction of various people appearing in the images (i.e., a combination of different people is considered to be more desirable).

Figure 19:
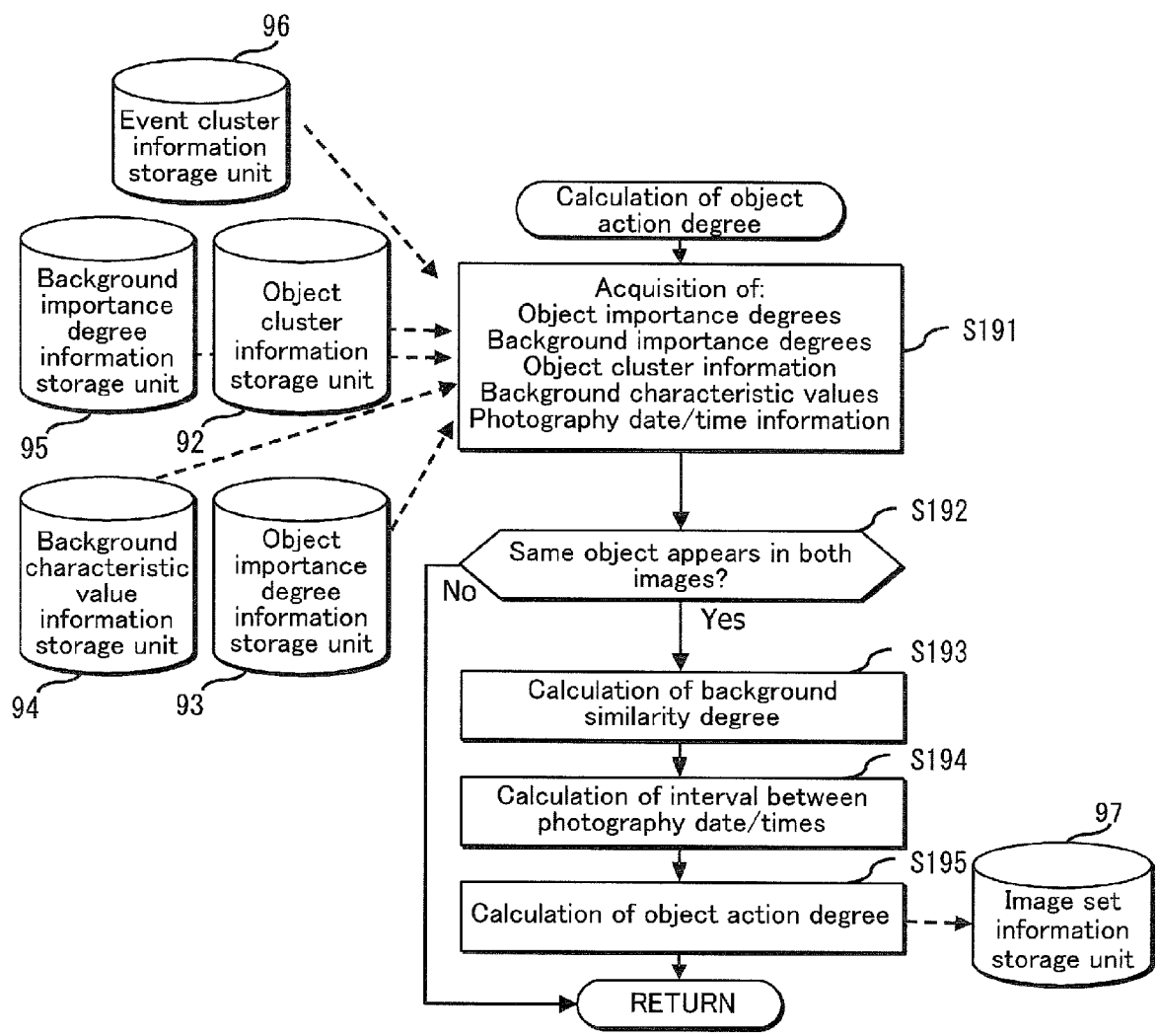
FIG. 19 is a flowchart illustrating details of calculation of an object action degree.

In the following, description is provided on the calculation of the object action degree (S162), with reference to FIG. 19. The object action degree calculation unit 73 acquires the object cluster information from the object cluster information storage unit 92, the object importance degrees from the object importance degree information storage unit 93, the background characteristic values from the background characteristic value information storage unit 94, the background importance degrees from the background importance degree information storage unit 95, and the photography date/time information from the event cluster information storage unit 96 (S191).

When the object action degree calculation unit 73 judges, according to the object cluster information, that the same object does not appear in both images of the image set (S192: No), processing proceeds to Step S163 in FIG. 15. In contrast, when judging that the same object appears in both images of the image set (S192: Yes), the object action degree calculation unit 73 calculates the background similarity degree of the background characteristic values of the images of the image set (S193). Subsequently, the object action degree calculation unit 73 calculates an interval between the photography date/times of the images of the image set (S194). Further, the object action degree calculation unit 73 calculates the object action degree of the image set according to the background similarity degree of the background characteristic values of the images of the image set, the interval between the photography date/times of the images of the image set, the object importance degrees of the objects appearing in the images of the image set, and the background importance degrees of the images of the image set, and stores the object action degree of the image set to the image set information storage unit 97 (S195).

The calculation of the object action degree of the image set is performed in such a manner taking into consideration the tendency of the user looking back at what the family members having participated in the selected event did in the selected event, and is based on the assumption that an image set that is a combination of images photographed in the same scene and in which the same important person appears is an important image set.

In the following, specific description is provided on Steps S193 through S195, with reference to FIG. 20.

Figure 20:
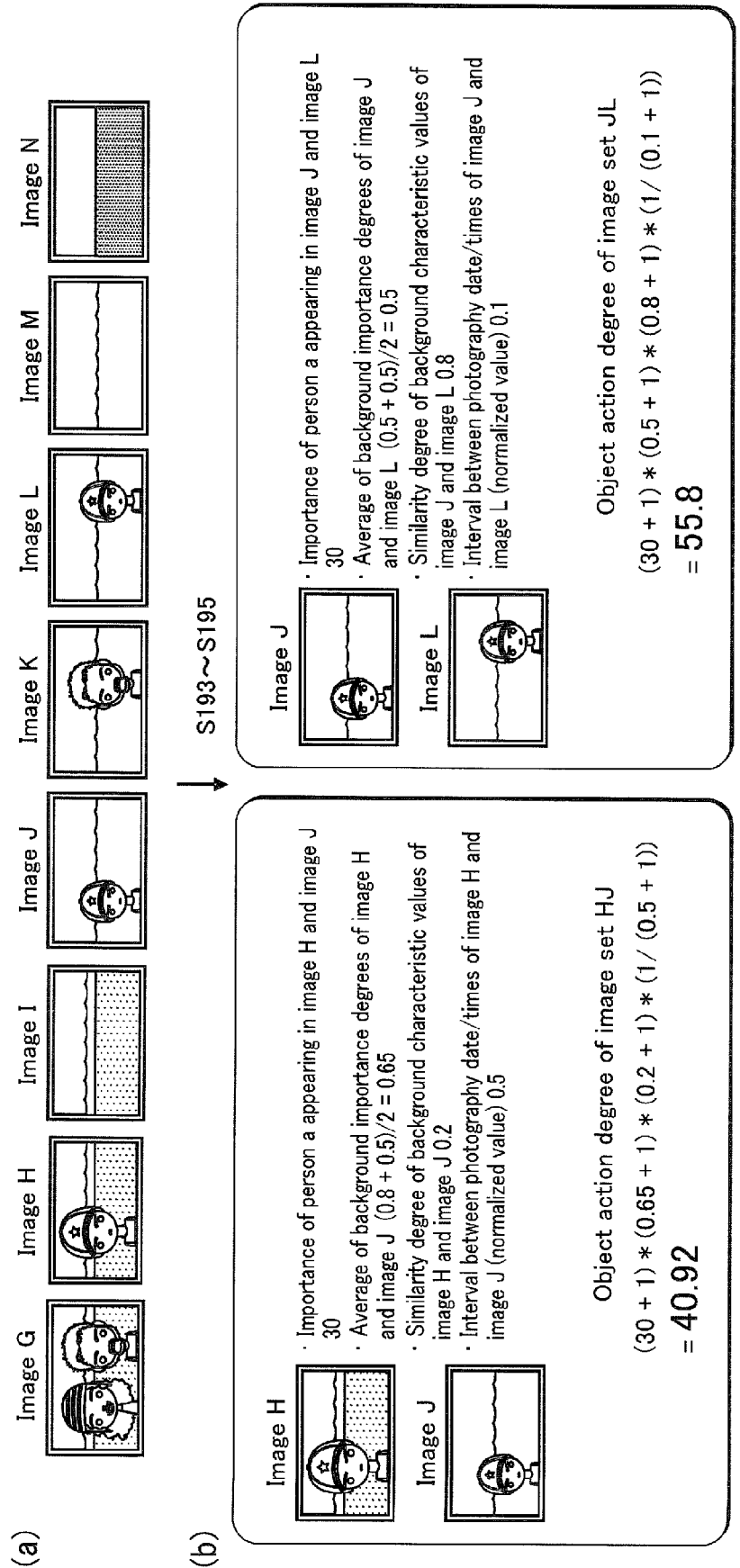
FIG. 20 is an image diagram illustrating a specific example of operations involved in the calculation of the object action degree.

In FIG. 20, the eight images G through N constitute a group of images belonging to an event cluster corresponding to a single event.

The object action degree calculation unit 73 specifies, as image sets with respect to which the calculation of object action degree is to be performed, image sets HJ, JL, and HL among the images G through N. The image sets HJ, JL, and HL are each a combination of images in which the same object appears.

In portion (b) of FIG. 20, illustration is provided of the procedures for calculating the object action degrees of images sets HJ and JL among the image sets HJ, JL, and HL.

More specifically, in order as to calculate the object action degree of the image set HJ (a combination of the images H and J), the object action degree calculation unit 73 extracts the object importance degree of person a appearing in both images H and J, calculates the average of the background importance degrees of the images H and J, calculates the background similarity degree of the background characteristic values of the images H and J, and calculates the interval between the photography date/times of the images H and J.

As for the method utilized in calculating the background similarity degree of the background characteristic values of images of an image set, histogram intersection may be utilized (refer to Referenced Document 3).

In addition, as the interval between the photography date/times of images (indicating values within the range between zero and one, where the interval is greatest when indicating zero and smallest when indicating one), normalized values within the range between zero and one are used. More specifically, the object action degree calculation unit 73 calculates the interval between the photography date/times of each possible combination of images belonging to the selected event according to the photography date/time of each of the images belonging to the selected event, and performs normalization on the calculated intervals such that each of the intervals indicates a value within the range between zero and one.

Subsequently, the object action degree calculation unit 73 calculates the object action degree of the image set HJ by multiplying the object importance degree of person a appearing in both images H and J, the average of the background importance degrees of the images H and J, the background similarity degree of the background characteristic values of the images H and J, and the interval between the photography date/times of the images H and J.

In portion (b) of FIG. 20, object action degrees are calculated of the image set HJ and an image set JL (a combination of images J and L), for example. Here, among the eight images G through N, images G through I are images photographed at the seaside, images J through M are images photographed on the sea, and image N is an image photographed on a road.

In this example, the object action degree of the image set JL, in which the same person appears in scenes having similar backgrounds, indicates a relatively high value. In contrast, the object action degree of the image set HJ, in which the same person appears in scenes having different backgrounds, indicates a relatively low value.

Figure 21:
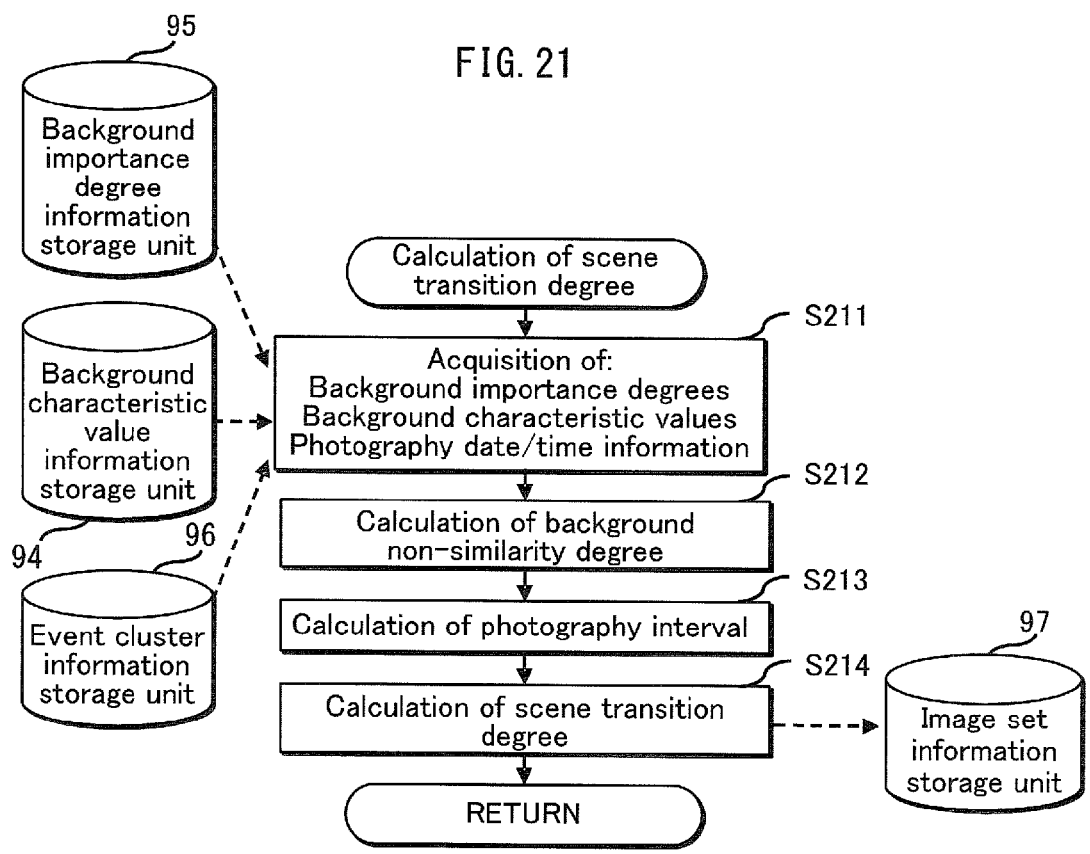
FIG. 21 is a flowchart illustrating details of calculation of a scene transition degree.

In the following, description is provided on the calculation of the scene transition degree (S163), with reference to FIG. 21. The scene transition degree calculation unit 72 acquires the background characteristic values from the background characteristic value information storage unit 94, the background importance degrees from the background importance degree information storage unit 95, and the photography date/time information from the event cluster information storage unit 96 (S211).

The scene transition degree calculation unit 72 calculates a background non-similarity degree (=1−background similarity degree) of the background characteristic values of the images of the image set according to the background characteristic values (S212), and subsequently calculates the interval between the photography date/times of the images of the image set according to the photography date/time information (S213). Following this, the scene transition degree calculation unit 72 calculates the scene transition degree of the image set according to the background non-similarity degree of the background characteristic values of the images of the image set, the interval between the photography date/times of the images of the image set, and the background importance degrees of the images of the image set, and stores the scene transition degree of the image set to the image set information storage unit 97 (S214).

The calculation of the scene transition degree of the image set is performed in such a manner taking into consideration the tendency of the user looking back at different scenes in which the selected event took place, and is based on the assumption that an image set that is a combination of images including different scenes is an important image set.

In the following, specific description is provided on Steps S212 through S214, with reference to FIG. 22. When the eight images G through N (portion (a) of FIG. 22) belong to the selected event cluster and when, for instance, calculating the scene transition degree of an image set IM (a combination of images I and M), the scene transition degree calculation unit 72 calculates an average of the background importance degrees of the images I and M, calculates the background non-similarity degree of the background characteristic values of the images I and M, and calculates the interval between the photography date/times of the images I and M.

Note that the background non-similarity degree of the background characteristic values of the images of the image set is calculated by subtracting the background similarity degree of the background characteristic values of the images of the image set from one. That is the background non-similarity degree of the image set IM is calculated as 0.8 as a result of subtracting the background similarity degree 0.2 of the image set IM from one.

Subsequently, the scene transition degree calculation unit 72 calculates the scene transition degree of the image set IM by multiplying the average of the background importance degrees of the images I and M, the background non-similarity degree of the background characteristic values of the images I and M, and the interval between the photography date/times of the images I and M (portion (b) of FIG. 22).

Figure 22:
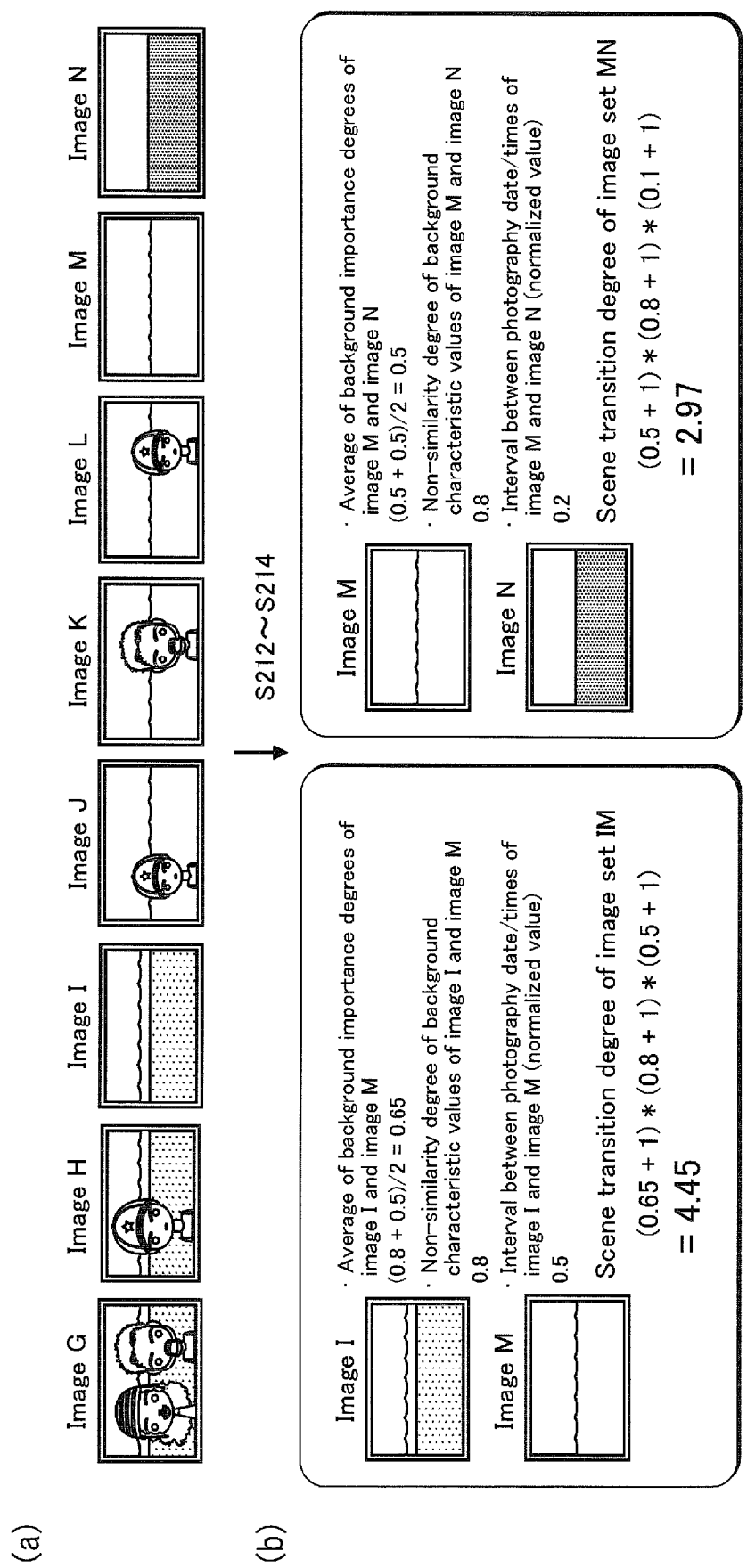
FIG. 22 is an image diagram illustrating a specific example of operations involved in the calculation of the scene transition degree.

In FIG. 22, scene transition degrees are calculated of the image set IM and an image set MN (a combination of images M and N), for example. Here, among the eight images G through N, images G through I are images photographed at the seaside, images J through M are images photographed on the sea, and image N is an image photographed on a road.

The calculation of the scene transition degree is performed such that an image set having a high average background importance degree and indicating a high probability of scene transition between the images of the image set is provided with a relatively high scene transition degree.

That is, when the average background importance degree of images of the image set is relatively high, it can be assumed that the images in the image set have backgrounds that appear in a large number of images in the selected event. As such, such an image set is likely to be an important image set for the user.

In addition, the probability of scene transition between the images of the image set is considered so as to be high when the background non-similarity degree of the background characteristic values of the images of the image set is high and the interval between the photography date/times of the images of the image set is relatively great. This is since it can be assumed that the photographer has moved, and accordingly, the scene has changed between the images of the image set when the backgrounds of the images of the image set indicate non-similarity and a difference lies between the photography date/times of the images of the image set.

Here, it should be noted that the scene transition degree of an image set is a variable focusing more on the transition between scenes appearing in the images of the image set than on people appearing in the images of the image set. Hence, modification may be made such that the calculation of the scene transition degree is not performed for image sets including an image in which a person appears. That is, the calculation of the scene transition degree may be performed only for image sets that are combinations of the three images I, M, and N, in which people do not appear, among the eight images illustrated in portion (a) of FIG. 22. Alternatively, even when not completely excluding image sets that include an image in which an object appears from the target of the calculation of the scene transition degree, modification may be made such that the scene transition degree of an image set including an image in which an object appears is provided with a low evaluation.

In the example illustrated in portion (b) of FIG. 22, the scene transition degree of the image set IM is calculated so as to be higher than the scene transition degree of the image set MN. This is since the image set IM is a combination of images having relatively high background importance degrees and further, the interval between the photography date/times of the images of the image set IM is relatively great.

Figure 23:
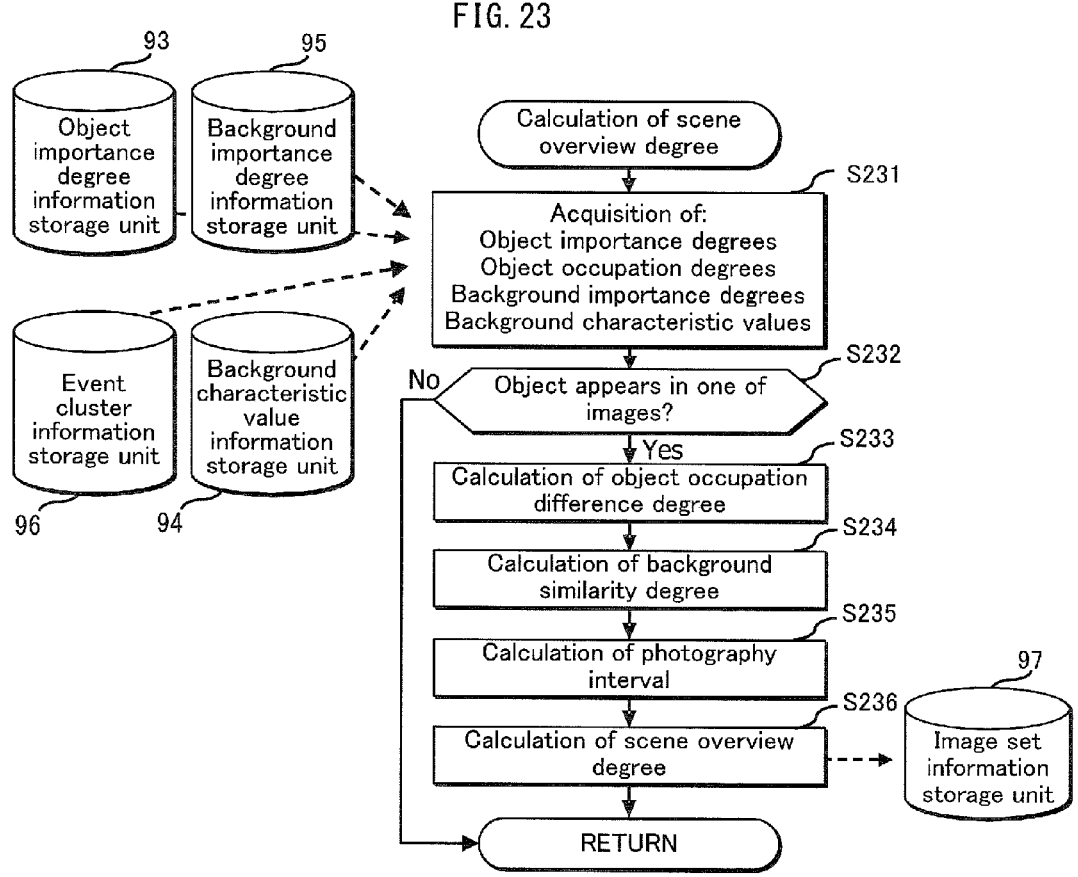
FIG. 23 is a flowchart illustrating details of calculation of a scene overview degree.

In the following, description is provided on the calculation of the scene overview degree (S164), with reference to FIG. 23. The scene overview degree calculation unit 74 acquires the background characteristic values from the background characteristic value information storage unit 94, the background importance degrees from the background importance degree information storage unit 95, the photography date/time information from the event cluster information storage unit 96, the object cluster information from the object cluster information storage unit 92, and the object importance degrees from the object importance degree information storage unit 93 (S231).

When the scene overview degree calculation unit 74 judges, according to the acquired information, that an object does not appear in the images of the image set (S232: No), processing proceeds to Step S28 in FIG. 2. In contrast, when judging that an object appears in at least one of the images of the image set (S232: Yes), the scene overview degree calculation unit 74 calculates an object occupation difference degree of the images of the image set (S233).

Here, the object occupation difference degree of an image set is defined as a difference between the images of the image set in terms of the area occupied by the object occupying the greatest area, among the at least one object appearing in the images of the image set, in the images of the image set. That is, the object occupation difference degree indicates the difference between the area occupied in each of the images of the image set by the object occupying the greatest area in the images.

Subsequently, the scene overview degree calculation unit 74 calculates the background similarity degree of the background characteristic values of the images of the image set (S234). Then, the scene overview degree calculation unit 74 calculates the interval between the photography date/times of the images of the image set (S235). Finally, the scene overview degree calculation unit 74 calculates the scene overview degree of the image set according to the object occupation difference degree of the images of the image set, the background similarity degree of the background characteristic values of the images of the image set, and the interval between the photography date/times of the images of the image set, and stores the scene overview degree of the image set to the image set information storage unit 97 (S236).

The calculation of the scene overview degree of the image set is performed in such a manner taking into consideration the tendency of the user looking back at the details of the scene in which the selected event took place, and is based on the assumption that an image set that is a combination of images photographed in the same scene (indicated by a high background similarity degree of the background characteristic values of the images of the images set and a small interval between the photography date/times of the images of the image set) and in which a person appears occupying a great area in one image and a small area in the other (indicated by a high object occupation difference degree of the images of the image set) is an important image set for the user when looking back at the event.

In the following, specific description is provided on Steps S233 through S236, with reference to FIG. 24. When the eight images G through N (portion (a) of FIG. 24) belong to the selected event cluster and when, for instance, calculating the scene overview degree of an image set HI (a combination of images H and I), the scene overview degree calculation unit 74 calculates the object occupation difference degree of the images H and I, calculates the background similarity degree of the background characteristic values of the images H and I, and calculates the interval between the photography date/times of the images H and I.

Note that, when calculating the object occupation difference degree of the images of the image set in a case where both of the images include a person, the scene overview degree calculation unit 74 calculates the difference between the area occupied in each of the images by the corresponding person. However, in the image set HI, a person appears only in image H. Accordingly, the scene overview degree calculation unit 74 calculates the size (occupation degree) of the person appearing in image H as the object occupation difference degree of the image set HI. Subsequently, the scene overview degree calculation unit 74 calculates the scene overview degree of the image set HI by multiplying the object occupation difference degree of the image set HI, the similarity degree of the background characteristic values of the images H and I, and the interval between the photography date/times of the images H and I (portion (b) of FIG. 24).

Figure 24:
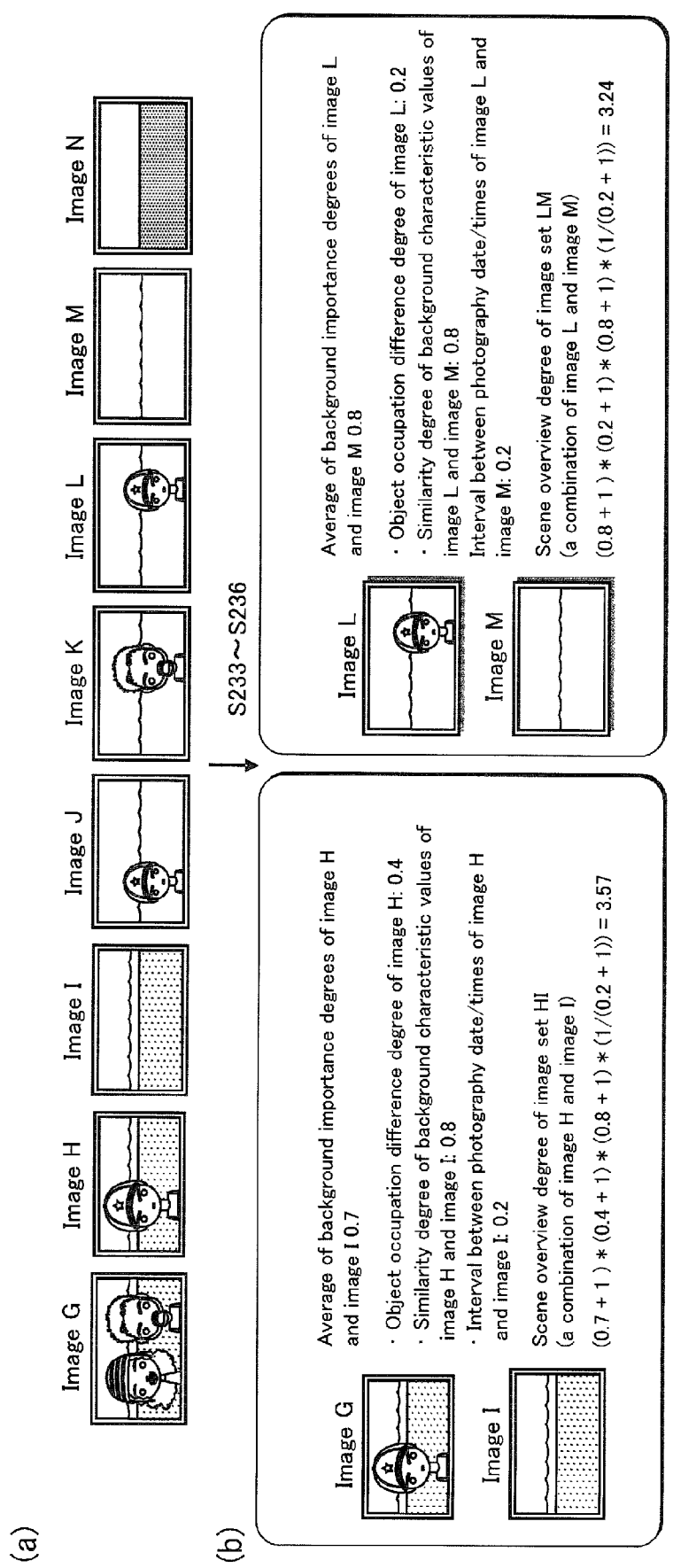
FIG. 24 is an image diagram illustrating a specific example of operations involved in the calculation of the scene overview degree.

In FIG. 24, scene overview degrees are calculated of the image set HI and an image set LM (a combination of images L and M), for example. Here, among the eight images G through N, images G through I are images photographed at the seaside, images J through M are images photographed on the sea, and image N is an image photographed on a road. In this example, the scene overview degree of the image set HI indicates a relatively high value. The image set HI is a combination of the images H and I, which were photographed in the same scene, and further, a person appears occupying a great area in one of the images H and I. In contrast, the object action degree of the image set LM indicates a relatively low value. The image set LM is a combination of images L and M, which were photographed in the same scene, but however, a person appears only occupying a small area in one of the images L and M.

Here, note that the scene overview degree of an image set may be calculated by using the object importance degrees of objects appearing in the images of the image. By performing such a modification, a scene overview degree of an image set in which important people appear indicates a relatively high value.

Figure 25:
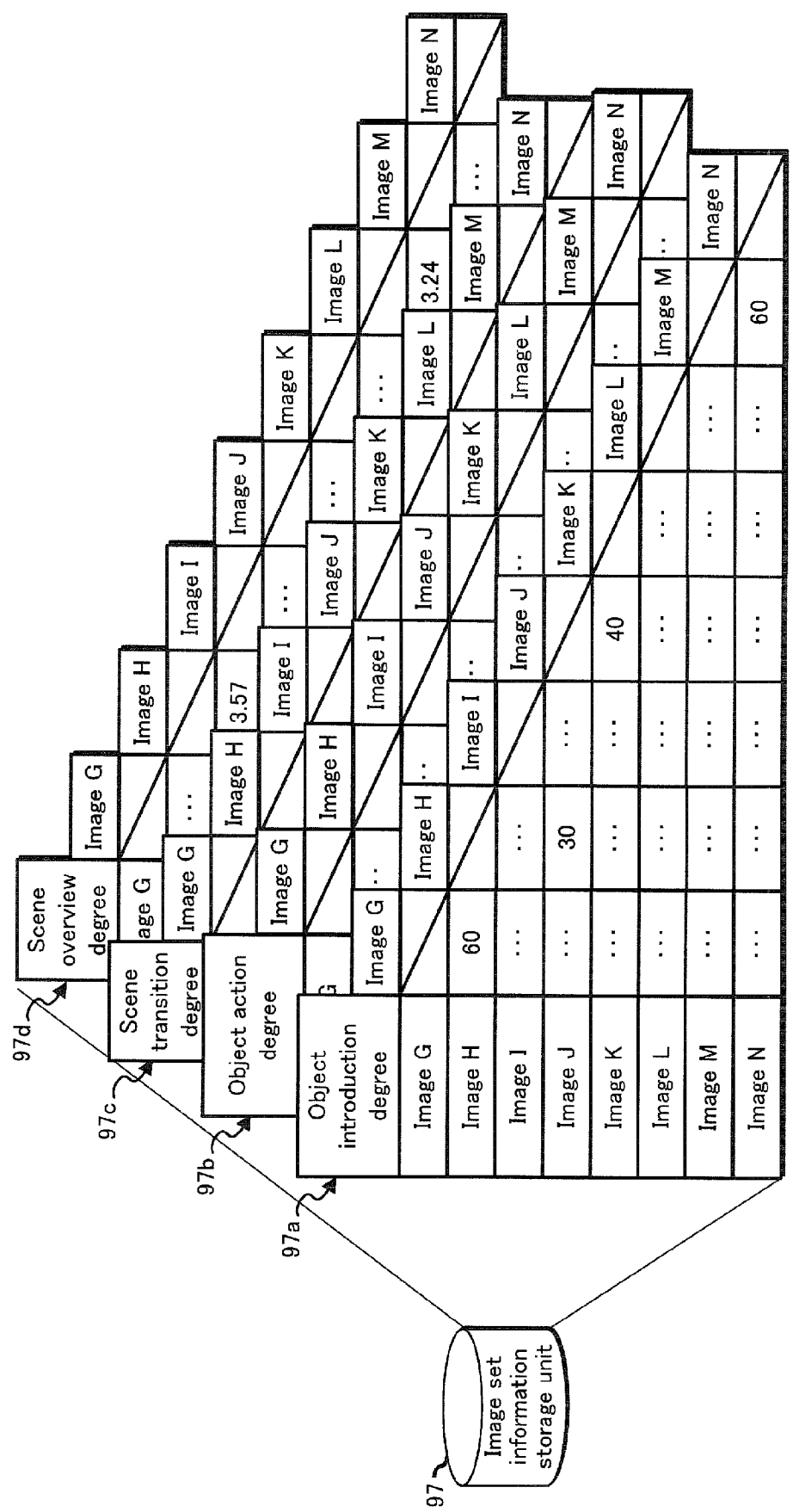
FIG. 25 illustrates a data structure of image set information.

FIG. 25 illustrates a data structure of image set evaluation information including the object introduction degrees, the object action degrees, the scene transition degrees, and the scene overview degrees obtained as a result of the calculation of evaluations of image sets.

The object introduction degree is information evaluating an image set that is a combination of images each including a different important person, among possible combinations of two images among the images belonging to the selected event cluster, as an important image set. The object introduction degrees are stored so as to have a structure such as illustrated in a table 97a in FIG. 25.

The object action degree is information evaluating an image set that is a combination of images including the same important person, among possible combinations of two images among the images belonging to the selected event cluster, as an important image set. The object action degrees are stored so as to have a structure such as illustrated in a table 97b in FIG. 25.

The scene transition degree is information evaluating an image set that is a combination of images each including a different scene, among possible combinations of two images among the images belonging to the selected event cluster, as an important image set. The scene transition degrees are stored so as to have a structure such as illustrated in a table 97c in FIG. 25.

The scene overview degree is information evaluating an image set that is a combination of images including the same scene and in which an important person appears occupying a great area in one image and a small area in the other, among possible combinations of two images among the images belonging to the selected event cluster, as an important image set. The scene overview degrees are stored so as to have a structure such as illustrated in a table 97d in FIG. 25.

In the example illustrated in FIG. 25, the image set information storage unit 97 stores, by employing table structures, the object introduction degrees, the object action degrees, the scene transition degrees, and the scene overview degrees calculated for image sets that are each a combination of two images among the eight images G through N. Note that in the tables 97a through 97b in FIG. 25, indication is made of only values corresponding to FIGS. 18, 20, 22, and 24 while indication of the rest of the values is omitted. However, in actual implementation, each of the columns of the tables 97a through 97b is to include indication of a specific value unless a column corresponds to an evaluation factor for which a value is not calculated. When a column corresponds to an evaluation factor for which a value is not calculated, an indication of a dash "–" is to be made in the column.

Now, description is continued returning to FIG. 2. In the following, description is provided on the evaluation of arrangement patterns (S28), with reference to FIG. 26.

The arrangement pattern evaluation unit 80 acquires the template information from the template information storage unit 91, the image set evaluation information from the image set information storage unit 97, and the event cluster information from the event cluster information storage unit 96 (S261).

The arrangement pattern evaluation unit 80 selects, from among the group of images belonging to the event cluster selected by the user, a number of images corresponding to the number of frames included in the template information selected by the user according to the acquired information, and generates arrangement patterns (S262). Here, each arrangement pattern indicates one possible pattern for arranging the selected images with respect to the frames included in the template information.

Subsequently, the arrangement pattern evaluation unit 80 calculates an evaluation value of an evaluation target arrangement pattern according to information included in the template information that defines an evaluation factor used to evaluate an image set in the evaluation target arrangement pattern arranged with respect to a specific pair of frames, and stores the evaluation value of the evaluation target arrangement pattern to the arrangement pattern information storage unit 98 (S263).

Subsequently, when the arrangement pattern evaluation unit 80 judges that an evaluation value has not been calculated for each one of the arrangement patterns for the group of images belonging to the selected event cluster (S264: No), processing returns to Step S262. When judging that an evaluation value has been calculated for each one of the arrangement patterns (S264: Yes), the arrangement pattern evaluation unit 80 creates an album by using an arrangement pattern provided with the highest ranking among the generated arrangement patterns.

Subsequently, the display control unit 100 displays the created album on the display 4 (S266).

Figure 27:
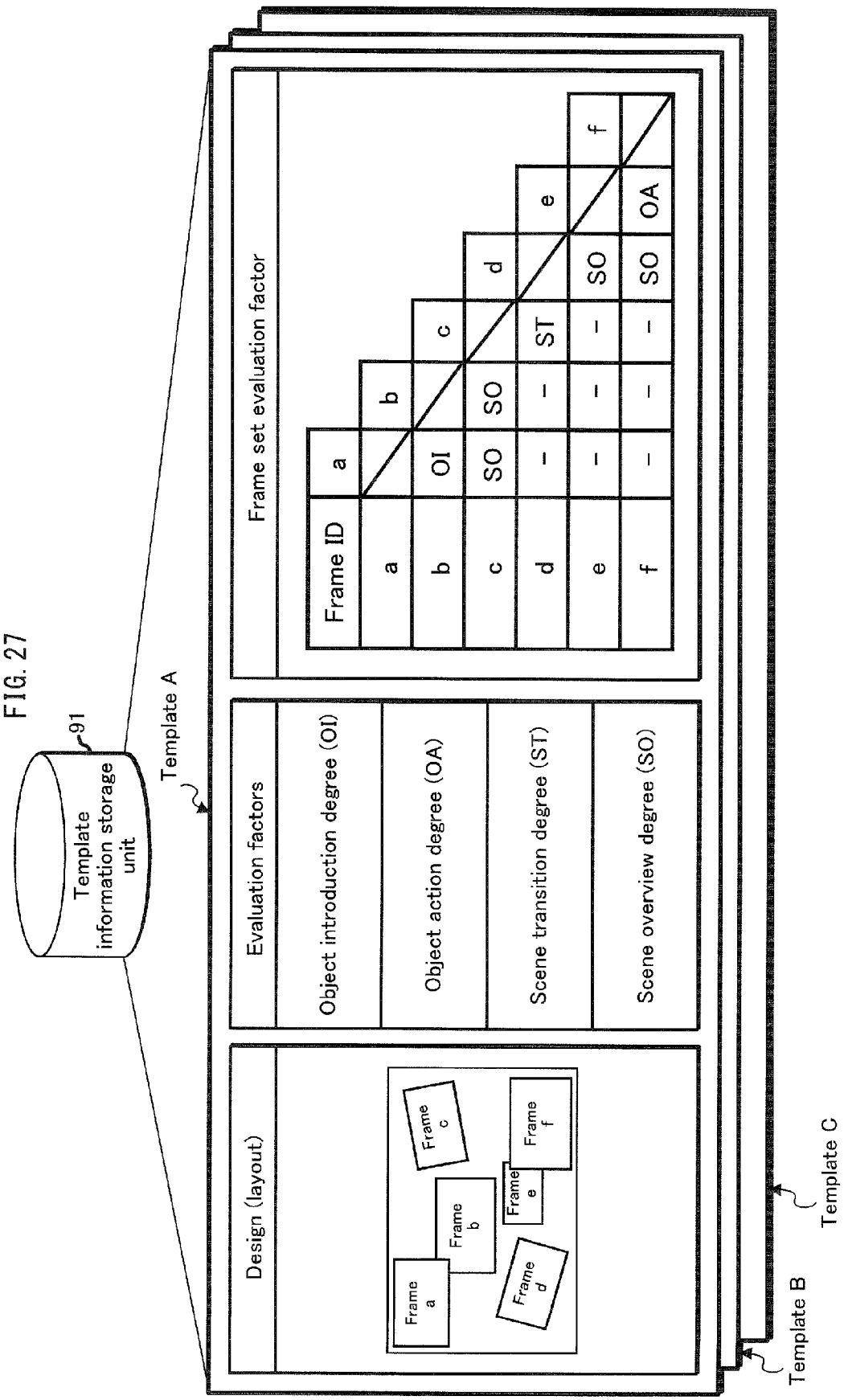
FIG. 27 illustrates a data structure of template information.

FIG. 27 illustrates a data structure of the template information.

The template information includes "design (layout)", "evaluation factors", and "frame set evaluation factor".

In FIG. 27, illustration is provided of details of the template information for template A as one example. However, the template information for templates B and C also have a similar data structure.

The "design" of template A includes information such as: information related to the layout of frames in template A (coordinate positions, sizes, and angles of the frames); information related to each of the frames (background color, pattern, decoration of frame borders, and the like of each of the frames); and information related to the design of a mount of the album to be created (the size, the background color, and the like of the mount).

Although a simplified image is shown in FIG. 27, in actual implementation, various parameters are to be stored in a predetermined database format.

The "evaluation factors" of template A include types of conditions pertaining to characteristic values of images. In the example illustrated in FIG. 27, as conditions used to evaluate combinations of images in the evaluation target arrangement pattern arranged with respect to combinations of frames in template A, the four conditions as follows are indicated: object introduction degree (OI); object action degree (OA); scene transition degree (ST); and scene overview degree (SO).

The "frame set evaluation factor" in template A includes a correspondence table indicating an evaluation factor used to evaluate a pair of images in the evaluation target arrangement pattern arranged with respect to a specific pair of frames, which realizes the determination of an arrangement pattern enabling a user to easily look back at the selected event. For instance, in the correspondence table illustrated in FIG. 27, the object introduction degree (OI) is set as the evaluation factor associated with a frame pair ab.

In the following, specific description is provided on Steps S262 through S263, with reference to FIG. 28.

The description in the following is provided under the premise that the template selected by the user (FIG. 2: S24) is template A. Template A includes six frames a through f.

Figure 28:
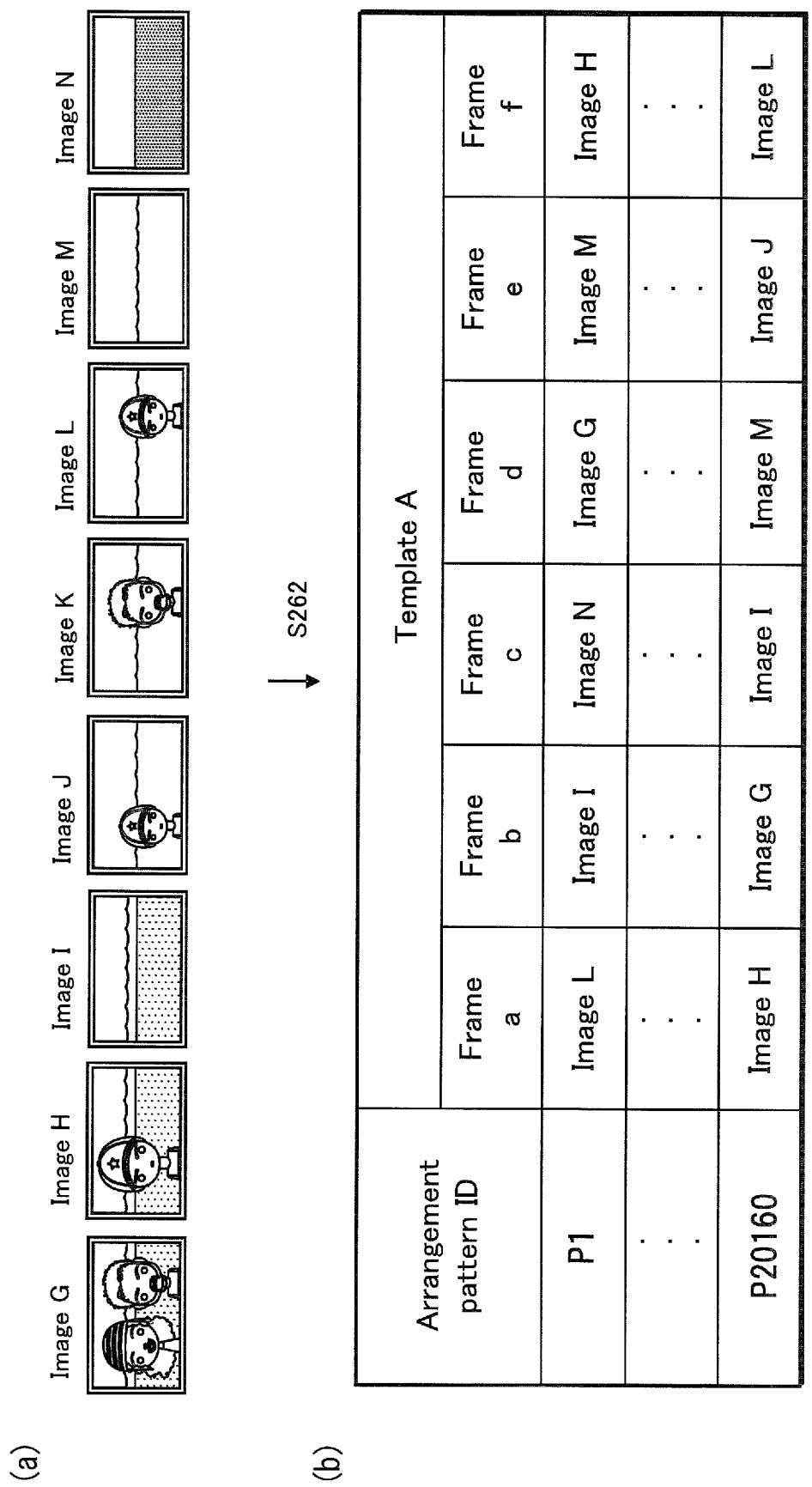
FIG. 28 is a former part of an image diagram illustrating a specific example of operations involved in the evaluation of the arrangement patterns.

Accordingly, the arrangement pattern evaluation unit 80 calculates $_8P_6=8!/(8-6)!=20160$ arrangement patterns (arrangement patterns P1 through P20160) for arranging six images selected from the eight images G through N (portion (a) of FIG. 28) with respect to the six frames included in template A.

Subsequently, the arrangement pattern evaluation unit 80 calculates, for each arrangement pattern, an evaluation value according to the inter-frame conditions defined in the "frame set evaluation factor" in template A.

Figure 29:
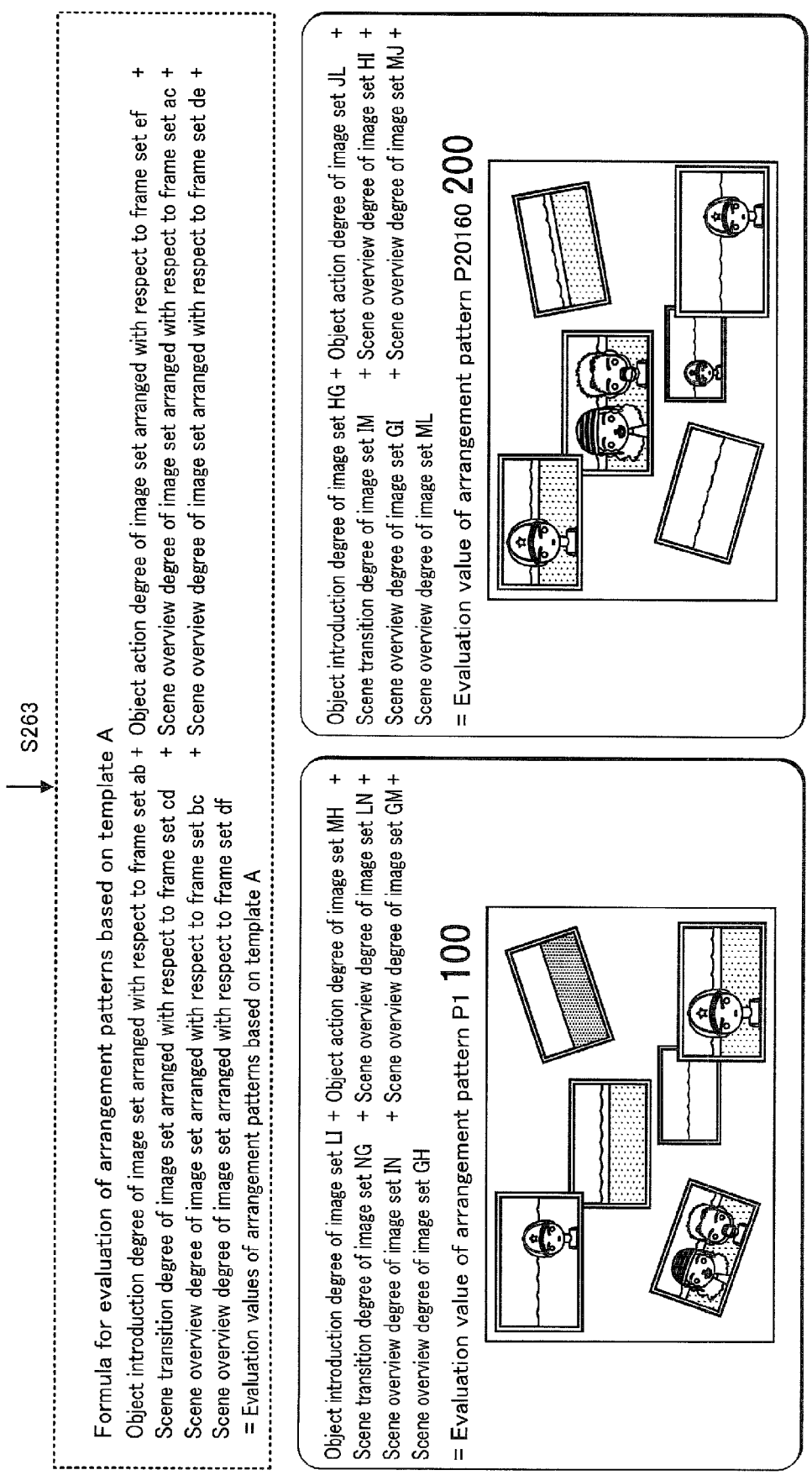
FIG. 29 is a latter part of the image diagram illustrating a specific example of the operations involved in the evaluation of the arrangement patterns.

As illustrated in FIG. 29, the arrangement pattern evaluation unit 80 calculates an evaluation value for each of the arrangement patterns by using the following evaluation factors defined in the "frame set evaluation factor" in template A (refer to FIG. 27):

OI of image set arranged with respect to frame set ab;
SO of image set arranged with respect to frame set ac;
SO of image set arranged with respect to frame set bc;
ST of image set arranged with respect to frame set cd;
SO of image set arranged with respect to frame set de;
SO of image set arranged with respect to frame set df, and
OA of image set arranged with respect to frame set ef.

More specifically, the arrangement pattern evaluation unit 80 calculates an evaluation value for each of the arrangement patterns by summing all of the above described evaluation factors.

In the example illustrated in FIG. 29, the evaluation values for candidate arrangement patterns P1 and P20160 are calculated. In specific, the evaluation value (200) for the arrangement pattern P20160 indicates a higher value than the evaluation value (100) for the arrangement pattern P1.

Figure 30:
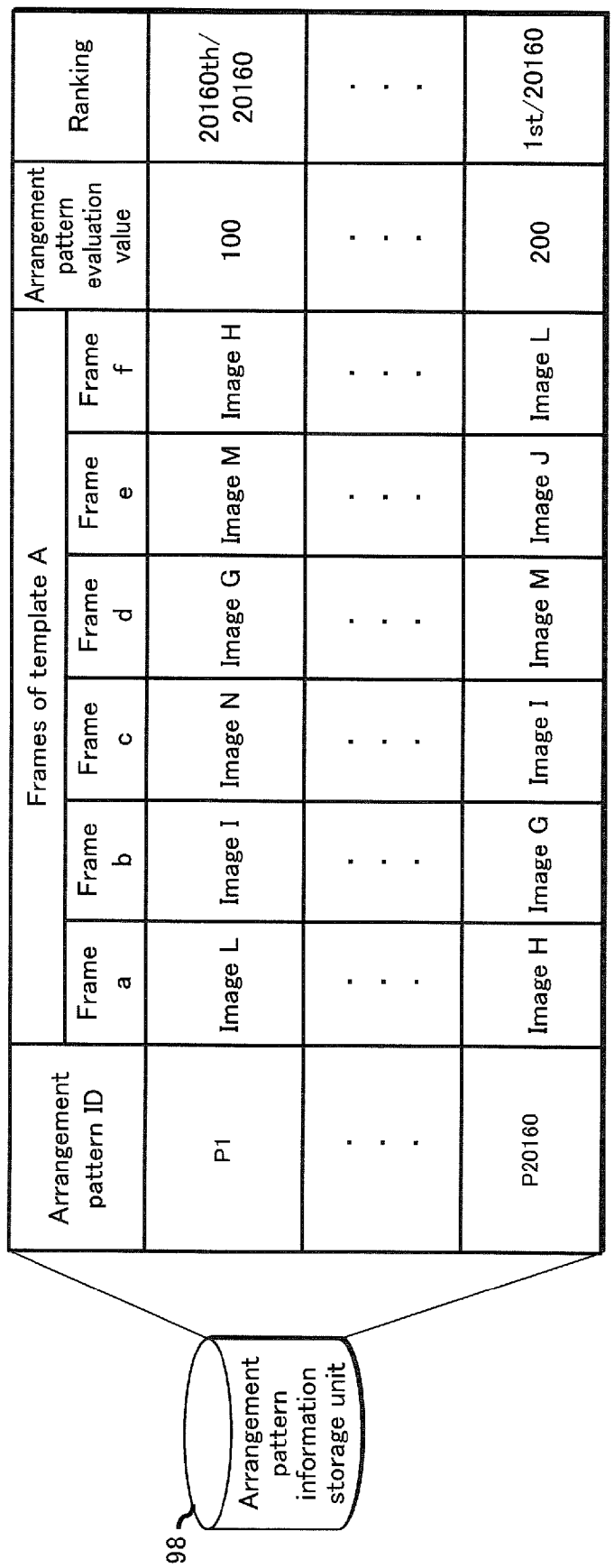
FIG. 30 illustrates a data structure of arrangement pattern information.

FIG. 30 illustrates a data structure of arrangement pattern evaluation values obtained as a result of the calculation of evaluation of arrangement patterns.

The arrangement pattern evaluation values indicate evaluations provided to the arrangement patterns that are based on the group of images belonging to the selected event and the selected template and indicate whether or not each of the arrangement patterns is a combination of images that allows a user to efficiently look back at the selected event. The arrangement pattern evaluation values constitute information including items such as "arrangement pattern ID", "frames of template A" indicating the frames included in template A, "arrangement pattern evaluation value", and "ranking".

In the example illustrated in FIG. 30, the arrangement pattern information storage unit 98 stores an arrangement pattern evaluation value (100) of the arrangement pattern P1 in FIG. 29 for template A, an arrangement pattern evaluation value (200) of the arrangement pattern P20160 in FIG. 29 for template A, and the ranking of the arrangement patterns P1 and P20160 according to the arrangement pattern evaluation values.

Among the arrangement patterns P1 and P20160 illustrated in FIG. 30, the arrangement pattern P20160 provided with the highest ranking (the highest evaluation value) is an arrangement pattern that satisfies each evaluation factor in template A to the greatest extent. As such, an album created according to the arrangement pattern P20160 is an album reflecting the user's demands to the greatest extent.

The example description of which has been provided with reference to FIGS. 28 through 30 involves only a small number of images (eight images). However, the present embodiment is effective even when applied to an enormous number of images photographed in an event and possessed by a user. This is since, in such a case, it is extremely troublesome for the user to manually create an album for the event from the enormous number of images.

In addition, even when the enormous number of images possessed by the user are images pertaining to an event such as a family vacation, the present embodiment realizes selecting a combination of images that is most efficient for looking back at the event and automatically creating an album for the event. This is since, according to the present embodiment, image sets are evaluated by applying the four types of evaluation factors described above.

That is, images photographed during a family vacation differ from images photographed during a wedding ceremony in that no typical composition patterns exist for images photographed during a family vacation. As such, difficulties pertain in the automatic creation of an album from the images photographed during a family vacation when conventional technology is applied. In contrast, the present embodiment realizes the automatic creation of an album from the images photographed during a family vacation.

<Supplement 1>

Although description has been made in the above on an embodiment of the present invention, it is to be understood that the present invention is not limited thereto. The present invention is applicable in various embodiments and modifications which are for achieving the above mentioned aim of the present invention or other aims related or associated thereto. For instance, the following modifications are construed as being within the scope and spirit of the present invention.

(1) Example of a Displayed Album

Figure 31:
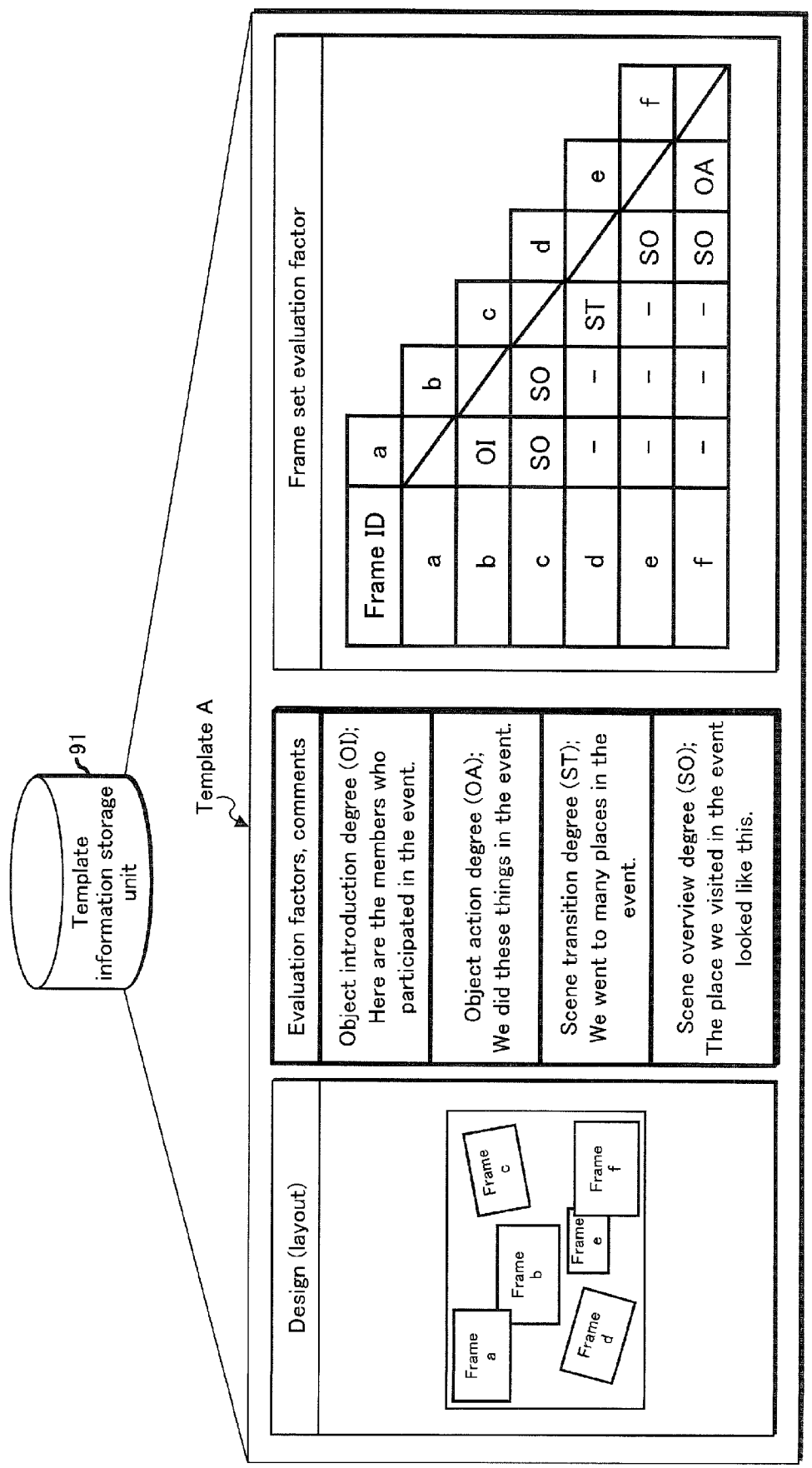
FIG. 31 illustrates a data structure of the template information.

FIG. 31 illustrates another example of template A stored in the template information storage unit 91. Template A illustrated in FIG. 31 is basically similar to template A illustrated in FIG. 27 but differs in that an "evaluation factors, comments" column is included.

The "evaluation factors, comments" column indicates a correspondence between the evaluation factors and the comments associated with the evaluation factors. For instance, a comment "Here are the members who participated in the event." is associated with the object introduction degree (OI) evaluation factor.

By making use of such correspondence between the evaluation factors and the comments associated therewith, the comments can be displayed at inter-frame regions in the automatically created album.

Figure 32A:
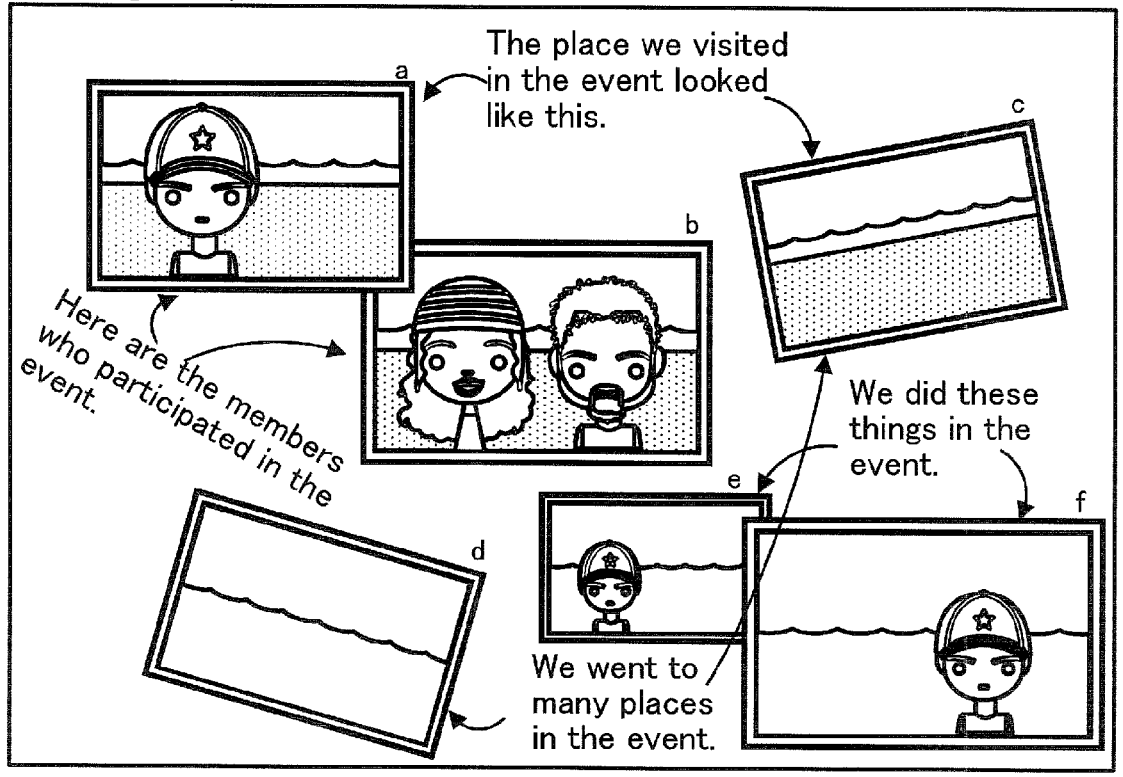
FIGS. 32A and 32B each illustrate an example of a displayed album.
Figure 32B:
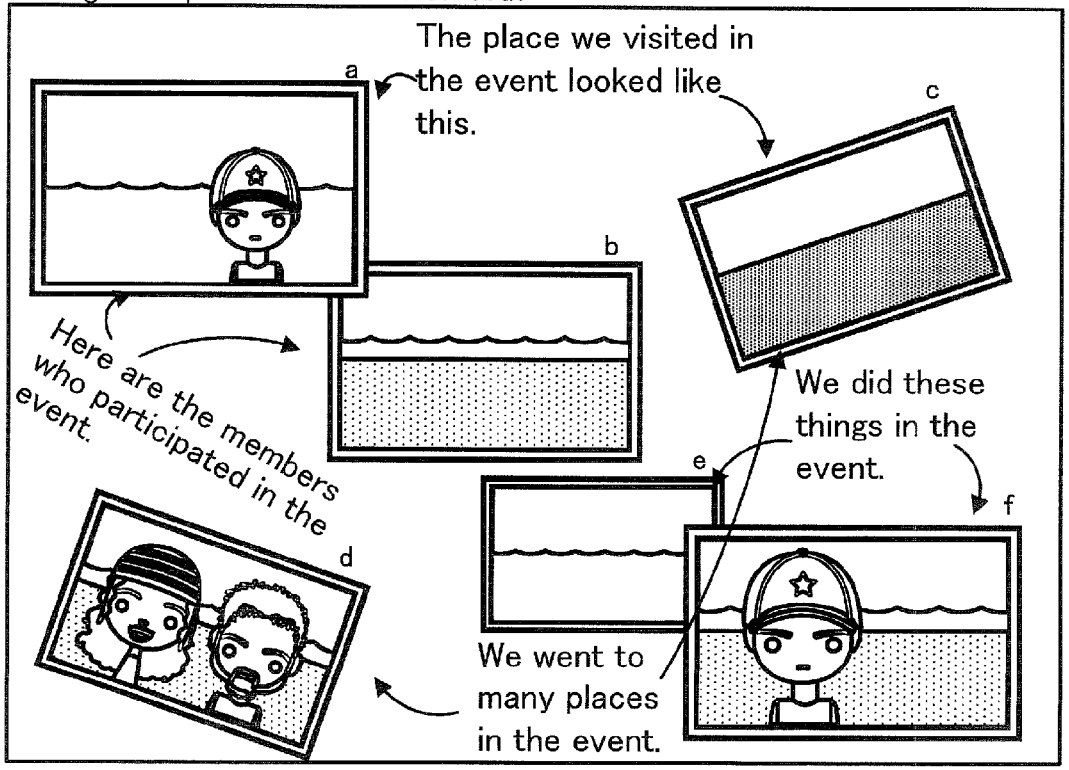

FIGS. 32A and 32B each illustrate an album created according to template A illustrated in FIG. 31. In specific, FIG. 32A shows an album 320a created by using the arrangement pattern P20160 having the highest-ranked arrangement pattern evaluation value (1st place), whereas FIG. 32B shows an album 320b created by using the arrangement pattern P1 having the lowest-ranked arrangement pattern evaluation value (20160th place).

As illustrated in FIGS. 32A and 32B, comments corresponding to the evaluation factors associated with specific frame sets defined in template A in FIG. 31 are displayed in the albums 320a and 320b. For instance, the comment: "Here are the members who participated in the event." is displayed at an inter-frame region corresponding to the frame pair ab in each of the albums 320a and 320b.

By displaying comments at inter-frame regions in the above-described manner, the user can be notified of inter-frame relations of the frame sets which were taken into consideration in the creation of the album. As such, the creation of an album realizing higher user satisfaction is possible, and further, the user is freed from the burden of having to manually insert comments into an album.

Note that in the album 320a shown in FIG. 32A, images H and G, in each of which a person appears, are arranged with respect to the frame pair ab. As such, the images H and G arranged with respect to the frame pair ab are in accordance with the comment: "Here are the members who participated in the event." displayed at an inter-frame region corresponding to the frame pair ab.

However, in album 320b shown in FIG. 32B, images L and I, in which people do not appear, are arranged with respect to the frame pair ab. As such, the images L and I arranged with respect to the frame pair ab are not in accordance with the comment: "Here are the members who participated in the event." at an inter-frame region corresponding to the frame pair ab, and therefore give the user an odd impression.

As such, when viewing the albums 320a and 320b in comparison, it can be seen that the album 320a is more appropriate than the album 320b.

(2) Examples of Selection of Templates

In the following, additional description is provided on an example of a user interface provided for the selection of a template, description of which is provided above in Step S24 in FIG. 2.

Figure 33:
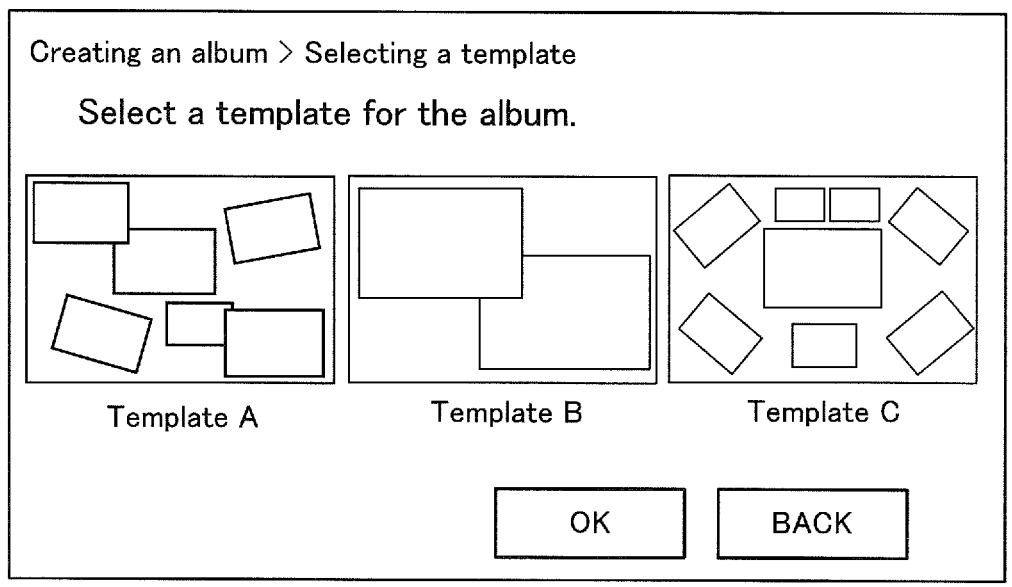
FIG. 33 illustrates an example of a selection of a template.

FIG. 33 shows a template selection screen 330, which the template selection unit 62 causes the display 4 to display.

The template selection unit 62 reads out the three templates A through C stored in the template information storage unit 91 and displays the templates A through C on the screen 330. Further, the template selection unit 62 receives a selection of a template from a user via an undepicted input device.

(3) Examples of Templates

The template A, description of which is provided in the embodiment, defines four types of evaluation factors (refer to FIG. 31). However, a template need not define all four types of evaluation factors as described in the embodiment, and instead, a template may include any combination of the four types of evaluation factors.

Figure 34A:
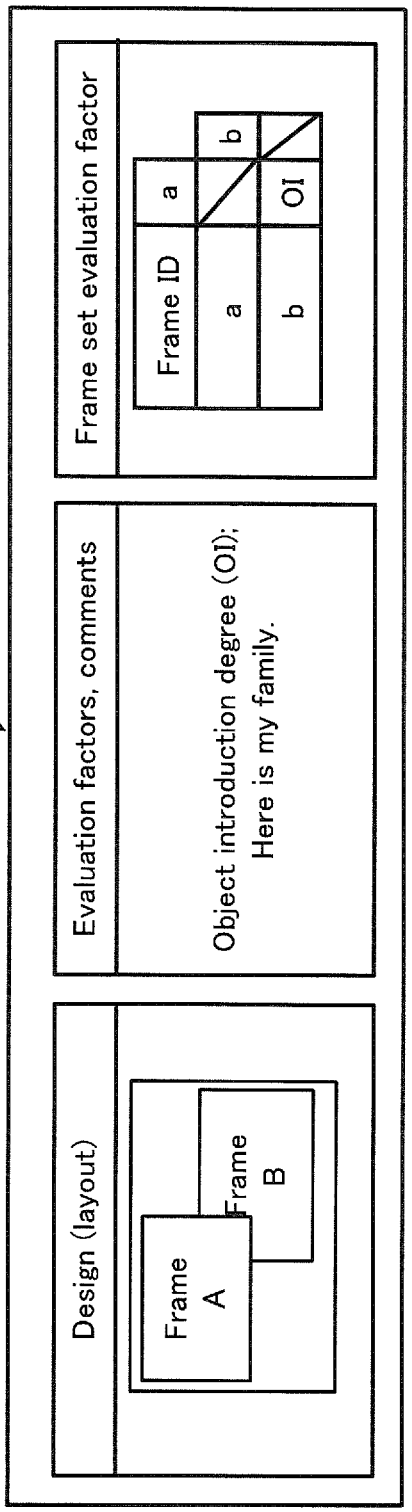
FIG. 34A illustrates a data structure of the template information.

FIG. 34A illustrates a data structure of the template information for template B. Template B is a relatively simple template including only two frames a and b, and the object introduction degree is set as the evaluation factor associated with a frame pair ab.

Figure 34B:
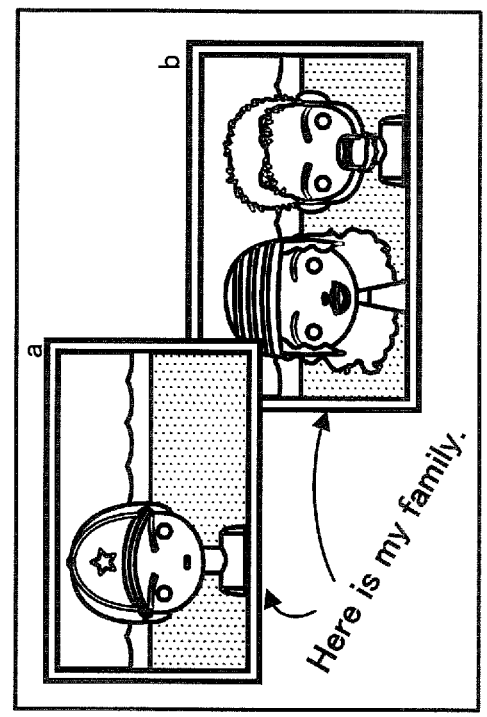
FIG. 34B illustrates an example of a displayed album.

FIG. 34B shows an example of an album created according to template B.

(4) Examples of Albums

In the embodiment, description is provided taking as an example a type of album where images are arranged with respect to frames mounted on a mount. However, the present invention is not limited to this, and the album may be a slideshow-type album.

Figure 35A:
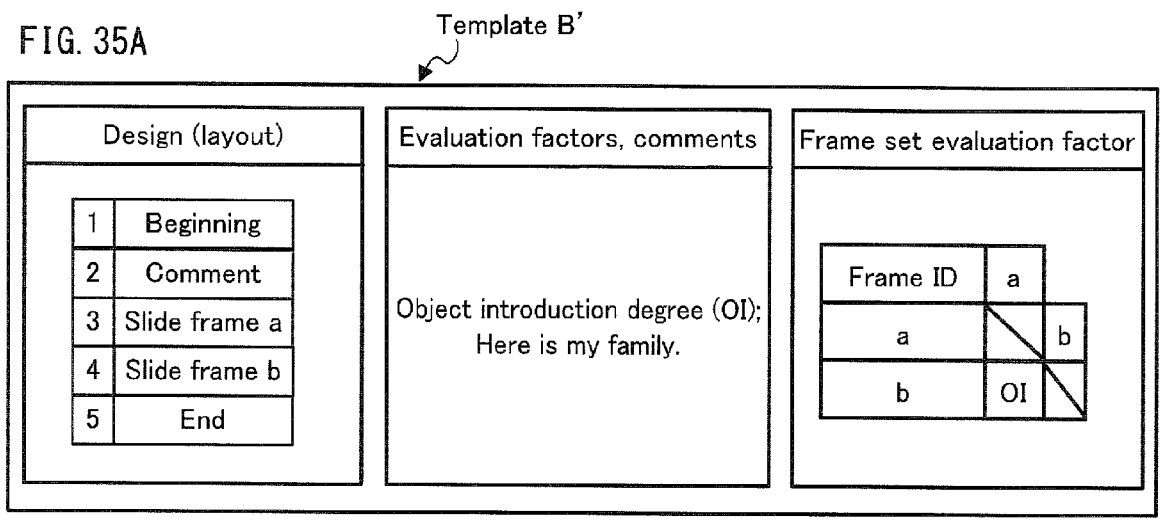
FIG. 35A illustrates a data structure of the template information.

As one example of such an album, FIG. 35A illustrates a data structure of the template information for template B'.

The "design (layout)" of template B' includes information indicating slides each corresponding to slides 1 through 5 in a slideshow.

For instance, a slide frame a is associated with slide number 3, and a slide frame b is associated with slide number 4.

In addition, the "frame set evaluation factor" in template B' indicates that an image pair in the evaluation target arrangement pattern arranged with respect to a slide pair ab is to be evaluated according to the object introduction degree.

Figure 35B:
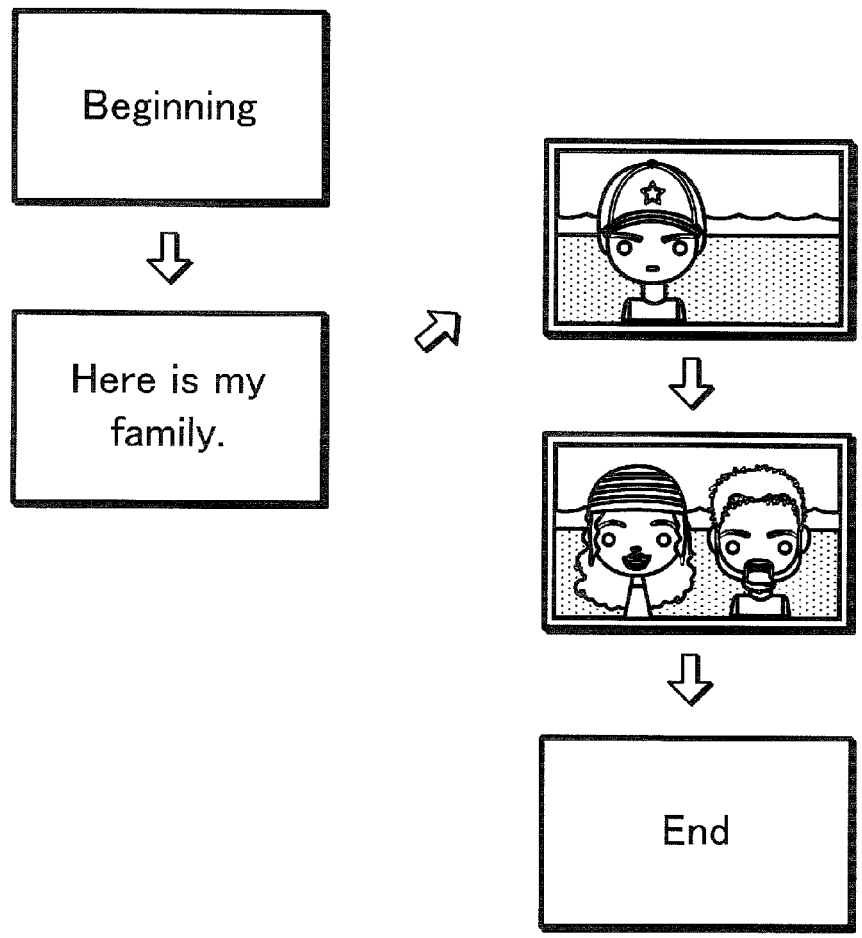
FIG. 35B illustrates an example of a displayed album.

FIG. 35B shows an example of an album created according to template B'.

(5) Flow of Calculation of Arrangement Pattern Evaluation Values

Figure 26:
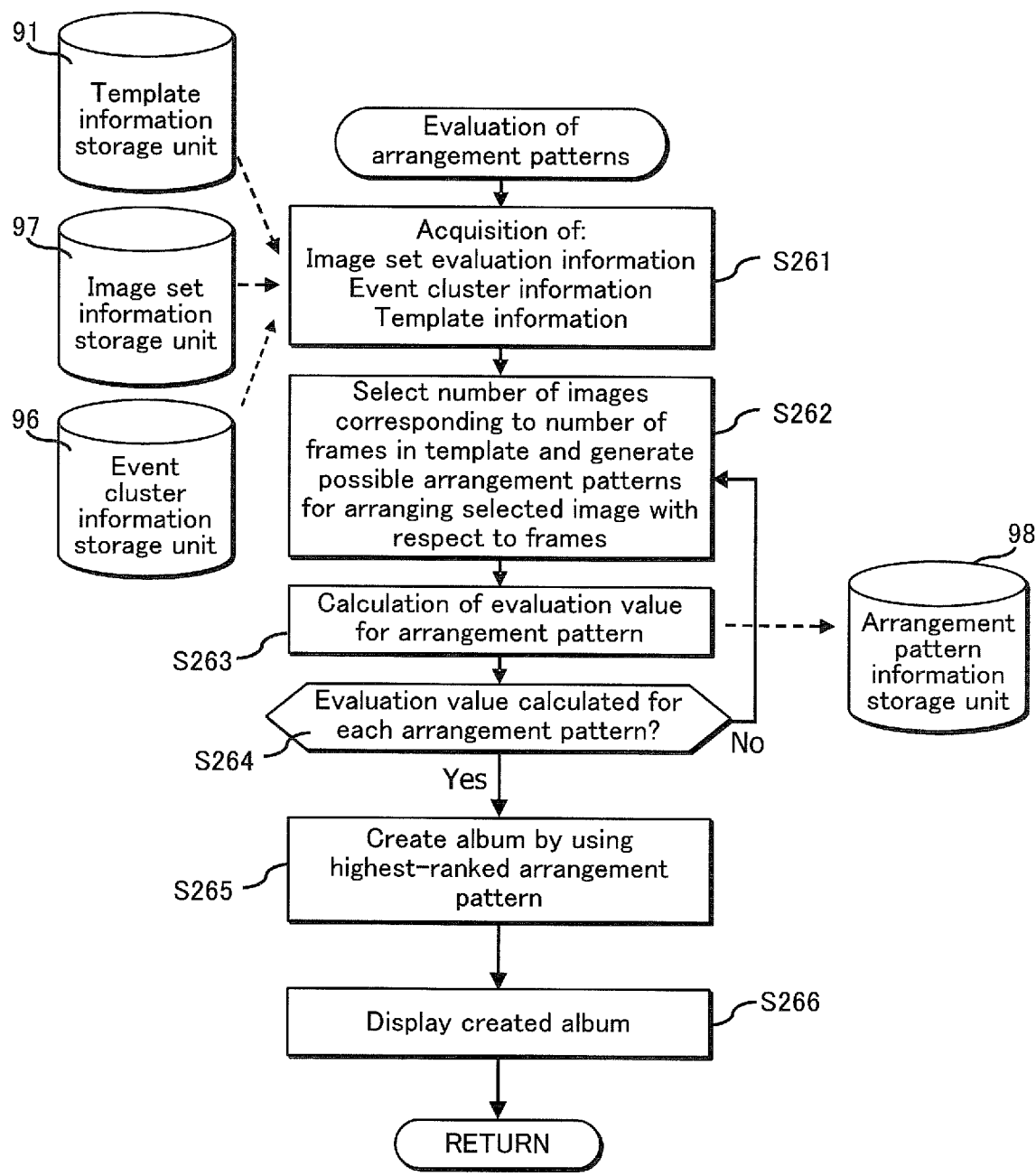
FIG. 26 is a flowchart illustrating details of evaluation of arrangement patterns.

In the embodiment, description is provided that evaluation values are calculated for all of the generated arrangement patterns as illustrated Steps S262 through S264 in FIG. 26 (a brute force method).

However, the present invention is not limited to this. For instance, the calculation of arrangement pattern evaluation values may be terminated and processing may proceed to Step S265 when an evaluation value calculated in Step S263 exceeds a predetermined threshold value.

(6) The Number of Frames Constituting a Frame Set in a Template

In the embodiment, the "frame set evaluation factor" in a template (refer to FIG. 27) indicates an evaluation factor used to evaluate a pair of images arranged with respect to a frame set constituted of two frames. However, the number of frames constituting a frame set is not limited to two. That is, a frame set may be constituted of a greater number of frames than two. For instance, a frame set may be constituted of three frames.

As one example, a template may define a specific evaluation factor used to evaluate images arranged with respect to a frame set constituted of three frames 1, 2, and 3. In such a case, the evaluation of an image set A, B, C arranged with respect to the frame set 1, 2, 3 may be performed by combining the characteristic value of each of the three images A, B, and C in accordance with the evaluation factor defined in the template.

Note that, in such a case, the calculation of arrangement pattern evaluation values may be performed such that an evaluation value for an image set of three images is calculated in advance by setting the image set of three images as the image set in Step S25 (FIG. 2), and by using the evaluation value of the image set of three images that has been calculated in advance as described above in the calculation of arrangement pattern evaluation values. However, in order to realize a reduction in calculation amount (so as to enable application of evaluation values calculated for image sets including two images), the evaluation value of an image set including three images A, B, and C may be calculated by using averages of evaluation values of image sets including two images, namely image sets AB, BC, and AC. This is possible by cross multiplying the evaluation values of the image sets AB, BC, and AC.

Alternatively, a template may include both a frame set constituted of two frames and a frame set constituted of three frames.

Figure 37A:
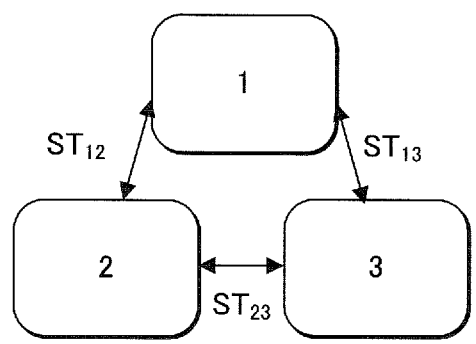
FIGS. 37A and 37B illustrate correlations between frames and evaluation factors.

To provide description on a specific example, in the example illustrated in FIG. 37A, the scene transition degree (ST) evaluation factor is set as the evaluation factor associated with a frame set 1,2,3.

More specifically, the scene transition degree of a set of images arranged with respect to the frame set 1,2,3 set can be calculated by cross multiplying the scene transition degree $ST_{12}$ of an image pair arranged with respect to a frame pair 1,2, the scene transition degree $ST_{23}$ of an image pair arranged with respect to a frame pair 2,3, and the scene transition degree $ST_{13}$ of an image pair arranged with respect to a frame pair 1,3. The use of such a frame set is useful in determining, from a group of images belonging to a selected event in which activity took place at three places, an image set that is a combination of images each including a different one of the three places.

Figure 37B:
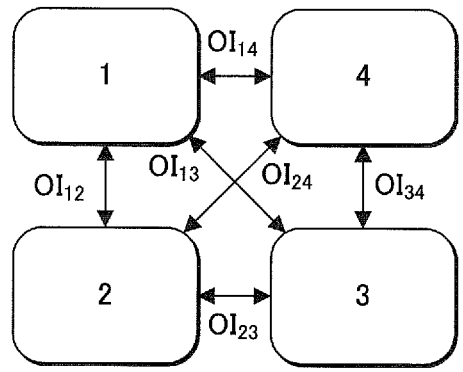

In addition, in the example illustrated in FIG. 37B, the object introduction degree (OI) evaluation factor is set as the evaluation factor associated with a frame set 1,2,3,4. The use of such a frame set is useful in determining, from a group of family images photographed by a user of a family of four, an image set that is a combination of images each including a different one of the four family members.

(7) Exclusion of Frames from Frame Sets in Template

In the embodiment, the "frame set evaluation factor" in a template (refer to FIG. 27) associates an evaluation factor with each of the seven frame sets ab, ac, bc, cd, de, df and ef.

As such, each of the frames a through f is a frame that is included in at least one frame set. In other words, all six of the frames, which constitute the seven frame sets as described above, are included in frame sets.

Accordingly, each of the frames included in the album created by using the template is related to at least one evaluation factor. As such, each of the images arranged in the album reflects a connection between the frames, and therefore, the images arranged with respect to the frames inter-connect with each other.

(8) "Frame Set Evaluation Factor" in Template

An additional factor of "weight" may be included in the "frame set evaluation factor" illustrated in FIG. 27.

By including "weight" as an additional factor, when a relatively important frame exists in the template (for instance, a frame occupying a greater area than other frames, or a frame located at the center of the template), the evaluation of an image arranged with respect to such an important frame can be performed appropriately according to a weight value provided to the important frame and such that the evaluation of the image arranged with respect to the important frame is given more priority compared to the evaluation of images arranged with respect to other frames.

(9) Evaluation Utilizing Multiple Templates

In the embodiment, description is provided that only one template is utilized when evaluation of arrangement patterns is performed (FIG. 26). However, the present invention is not limited to this, and multiple templates may be utilized to generate and evaluate arrangement patterns.

Figure 36:
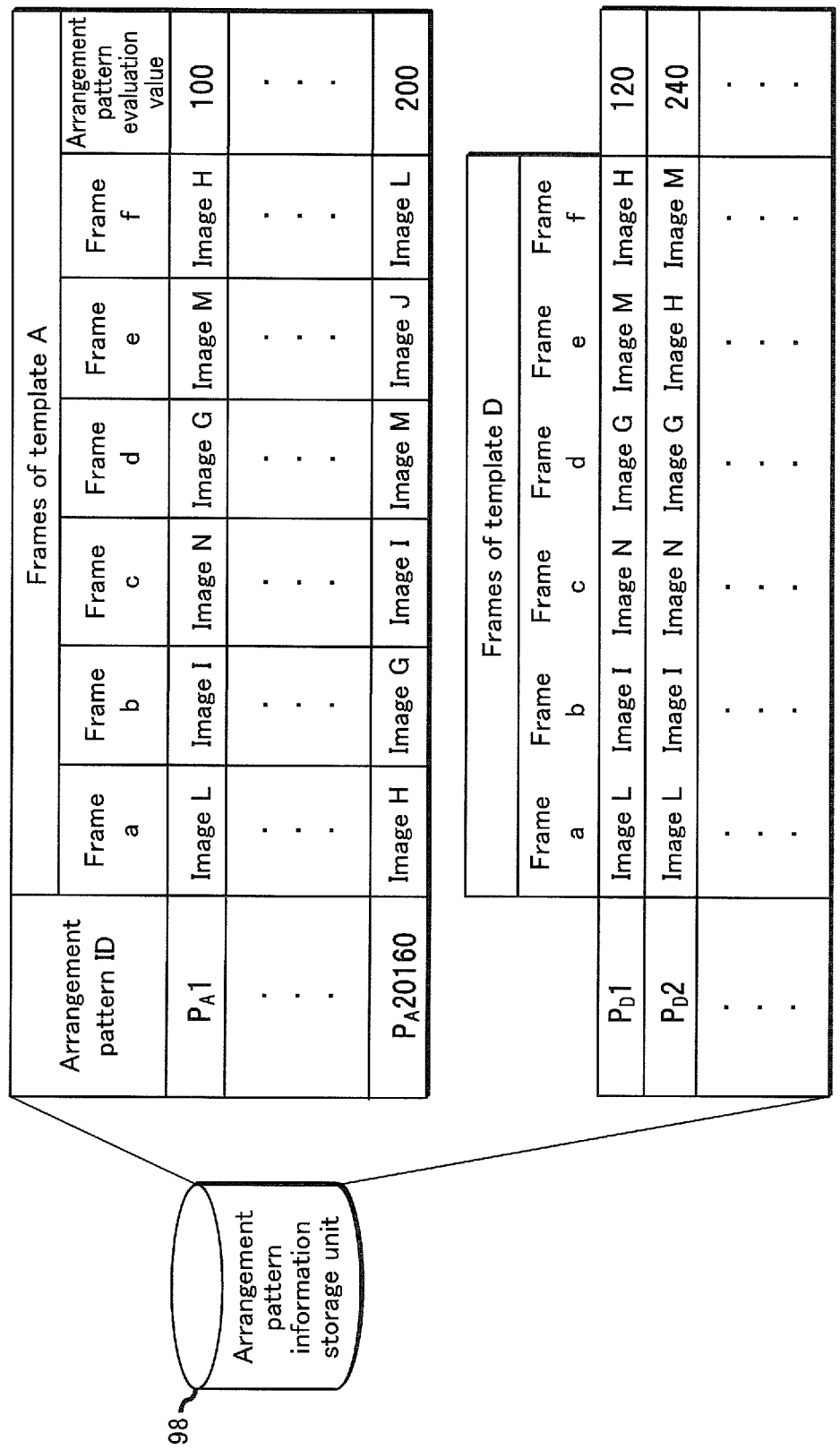
FIG. 36 illustrates a data structure of the arrangement pattern information.

For instance, arrangement patterns may be generated according to both template A and template D, and evaluation may be performed of such arrangement patterns as illustrated in FIG. 36. This processing can be realized, for instance, by automatically selecting template A and template D (or by receiving a selection of template A and template D from the user) in Step S24 of FIG. 2 and by repeating the processing in Steps S261 through S264 in FIG. 26 for each of the selected templates.

Note that template D illustrated in the example in FIG. 36 has six frames, which is similar to template A. However, template D differs from template A in terms of design and the evaluation factors applied to frame sets.

In the example illustrated in FIG. 36, an album is automatically created by using the arrangement pattern $P_D2$ having the highest evaluation value (240) among the arrangement patterns generated by using templates A and D. By performing processing in the above-described manner, the most suitable template and the most suitable arrangement pattern generated by using the most suitable template can be determined automatically.

(10) Method for Counting Arrangement Patterns

In the embodiment, the number of possible patterns for arranging eight images with respect to six frames is calculated as $_8P_6=20160$ patterns due to the six frames a through f of template A being distinguished from each other. Such a method based on permutation is most suitable when emphasis lies in the characteristics of each frame in the template (e.g., the position of each frame, the decoration provided to each frame, and the size of each frames in the template). However, the present invention is not limited to this.

That is, the number of patterns for arranging eight images with respect to six frames may be calculated as $_8C_6=28$ patterns by not distinguishing the six frames from each other and by applying the idea of combination. Such a modification is advantageous in that the amount of calculation performed can be reduced.

(11) Arrangement Pattern Used in Creation of Album

In the embodiment, description is provided that an album is created by using an arrangement pattern provided with the highest ranking among the multiple arrangement patterns generated (FIG. 26: S265). However, the present invention is not limited to this. For instance, three albums may each be created by using a corresponding one of three arrangement patterns that are ranked first to third in the ranking of arrangement patterns, and the three albums may be displayed as a list to a user.

(12) Example of Template with Independent Frame

In the embodiment, description is provided that an evaluation value for an arrangement pattern is calculated according to combinations of images arranged with respect to combinations of multiple frames (frame sets). However, the present invention is not limited to this. That is, not all frames in a template need to constitute a frame set.

For instance, for a given proportion of the frames in a template, a single frame (an independent frame) may be associated with one evaluation factor.

Figure 38A:
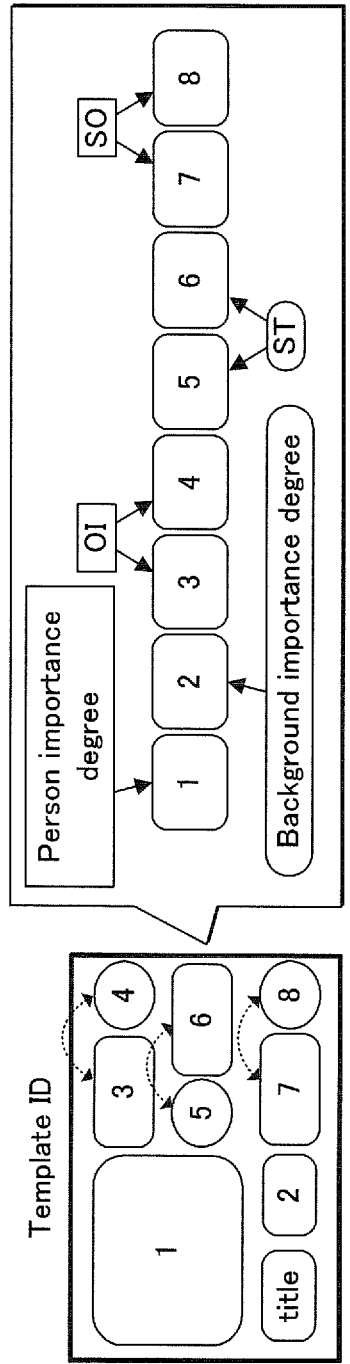
FIG. 38A illustrates an example of the template information.

The template D illustrated in FIG. 38A has eight frames (frames 1 through 8). Among the eight frames, frame 1 is associated with the person importance degree evaluation factor, and frame 2 is associated with the background importance degree evaluation factor. As such, frames 1 and 2 are in one-to-one correspondence with the respective evaluation factors associated therewith.

Figure 38B:
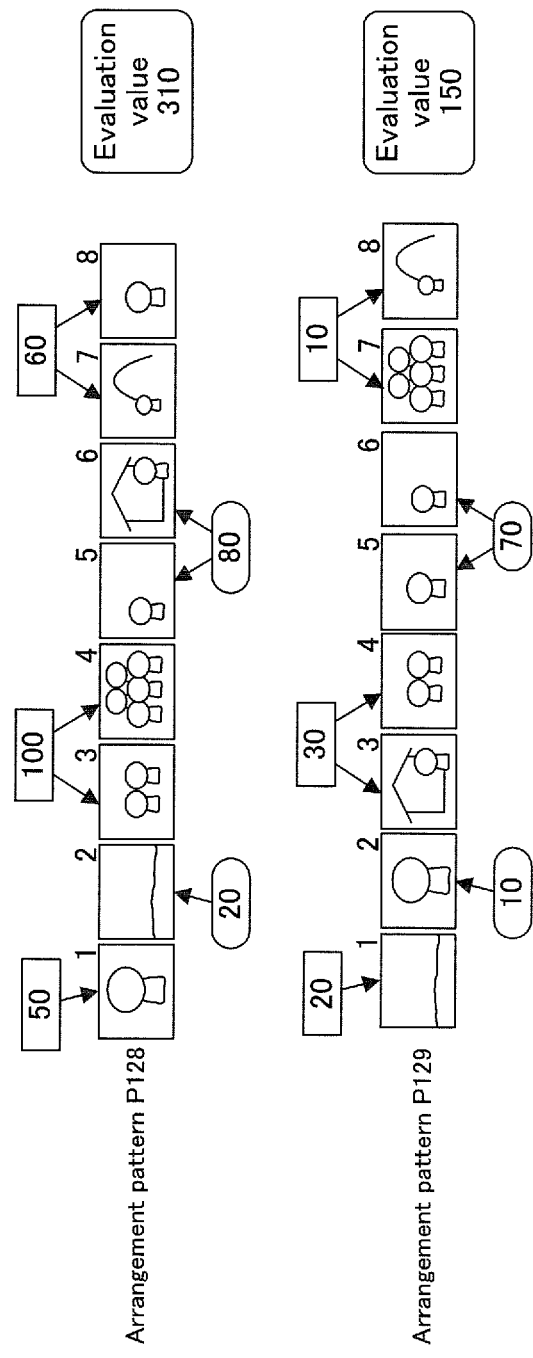
FIG. 38B illustrates arrangement patterns and evaluation values corresponding thereto.

In addition, in template D illustrated in FIG. 38A, a frame set 3,4 is associated with the object introduction degree (OI) evaluation factor, a frame set 5,6 is associated with the scene transition degree (ST) evaluation factor, and a frame set 7,8 is associated with the scene overview degree (SO) evaluation factor. FIG. 38B illustrates arrangement patterns generated by using template D and the corresponding evaluation values.

(13) Relation between Frames and Evaluation Factors

In the embodiment, description is mainly provided that one evaluation factor is associated with one frame set. However, the present invention is not limited to this, and multiple evaluation factors may be associated with one frame set. In addition, multiple evaluation factors may be associated with the independent frame described above in (12).

(14) Reduction of Number of Arrangement Patterns

In the embodiment, description is provided that all possible patterns for arranging images with respect to frames in a template are generated (S264 in FIG. 26 and the like). However, the present invention is not limited to this, and in order so as to reduce the processing load for calculating evaluation values, the number of arrangement patterns for which evaluation values are calculated may be reduced.

The first method for reducing the number of arrangement patterns is narrowing down the number of images used for generating arrangement patterns according to the background importance degrees of the images. In the following, description is provided on this method, with reference to FIG. 39.

Figure 39:
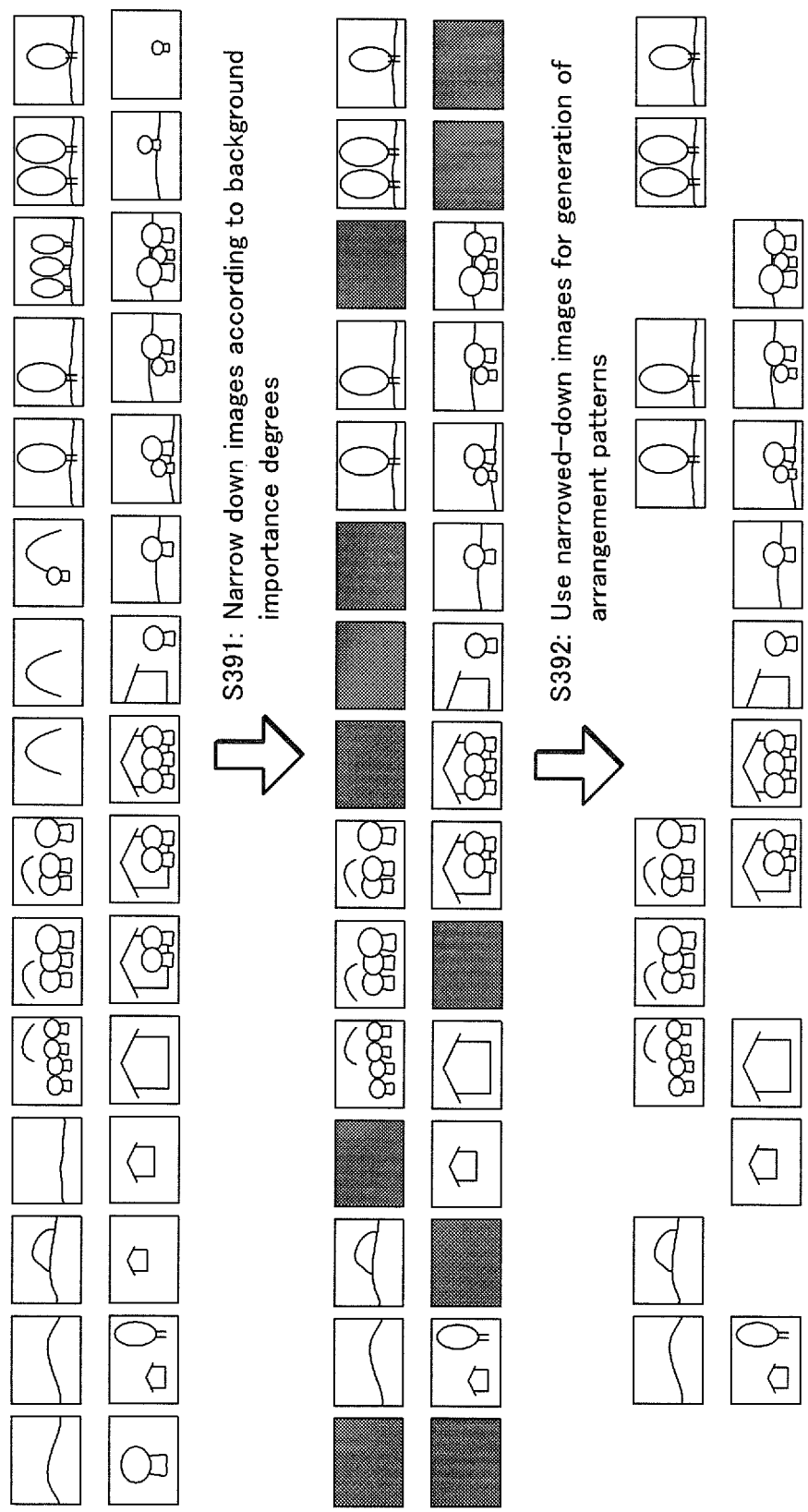
FIG. 39 illustrates an example of narrowing down images.

In the example illustrated in FIG. 39, a total of thirty images belong to a given event. The arrangement pattern evaluation unit 80 sorts the background importance degrees of the thirty images in descending order, and thereby narrows down the thirty images to fifteen images having the top fifteen background importance degrees (S391). Subsequently, the arrangement pattern evaluation unit 80 uses the fifteen images, which have been obtained by narrowing down images as described above, for generating arrangement patterns (S392).

For instance, when thirty images are to be arranged with respect to four frames in a template, the number of arrangement patterns generated reaches a total of 657,720 (=30×29×28×27). However, by narrowing down the images as described above, the number of arrangement patterns generated can be reduced to 32,760 (=15×14×13×12).

The second method for reducing the number of arrangement patterns is dividing the group of images belonging to the selected event into different scenes, narrowing down the scenes according to an average scene importance degree of the group of images included in each scene, and generating arrangement patterns by using the reduced number of scenes obtained by narrowing down the scenes. In the following, description is provided on this method, with reference to FIG. 40.

In the example illustrated in FIG. 40, a total of thirty images belong to a given event. The arrangement pattern evaluation unit 80 divides the thirty images into eight scenes 1 through 8, and calculates, as a scene importance degree, an average of the background importance degrees of the images belonging to the scene for each of the eight scenes. Further, the arrangement pattern evaluation unit 80 narrows down the scenes according to the scene importance degrees calculated in the above-described manner (S401).

Accordingly, the arrangement pattern evaluation unit 80 uses 21 images belonging to the scenes 2, 4, 6, 7, and 8, which are scenes having relatively high scene importance degrees, for generating arrangement patterns (S402).

For instance, when thirty images are to be arranged with respect to four frames in a template, the number of arrangement patterns generated reaches a total of 657,720 (=30×29× 28×27). However, by narrowing down the scenes as described above, the number of arrangement patterns generated can be reduced to 143,640 (=21×20×19×18).

In particular, when arrangement patterns are generated by using a group of images obtained by combining the narrowed-down images in units of scenes, the number of arrangement patterns generated can be reduced to 600 (=3×5×8×5).

Here, note that the method for calculating the scene importance degrees is not limited to the above-described method of using the background importance degrees of the images. That is, the calculation of the scene importance degrees may be performed in accordance with a calculation method taking into consideration the object importance degrees of the images, a calculation method reflecting user preferences, and other commonly-known methods.

(15) Example of Mathematic Expressions

In the following, description is provided on examples of mathematic expressions for evaluating values described in the embodiment.

The background similarity degree can be calculated by using Math (1) in FIG. 41A. Note that area i in Math (1) denotes the segments obtained by dividing an area of an image (segmentation). In addition, abs denotes a function for obtaining an absolute value. Further, in FIG. 41A, scenesim (a, b) denotes the background similarity degree between the background characteristic values of images a and b.

The interval between photography date/times of images can be calculated by using Math (2) in FIG. 41B. Note that shottimedist (a, b) in FIG. 41B denotes the interval between the photography date/times of images a and b.

Background importance degrees can be calculated by using Math (3) in FIG. 42A.

The object introduction degree can be calculated by using Math (5) in FIG. 42B.

The object action degree can be calculated by using Math (6) in FIG. 43A.

The scene transition degree can be calculated by using Math (7) in FIG. 43B.

The scene overview degree can be calculated by using Math (8) in FIG. 44A.

An evaluation value of an arrangement pattern can be calculated by using Math (9) in FIG. 44B.

(16) In the embodiment, description is provided taking an album as an example of a piece of work created by using images. However, the present invention is not limited to being applied for creating book-type albums, and may also be applied for creating a piece of work by selecting the most suitable combination of images in a slideshow format album in which photographs transition from one to another and a movie format album in which photographs are caused to move with various animations.

(17) In the embodiment, description is provided of an SD memory card as one example of the recording medium. However, the present invention is not limited to this, and the recording medium may be any recording medium, including: a Smart Media; a Compact Flash™; a Memory Stick™; an SD memory card; a multimedia card; a CD-R/RW; a DVD±R/RW; a DVD-RAM; an HD-DVD; and a BD (Blu-ray Disc).

In addition, images may be acquired by connecting the image evaluation apparatus to a photography device storing images, such as a digital camera and a mobile phone. The connection between the image evaluation apparatus and such devices may take various forms, including and not limited to wired connections (a LAN cable, a USB cable, and etc.) and wireless connections (an infrared connection, a Bluetooth connection, and etc.).

(18) The image evaluation apparatus pertaining to the embodiment of the present invention may be typically implemented as an LSI (Large Scale Integration), which is a type of integrated circuit. Further, each of the circuits may be separately integrated into a single chip, or the functions may be integrated into a single chip including a part or all of the circuits. Although description has been made on the basis of an LSI in the above, the name of the integrated circuit may differ according to the degree of integration of the chips. Other integrated circuits include an IC (integrated circuit), a system LSI, a super LSI, and an ultra LSI. Further, the method applied for forming integrated circuits is not limited to the LSI, and the present invention may be realized on a dedicated circuit or a general purpose processor. For example, the present invention may be realized on a FPGA (Field Programmable Gate Array) being an LSI which can be programmed after manufacturing, or a reconfigurable processor being a LSI, reconfiguration of which could be made to the connection of internal circuit cells and settings.

Further in addition, if a new technology of circuit integration replacing that of the LSI emerges as a result of the progress made in the field of semiconductor technology or another technology deriving therefrom, the integration of function blocks may be performed applying such technology. At this point, there is a possibility of biotechnology being applied to induce the future development of circuit integration technology.

(19) Program

A control program composed of program code for causing processors of various apparatuses including computers and various circuits connected to the processors to execute the processing pertaining to the evaluation of images described in the embodiment may be distributed by recording the control program onto recording media, or by transmitting the control program via various communication paths.

Such recording media which can be used in the distribution of the control program include such recording media as: a Smart Media; a Compact Flash™; a Memory Stick™; an SD Memory Card™; a multimedia card; a CD-R/RW; a DVD±R/RW; a DVD-RAM; an HD-DVD; and a BD (Blu-ray Disc).

Further, the control program, once distributed, is supplied for use by being stored to a processor-readable memory or the like, and the various functions described in the embodiment are realized by the processor executing the control program.

<Supplement 2>

The following describes various aspects of the present invention.

(1) One aspect of the present invention is an image evaluation apparatus comprising: a template storing unit that stores a template having an N number of frames in each of which an image is to be inserted, N being a natural number equal to or greater than 2, and defining (i) one or more frame sets each being a combination of a plurality of frames among the N number of frames and (ii) evaluation factors pertaining to a characteristic value of each of images that are to be arranged with respect to each of the one or more frame sets; an acquisition unit that acquires a plurality of images; an evaluation unit that selects an N number of images from among the acquired images, generates a plurality of candidate arrangement patterns for arranging the N number of images with respect to the N number of frames, and calculates an evaluation value for each of the candidate arrangement patterns according to the evaluation factors; and an evaluation value storing unit that stores, for each of the candidate arrangement patterns, a corresponding evaluation value calculated by the evaluation unit, wherein the evaluation unit specifies, as an arrangement for inserting the N number of images with respect to the N number of frames, a candidate arrangement pattern corresponding to the highest evaluation value among the evaluation values stored in the evaluation value storing unit.

(2) In the image evaluation apparatus, the evaluation factors may include one of (i) an object introduction degree indicating, for images arranged with respect to a frame set associated therewith in each of the candidate arrangement patterns, a degree of introduction of objects and (ii) a scene transition degree indicating, for images arranged with respect to a frame set associated therewith in each of the candidate arrangement patterns, a degree of transition between scenes.

(3) The image evaluation apparatus pertaining to one aspect of the present invention may further comprise an object clustering unit that clusters objects included in the acquired images into object clusters, wherein the evaluation unit may evaluate, in each of the candidate arrangement patterns, the images arranged with respect to the frame set associated with the object introduction degree and provide a high evaluation thereto when objects respectively included in the images arranged with respect to the frame set associated with the object introduction degree belong to different ones of the object clusters.

The above-described structure of the image evaluation apparatus pertaining to one aspect of the present invention is contributable to creating an album that is suitable for the introduction of objects such as people.

(4) The image evaluation apparatus pertaining to one aspect of the present invention may further comprise an object importance degree calculating unit that calculates an importance degree of each of the object clusters, wherein the evaluation unit may evaluate, in each of the candidate arrangement patterns, the images arranged with respect to the frame set associated with the object introduction degree and provide a high evaluation thereto when the objects respectively included in the images arranged with respect to the frame set associated with the object introduction degree belong to object clusters having high importance degrees.

(5) The image evaluation apparatus pertaining to one aspect of the present invention may further comprise an extracting unit that extracts a characteristic value of a background from each of the acquired images, wherein the evaluation unit may evaluate, in each of the candidate arrangement patterns, the images arranged with respect to the frame set associated with the scene transition degree according to one of (i) non-similarity between characteristic values of backgrounds of the images arranged with respect to the frame set associated with the scene transition degree and (ii) lengths of photographing intervals between the images arranged with respect to the frame set associated with the scene transition degree.

The above-described structure of the image evaluation apparatus pertaining to one aspect of the present invention is contributable to creating an album that is suitable for the introduction of transition between scenes.

(6) The image evaluation apparatus pertaining to one aspect of the present invention may further comprise a background importance degree calculating unit that calculates an importance degree of the background of each of the acquired images, wherein the evaluation unit may evaluate, in each of the candidate arrangement patterns, the images arranged with respect to the frame set associated with the scene transition degree and provide a high evaluation thereto when the backgrounds of the images arranged with respect to the frame set associated with the scene transition degree have high importance degrees.

(7) The image evaluation apparatus pertaining to one aspect of the present invention may further comprise an object clustering unit that clusters objects included in the acquired images into object clusters, wherein the evaluation factors may include a change degree indicating, for images arranged with respect to a frame set associated therewith in each of the candidate arrangement patterns, a degree of change of objects belonging to the same object cluster between images having similar backgrounds.

(8) The image evaluation apparatus pertaining to one aspect of the present invention may further comprise an extracting unit that extracts a characteristic value of a background from each of the acquired images, wherein the evaluation unit may evaluate, in each of the candidate arrangement patterns, the images arranged with respect to the frame set associated with the change degree and provide a high evaluation thereto when backgrounds of the images arranged with respect to the frame set associated with the change degree have similar characteristic values and objects respectively included in the images arranged with respect to the frame set associated with the change degree belong to the same object cluster.

The above-described structure of the image evaluation apparatus pertaining to one aspect of the present invention is contributable to creating an album that is suitable for the introduction of actions of objects such as people.

(9) The image evaluation apparatus pertaining to one aspect of the present invention may further comprise: an object importance degree calculating unit that calculates an importance degree of each of the object clusters; and a background importance degree calculating unit that calculates an importance degree of the background of each of the acquired images, wherein the evaluation unit may evaluate, in each of the candidate arrangement patterns, the images arranged with respect to the frame set associated with the change degree and provide a high evaluation thereto when at least one of (i) importance degrees of the objects respectively included in the images arranged with respect to the frame set associated with the change degree and (ii) importance degrees of the backgrounds of the images arranged with respect to the frame set associated with the change degree indicate high values.

(10) The image evaluation apparatus pertaining to one aspect of the present invention may further comprise a calculation unit that calculates an object-occupied area in each of the acquired images, wherein the evaluation unit may evaluate, in each of the candidate arrangement patterns, the images arranged with respect to the frame set associated with the change degree and provide a high evaluation thereto when objects respectively included in the images arranged with respect to the frame set associated with the change degree belong to the same object cluster and object-occupied areas in the images arranged with respect to the frame set associated with the change degree, which are respectively occupied by the objects belonging to the same object cluster, differ in terms of size.

The above-described structure of the image evaluation apparatus pertaining to one aspect of the present invention is contributable to creating an album that is suitable for the introduction of an overview of a scene.

(11) The image evaluation apparatus pertaining to one aspect of the present invention may further comprise: an object importance degree calculating unit that calculates an importance degree of each of the object clusters; and a background importance degree calculating unit that calculates an importance degree of a background of each of the acquired images, wherein the evaluation unit may evaluate, in each of the candidate arrangement patterns, the images arranged with respect to the frame set associated with the change degree and provide a high evaluation thereto when at least one of (i) importance degrees of the objects respectively included in the images arranged with respect to the frame set associated with the change degree and (ii) importance degrees of backgrounds of the images arranged with respect to the frame set associated with the change degree indicate high values.

(12) The image evaluation apparatus pertaining to one aspect of the present invention may further comprise a background importance degree calculating unit that calculates an importance degree of a background of each of the acquired images, wherein the evaluation unit may calculate the evaluation value for each of the candidate arrangement patterns according to importance degrees of backgrounds of images arranged with respect to the one or more frame sets in each of the candidate arrangement patterns.

(13) The image evaluation apparatus pertaining to one aspect of the present invention may further comprise an extracting unit that extracts a characteristic value of the background from each of the acquired images, wherein the background importance degree calculating unit may calculate an importance degree of a background of a given image, among the acquired images, according to (i) similarity between a characteristic value of the background of the given image and a characteristic value of a background of another image, among the acquired images, having a close photography date/time with respect to the given image and (ii) similarity between the characteristic value of the background of the given image and a characteristic value of a background of another image in which an important person appears among the acquired images.

(14) The image evaluation apparatus pertaining to one aspect of the present invention may further comprise a display control unit that displays information corresponding to an evaluation factor according to which the calculation of the highest evaluation value has been performed in association with images inserted in a frame set associated with the evaluation factor in the arrangement for inserting the N number of images with respect to the N number of frames.

The above-described structure of the image evaluation apparatus pertaining to one aspect of the present invention enables a user to be notified of a relation between images inserted with respect to a frame set.

(15) In the image evaluation apparatus pertaining to one aspect of the present invention, each of the N number of frames may be included in the one or more frame sets.

The above-described structure of the image evaluation apparatus pertaining to one aspect of the present invention enables the N number of images to be inserted in the N number of frames to be inter-connected.

(16) In the image evaluation apparatus pertaining to one aspect of the present invention, the evaluation unit may narrow down the acquired images into a predetermined number of images and select the N number of images from among the predetermined number of images.

The above-described structure of the image evaluation apparatus pertaining to one aspect of the present invention is contributable to reducing the processing load for calculating evaluation values.

(17) The image evaluation apparatus pertaining to one aspect of the present invention may further comprise: a background importance degree calculating unit that calculates an importance degree of a background of each of the acquired images, wherein the evaluation unit may narrow down the acquired images into the predetermined number of images according to the importance degrees of the backgrounds of the acquired images.

(18) In the image evaluation apparatus pertaining to one aspect of the present invention, the evaluation unit may narrow down the acquired images into the predetermined number of images by dividing the acquired images into a plurality of scenes and by using an importance degree of each of the scenes.

(19) One aspect of the present invention is an image evaluation method comprising: an acquisition step of acquiring a plurality of images; a reference step of referencing a template stored in a template storing unit, the template having an N number of frames in each of which an image is to be inserted, N being a natural number equal to or greater than 2, and defining (i) one or more frame sets each being a combination of a plurality of frames among the N number of frames and (ii) evaluation factors pertaining to a characteristic value of each of images that are to be arranged with respect to each of the one or more frame sets; an evaluation step of selecting an N number of images from among the acquired images, generating a plurality of candidate arrangement patterns for arranging the N number of images with respect to the N number of frames, and calculating an evaluation value for each of the candidate arrangement patterns according to the evaluation factors; an evaluation value storing step of storing, for each of the candidate arrangement patterns, a corresponding evaluation value calculated by the evaluation unit; and a specification step of specifying, as an arrangement for inserting the N number of images with respect to the N number of frames, a candidate arrangement pattern corresponding to the highest evaluation value among the evaluation values stored in the evaluation value storing unit.

(20) One aspect of the present invention is a program for causing a computer to perform image evaluation processing, the image evaluation processing including: an acquisition step of acquiring a plurality of images; a reference step of referencing a template stored in a template storing unit, the template having an N number of frames in each of which an image is to be inserted, N being a natural number equal to or greater than 2, and defining (i) one or more frame sets each being a combination of a plurality of frames among the N number of frames and (ii) evaluation factors pertaining to a characteristic value of each of images that are to be arranged with respect to each of the one or more frame sets; an evaluation step of selecting an N number of images from among the acquired images, generating a plurality of candidate arrangement patterns for arranging the N number of images with respect to the N number of frames, and calculating an evaluation value for each of the candidate arrangement patterns according to the evaluation factors; an evaluation value storing step of storing, for each of the candidate arrangement patterns, a corresponding evaluation value calculated by the evaluation unit; and a specification step of specifying, as an arrangement for inserting the N number of images with respect to the N number of frames, a candidate arrangement pattern corresponding to the highest evaluation value among the evaluation values stored in the evaluation value storing unit.

(21) One aspect of the present invention is an integrated circuit comprising: a template storing unit that stores a template having an N number of frames in each of which an image is to be inserted, N being a natural number equal to or greater than 2, and defining (i) one or more frame sets each being a combination of a plurality of frames among the N number of frames and (ii) evaluation factors pertaining to a characteristic value of each of images that are to be arranged with respect to each of the one or more frame sets; an acquisition unit that acquires a plurality of images; an evaluation unit that selects an N number of images from among the acquired images, generates a plurality of candidate arrangement patterns for arranging the N number of images with respect to the N number of frames, and calculates an evaluation value for each of the candidate arrangement patterns according to the evaluation factors; and an evaluation value storing unit that stores, for each of the candidate arrangement patterns, a corresponding evaluation value calculated by the evaluation unit, wherein the evaluation unit specifies, as an arrangement for inserting the N number of images with respect to the N number of frames, a candidate arrangement pattern corresponding to the highest evaluation value among the evaluation values stored in the evaluation value storing unit.

(22) Each of the one or more frame sets may be constituted of a pair of frames.

(23) As description is provided above, the template defines multiple evaluation factors. Each of the one or more frames sets may be associated with at least one of the multiple evaluation factors.

<Referenced Documents>

(1) Referenced Document 1

"Face Recognition Using Weighted Matching by Information of Gabor Features" Kazuhiro Hotta (Saitama University (JSPS Research Fellow)) et al.

Technical report of IEICE (The Institute of Electronics, Information and Communication Engineers), HIP, Technical Committee on Human Information Processing, 100(34), pp. 31-38, 20000504

(2) Referenced Document 2

A John C. Platt, Mary Czerwinski, Brent A. Field: Photo-TOC: Automatic Clustering for Browsing Personal Photographs, Fourth IEEE Pacific Rim Conference on Multimedia (2003)

(3) Referenced Document 3

Swain, M. J. and Ballard, D. H.: "Color Indexing", IJCV, 7, pp. 11-32 (1991)

INDUSTRIAL APPLICABILITY

The image evaluation apparatus and the image evaluation method pertaining to the present invention realize creation of an album that allows a user to efficiently look back at an event from an enormous number of image contents possessed by multiple users such as family members. Further, compared to conventional image evaluation methods, the image evaluation apparatus and the image evaluation method pertaining to the present invention allows a user to easily create and view a high quality album created from image groups pertaining to various events including images having ununiform compositions.

For instance, the image evaluation apparatus and the image evaluation method pertaining to the present invention is useful when a family desires to look back at a specific event from among an enormous amount of contents that have been photographed over a period of time by members of the family. The image evaluation apparatus pertaining to the embodiment selects, based on the evaluation results of combinations of images, a combination of images including important scenes in an event and family members participating in the event according to four different perspectives based on the people and the scenes appearing in the images. Further, the image evaluation apparatus pertaining to the embodiment creates an album by using the combination of images selected as described above and displays the created album. As such, a user is able to look back at the event efficiently by viewing the album. Further, the present invention is useful in stationary terminals such as a personal computer and a server terminal and the like. In addition, the present invention is useful in mobile terminals such as a digital camera and a mobile phone and the like.

REFERENCE SIGNS LIST 1 image evaluation system
2 recording medium
3 image evaluation apparatus
4 display
10 image acquisition unit
20 object extraction unit
21 object characteristic value extraction unit
22 object clustering unit
30 event extraction unit
31 photography date/time information extraction unit
32 event clustering unit
40 background extraction unit
41 background characteristic value extraction unit
50 image evaluation unit
51 object importance degree calculation unit
52 background importance degree calculation unit
60 album information selection unit
61 event cluster selection unit
62 template selection unit
70 image set evaluation unit
71 object introduction degree calculation unit
72 scene transition degree calculation unit
73 object action degree calculation unit
74 scene overview degree calculation unit
80 arrangement pattern evaluation unit
90 storage unit
91 template information storage unit
92 object cluster information storage unit
93 object importance degree information storage unit
94 background characteristic value information storage unit
95 background importance degree information storage unit
96 event cluster information storage unit
97 image set information storage unit
98 arrangement pattern information storage unit
100 display control unit

The invention claimed is:

1. An image evaluation apparatus comprising:

a processor; and a non-transitory computer-readable medium having stored thereon executable instructions that, when executed by said processor, cause said image evaluation apparatus to function as:

a template storing unit that stores a template having an N number of frames in each of which an image is to be inserted, N being a natural number equal to or greater than 2, and defining (i) one or more frame sets each being a combination of a plurality of frames among the N number of frames and (ii) evaluation factors pertaining to a characteristic value of each of images that are to be arranged with respect to each of the one or more frame sets;

an acquisition unit that acquires an M number of images, M being a natural number equal to or greater than N;

an evaluation unit that, for each combination of an L number of images selected from among the M number of acquired images, generates a plurality of candidate arrangement patterns for arranging the L number of images with respect to the N number of frames, and calculates an evaluation value for each of the candidate arrangement patterns according to the evaluation factors, L being a natural number equal to N; and an evaluation value storing unit that stores, for each of the candidate arrangement patterns, a corresponding evaluation value calculated by the evaluation unit, wherein the evaluation unit specifies, as an arrangement for inserting the L number of images with respect to the N number of frames, a candidate arrangement pattern corresponding to the highest evaluation value among the evaluation values stored in the evaluation value storing unit.

2. The image evaluation apparatus of claim 1, wherein the evaluation factors include one of (i) an object introduction degree indicating, for images arranged with respect to a frame set associated therewith in each of the candidate arrangement patterns, a degree of introduction of objects and (ii) a scene transition degree indicating, for images arranged with respect to a frame set associated therewith in each of the candidate arrangement patterns, a degree of transition between scenes.

3. The image evaluation apparatus of claim 2,
wherein the executable instructions, when executed by said processor, cause said image evaluation apparatus to further function as an object clustering unit that clusters objects included in the acquired images into object clusters,
the evaluation unit evaluates, in each of the candidate arrangement patterns, the images arranged with respect to the frame set associated with the object introduction degree,
the evaluation unit provides a first evaluation value thereto when objects respectively included in the images arranged with respect to the frame set associated with the object introduction degree belong to different ones of the object clusters,
the evaluation unit provides a second evaluation value thereto when objects respectively included in the images arranged with respect to the frame set associated with the object introduction degree do not belong to different ones of the object clusters, and
the first evaluation value is higher than the second evaluation value.

4. The image evaluation apparatus of claim 3,
wherein the executable instructions, when executed by said processor, cause said image evaluation apparatus to further function as an object importance degree calculating unit that calculates an importance degree of each of the object clusters,
the evaluation unit evaluates, in each of the candidate arrangement patterns, the images arranged with respect to the frame set associated with the object introduction degree,
the evaluation unit provides a third evaluation value thereto when the objects respectively included in the images arranged with respect to the frame set associated with the object introduction degree belong to object clusters having first importance degrees,
the evaluation unit provides a fourth evaluation value thereto when the objects respectively included in the images arranged with respect to the frame set associated with the object introduction degree belong to object clusters having second importance degrees,
the third evaluation value is higher than the fourth evaluation value, and
the first importance degrees are higher than the second importance degrees.

5. The image evaluation apparatus of claim 2,
wherein the executable instructions, when executed by said processor, cause said image evaluation apparatus to further function as an extracting unit that extracts a characteristic value of a background from each of the acquired images, and the evaluation unit evaluates, in each of the candidate arrangement patterns, the images arranged with respect to the frame set associated with the scene transition degree according to one of (i) non-similarity between characteristic values of backgrounds of the images arranged with respect to the frame set associated with the scene transition degree and (ii) lengths of photographing intervals between the images arranged with respect to the frame set associated with the scene transition degree.

6. The image evaluation apparatus of claim 5,
wherein the executable instructions, when executed by said processor, cause said image evaluation apparatus to further function as a background importance degree calculating unit that calculates an importance degree of the background of each of the acquired images,
the evaluation unit evaluates, in each of the candidate arrangement patterns, the images arranged with respect to the frame set associated with the scene transition degree,
the evaluation unit provides a first evaluation value thereto when the backgrounds of the images arranged with respect to the frame set associated with the scene transition degree have first importance degrees,
the evaluation unit provides a second evaluation value thereto when the backgrounds of the images arranged with respect to the frame set associated with the scene transition degree have second importance degrees,
the first evaluation value is higher than the second evaluation value, and
the first importance degrees are higher than the second importance degrees.

7. The image evaluation apparatus of claim 2,
wherein the executable instructions, when executed by said processor, cause said image evaluation apparatus to further function as an object clustering unit that clusters objects included in the acquired images into object clusters, and
the evaluation factors include a change degree indicating, for images arranged with respect to a frame set associated therewith in each of the candidate arrangement patterns, a degree of change of objects belonging to the same object cluster between images having similar backgrounds.

8. The image evaluation apparatus of claim 7,
wherein the executable instructions, when executed by said processor, cause said image evaluation apparatus to further function as an extracting unit that extracts a characteristic value of a background from each of the acquired images,
the evaluation unit evaluates, in each of the candidate arrangement patterns, the images arranged with respect to the frame set associated with the change degree,
the evaluation unit provides a first evaluation value thereto when backgrounds of the images arranged with respect to the frame set associated with the change degree have similar characteristic values and objects respectively included in the images arranged with respect to the frame set associated with the change degree belong to the same object cluster,
the evaluation unit provides a second evaluation value thereto when backgrounds of the images arranged with respect to the frame set associated with the change degree do not have similar characteristic values and objects respectively included in the images arranged with respect to the frame set associated with the change degree do not belong to the same object cluster, and the first evaluation value is higher than the second evaluation value.

9. The image evaluation apparatus of claim 8,
wherein the executable instructions, when executed by said processor, cause said image evaluation apparatus to further function as:
an object importance degree calculating unit that calculates an importance degree of each of the object clusters; and
a background importance degree calculating unit that calculates an importance degree of the background of each of the acquired images,
the evaluation unit evaluates, in each of the candidate arrangement patterns, the images arranged with respect to the frame set associated with the change degree,
the evaluation unit provides a third evaluation value thereto when at least one of (i) importance degrees of the objects respectively included in the images arranged with respect to the frame set associated with the change degree and (ii) importance degrees of the backgrounds of the images arranged with respect to the frame set associated with the change degree indicate first importance values,
the evaluation unit provides a fourth evaluation value thereto when at least one of (i) importance degrees of the objects respectively included in the images arranged with respect to the frame set associated with the change degree and (ii) importance degrees of the backgrounds of the images arranged with respect to the frame set associated with the change degree indicate second importance values,
the third evaluation value is higher than the fourth evaluation value, and
the first importance values are higher than the second importance values.

10. The image evaluation apparatus of claim 7,
wherein the executable instructions, when executed by said processor, cause said image evaluation apparatus to further function as a calculation unit that calculates an object-occupied area in each of the acquired images,
the evaluation unit evaluates, in each of the candidate arrangement patterns, the images arranged with respect to the frame set associated with the change degree,
the evaluation unit provides a first evaluation value thereto when objects respectively included in the images arranged with respect to the frame set associated with the change degree belong to the same object cluster and object-occupied areas in the images arranged with respect to the frame set associated with the change degree, which are respectively occupied by the objects belonging to the same object cluster, differ in terms of size,
the evaluation unit provides a second evaluation value thereto when objects respectively included in the images arranged with respect to the frame set associated with the change degree do not belong to the same object cluster and object-occupied areas in the images arranged with respect to the frame set associated with the change degree, which are respectively occupied by the objects belonging to the same object cluster, do not differ in terms of size, and
the first evaluation value is higher than the second evaluation value.

11. The image evaluation apparatus of claim 10,
wherein the executable instructions, when executed by said processor, cause said image evaluation apparatus to further function as:
an object importance degree calculating unit that calculates an importance degree of each of the object clusters; and
a background importance degree calculating unit that calculates an importance degree of a background of each of the acquired images,
the evaluation unit evaluates, in each of the candidate arrangement patterns, the images arranged with respect to the frame set associated with the change degree,
the evaluation unit provides a third evaluation value thereto when at least one of (i) importance degrees of the objects respectively included in the images arranged with respect to the frame set associated with the change degree and (ii) importance degrees of backgrounds of the images arranged with respect to the frame set associated with the change degree indicate first importance values,
the evaluation unit provides a fourth evaluation value thereto when at least one of (i) importance degrees of the objects respectively included in the images arranged with respect to the frame set associated with the change degree and (ii) importance degrees of backgrounds of the images arranged with respect to the frame set associated with the change degree indicate second importance values,
the third evaluation value is higher than the fourth evaluation value, and
the first importance values are higher than the second importance values.

12. The image evaluation apparatus of claim 1,
wherein the executable instructions, when executed by said processor, cause said image evaluation apparatus to further function as a background importance degree calculating unit that calculates an importance degree of a background of each of the acquired images, and
the evaluation unit calculates the evaluation value for each of the candidate arrangement patterns according to importance degrees of backgrounds of images arranged with respect to the one or more frame sets in each of the candidate arrangement patterns.

13. The image evaluation apparatus of claim 12,
wherein the executable instructions, when executed by said processor, cause said image evaluation apparatus to further function as an extracting unit that extracts a characteristic value of the background from each of the acquired images, and
the background importance degree calculating unit calculates an importance degree of a background of a given image, among the acquired images, according to (i) similarity between a characteristic value of the background of the given image and a characteristic value of a background of another image, among the acquired images, having a close photography date/time with respect to the given image and (ii) similarity between the characteristic value of the background of the given image and a characteristic value of a background of another image in which an important person appears among the acquired images.

14. The image evaluation apparatus of claim 1,
wherein the executable instructions, when executed by said processor, cause said image evaluation apparatus to further function as a display control unit that displays information corresponding to an evaluation factor according to which the calculation of the highest evaluation value has been performed in association with images inserted in a frame set associated with the evaluation factor in the arrangement for inserting the L number of images with respect to the N number of frames.

15. The image evaluation apparatus of claim 1, wherein each of the N number of frames is included in the one or more frame sets.

16. The image evaluation apparatus of claim 1, wherein the evaluation unit narrows down the acquired images into a predetermined number of images and selects the L number of images from among the predetermined number of images.

17. The image evaluation apparatus of claim 16,
wherein the executable instructions, when executed by said processor, cause said image evaluation apparatus to further function as a background importance degree calculating unit that calculates an importance degree of a background of each of the acquired images, and
the evaluation unit narrows down the acquired images into the predetermined number of images according to the importance degrees of the backgrounds of the acquired images.

18. The image evaluation apparatus of claim 16, wherein the evaluation unit narrows down the acquired images into the predetermined number of images by dividing the acquired images into a plurality of scenes and by using an importance degree of each of the scenes.

19. An image evaluation method comprising:
an acquisition step of acquiring an M number of images, M being a natural number;
a reference step of referencing a template stored in a template storing unit, the template having an N number of frames in each of which an image is to be inserted, N being a natural number equal to or greater than 2 and M being equal to or greater than N, and defining (i) one or more frame sets each being a combination of a plurality of frames among the N number of frames and (ii) evaluation factors pertaining to a characteristic value of each of images that are to be arranged with respect to each of the one or more frame sets;
an evaluation step of, for each combination of an L number of images selected from among the M number of acquired images, generating a plurality of candidate arrangement patterns for arranging the L number of images with respect to the N number of frames, and calculating an evaluation value for each of the candidate arrangement patterns according to the evaluation factors, L being a natural number equal to N;
an evaluation value storing step of storing, for each of the candidate arrangement patterns, a corresponding evaluation value calculated by the evaluation unit; and
a specification step of specifying, as an arrangement for inserting the L number of images with respect to the N number of frames, a candidate arrangement pattern corresponding to the highest evaluation value among the evaluation values stored in the evaluation value storing unit.

20. A non-transitory computer-readable medium having a program stored thereon for causing a computer to perform image evaluation processing, the image evaluation processing including:
an acquisition step of acquiring an M number of images, M being a natural number;
a reference step of referencing a template stored in a template storing unit, the template having an N number of frames in each of which an image is to be inserted, N being a natural number equal to or greater than 2 and M being equal to or greater than N, and defining (i) one or more frame sets each being a combination of a plurality of frames among the N number of frames and (ii) evaluation factors pertaining to a characteristic value of each of images that are to be arranged with respect to each of the one or more frame sets;
an evaluation step, for each combination of an L number of images selected from among the M number of acquired images, generating a plurality of candidate arrangement patterns for arranging the L number of images with respect to the N number of frames, and calculating an evaluation value for each of the candidate arrangement patterns according to the evaluation factors, L being a natural number equal to N;
an evaluation value storing step of storing, for each of the candidate arrangement patterns, a corresponding evaluation value calculated by the evaluation unit; and
a specification step of specifying, as an arrangement for inserting the L number of images with respect to the N number of frames, a candidate arrangement pattern corresponding to the highest evaluation value among the evaluation values stored in the evaluation value storing unit.

21. An integrated circuit comprising:
a template memory that stores a template having an N number of frames in each of which an image is to be inserted, N being a natural number equal to or greater than 2, and defining (i) one or more frame sets each being a combination of a plurality of frames among the N number of frames and (ii) evaluation factors pertaining to a characteristic value of each of images that are to be arranged with respect to each of the one or more frame sets;
an acquisition circuit that acquires an M number of images, M being a natural number equal to or greater than N;
an evaluation circuit that, for each combination of an L number of images selected from among the M number of acquired images, generates a plurality of candidate arrangement patterns for arranging the L number of images with respect to the N number of frames, and calculates an evaluation value for each of the candidate arrangement patterns according to the evaluation factors, L being a natural number equal to N; and
an evaluation value memory that stores, for each of the candidate arrangement patterns, a corresponding evaluation value calculated by the evaluation circuit, wherein
the evaluation circuit specifies, as an arrangement for inserting the L number of images with respect to the N number of frames, a candidate arrangement pattern corresponding to the highest evaluation value among the evaluation values stored in the evaluation value memory.

* * * * *